United States Patent [19]

Olig et al.

[11] Patent Number: 4,547,847

[45] Date of Patent: Oct. 15, 1985

[54] ADAPTIVE CONTROL FOR MACHINE TOOLS

[75] Inventors: Eugene A. Olig; Lee R. Ladwig, both of Fond du Lac, Wis.

[73] Assignee: AMCA International Corporation, Fond du Lac, Wis.

[21] Appl. No.: 498,466

[22] Filed: May 26, 1983

Related U.S. Application Data

[63] Continuation-in-part of Ser. No. 386,481, Jun. 9, 1982, Pat. No. 4,509,126.

[51] Int. Cl.$^4$ .................. G06F 15/46; G05B 13/02
[52] U.S. Cl. .................. 364/148; 318/561; 364/164; 364/474; 364/511
[58] Field of Search .................. 364/148, 167–171, 364/474, 475, 483, 511, 157, 183, 164, 165; 318/571, 561, 565, 650; 324/142; 408/8–13

[56] References Cited

U.S. PATENT DOCUMENTS

| | | |
|---|---|---|
| 3,220,315 | 5/1964 | Mathias . |
| 3,571,834 | 5/1971 | Mathias .................. 10/139 |
| 3,573,588 | 4/1971 | Geyer et al. .................. 318/571 |
| 3,581,045 | 5/1971 | Panschow .................. 219/69 |
| 3,589,077 | 6/1971 | Lenning .................. 51/165 |
| 3,656,124 | 4/1972 | McGee .................. 340/172.5 |
| 3,699,720 | 10/1972 | Lenning .................. 51/165.77 |
| 3,746,955 | 7/1973 | Kobayashi .................. 318/561 |
| 3,784,798 | 1/1974 | Beadle et al. .................. 235/115.11 |
| 3,840,791 | 10/1974 | Mack .................. 318/571 |
| 3,917,930 | 11/1975 | Davey et al. .................. 235/151.11 |
| 4,031,368 | 6/1977 | Colding et al. .................. 364/475 |
| 4,041,287 | 8/1977 | Kolell et al. .................. 235/151.11 |
| 4,054,780 | 11/1977 | Bartley et al. .................. 364/106 |
| 4,078,195 | 3/1978 | Mathias et al. .................. 318/561 |
| 4,096,436 | 6/1978 | Cook et al. .................. 324/142 |
| 4,193,227 | 3/1980 | Uhtenwoldt .................. 51/165.77 |
| 4,208,718 | 6/1980 | Chung .................. 364/474 |
| 4,228,782 | 10/1980 | Demers et al. .................. 125/14 |
| 4,237,408 | 12/1980 | Frecka .................. 318/571 |
| 4,245,316 | 1/1981 | Koikawa et al. .................. 364/474 |
| 4,266,375 | 5/1981 | Nishimura et al. .................. 318/571 X |
| 4,279,013 | 7/1981 | Cameron et al. .................. 364/105 |
| 4,298,833 | 11/1981 | Edwards et al. .................. 318/561 |
| 4,330,832 | 5/1982 | Kohzai et al. .................. 364/472 |
| 4,351,029 | 9/1982 | Maxey et al. .................. 364/511 |
| 4,354,224 | 10/1982 | Sato .................. 364/183 |
| 4,408,280 | 10/1983 | Bedini et al. .................. 364/474 |

FOREIGN PATENT DOCUMENTS 782432 9/1957 United Kingdom .

OTHER PUBLICATIONS

Tool Sense Manual, §1, Valeron Corp. (documentation distributed with a Machine Power Control System on sale by Valeron Co., more than one year before applicant's filing date.)

(List continued on next page.)

*Primary Examiner*—Joseph Ruggiero
*Attorney, Agent, or Firm*—Leydig, Voit & Mayer, Ltd.

[57] ABSTRACT

An adaptive control for a turning machine which adjusts the machining rate to maintain the actual horsepower dissipated at the cutter tip at a constant set point despite changing workpiece and cutter parameters. The machining rate is adjusted by control of the machine drive and tool feed to achieve required SFM and IPR values, respectively, within maximum and minimum SFM and IPR limits. "Speed" and "Axis" override controls are also provided. The rate of adjustment of SFM and IPR to a deviation of the cutter tip horsepower from the set point is inversely proportional to the measured system gain so that the response factor of the control loop is maximized. The commanded machining rate of (SFM) (IPR) product is periodically determined by estimating the actual machining rate and multiplying the estimate by the ratio of the set point to the cutter tip horsepower. The cutter tip horsepower is determined by subtracting the electrical loss, mechanical friction loss, and the net power required for net acceleration of the drive, from the measured electrical power supplied to the drive motor. The cutting efficiency is monitored to perform tool wear, tool breakage, and tool protection functions. The adaptive control also has soft engagement and soft disengagement functions for initiating and terminating the adaptive machining process.

73 Claims, 31 Drawing Figures

OTHER PUBLICATIONS

Oren Masory & Yoram Koren, "Adaptive Control System for Turning," Paper No. 03116, *CIRP*, vol. 29, (1980).

Bahil, "A Simple Smith Predictor for Controlling Time-Delay Systems," *IEEE Control Systems Magazine*, May 1983, pp. 16-22.

N. R. Elias, T. H. Lambert, "The Relationship Between Transient and Steady State Performance Criteria for Control Systems", Measurement & Control, vol. 10, (Jun. 1977), pp. 223-228.

R. V. Monopoli, V. N. Subbarao, "A New Algorithm for Model Reference Adaptive Control with Variable Adaptation Gains", IEEE Trans. on Automatic Control, vol. AC-25, No. 6, (Dec. 1980), pp. 1245-1248.

D. L. Kleinman, P. K. Rao, "Continuous-Discrete Gain Transformation Methods for Linear Feedback Control", Automatica vol. 13, Permagon Press, (1977), pp. 425-428.

A. G. Ulanoy, A. M. Shubladze, "Design of Adaptive Controllers in the Form of Variable-Structure Systems", Automatika i Telemekhanika, No. 5, pp. 54-60, Moscow (May 1977), (Translation UDC 62-55, pp. 657-663).

S. R. Gupta, "On-Line Gain Identification of Flow Processes with Application to Adaptive pH Control", AICHE Journal vol. 24, No. 4, (Jul. 1978), pp. 654-664.

M. V. Rao, M. P. Dave, "Stabilization of Multi-Machine System Through Non Linear Gain Excitation Control", IEEE Power Systems Winter Meeting, N.Y., paper A77088-8, (Jan. 1976), pp. 1-6.

R. Craven, H. Glavitsch, "Large Disturbance Performance of an Adapted Linear Excitation Control System", IEEE Power Systems Summer Meeting Vancouver, paper A79452-4, (Jul. 1979), pp. 1-6.

S. Mukhopadhyay, "Generalized Disturbance Adaptive Optimal Regulator", Electronics Letters, vol. 14, No. 25, (Dec. 7, 1978), pp. 820-821.

I. H. Rinard, "Guide to Control System Design", Chemical Engineering, (Nov. 29, 1982), pp. 47-58.

Bendix Industrial Controls Division, "Adaptive Control [for the Dynapath N.C.]" brochure.

J. N. Becker, L. Y. Shum, "Tool Collision and Machine Considerations in Adaptive Control Systems", Journals of the CIRP, vol. 25, (1976), pp. 319-322.

V. K. Jain, B. Chatterjee, "Some Digitally Controlled Devices for Adaptive Control", J. Inst. Elec. & Telecom. Engrs., vol. 20, No. 5, (1974), pp. 174-178.

V. K. Jain, P. Kabisatpathy, "A Digitally Controlled Automatic Gain Control System for Biomedical Instrumentation", J. Inst. Elec. & Telecom. Engrs., vol. 23, No. 1, (1977), pp. 5-6.

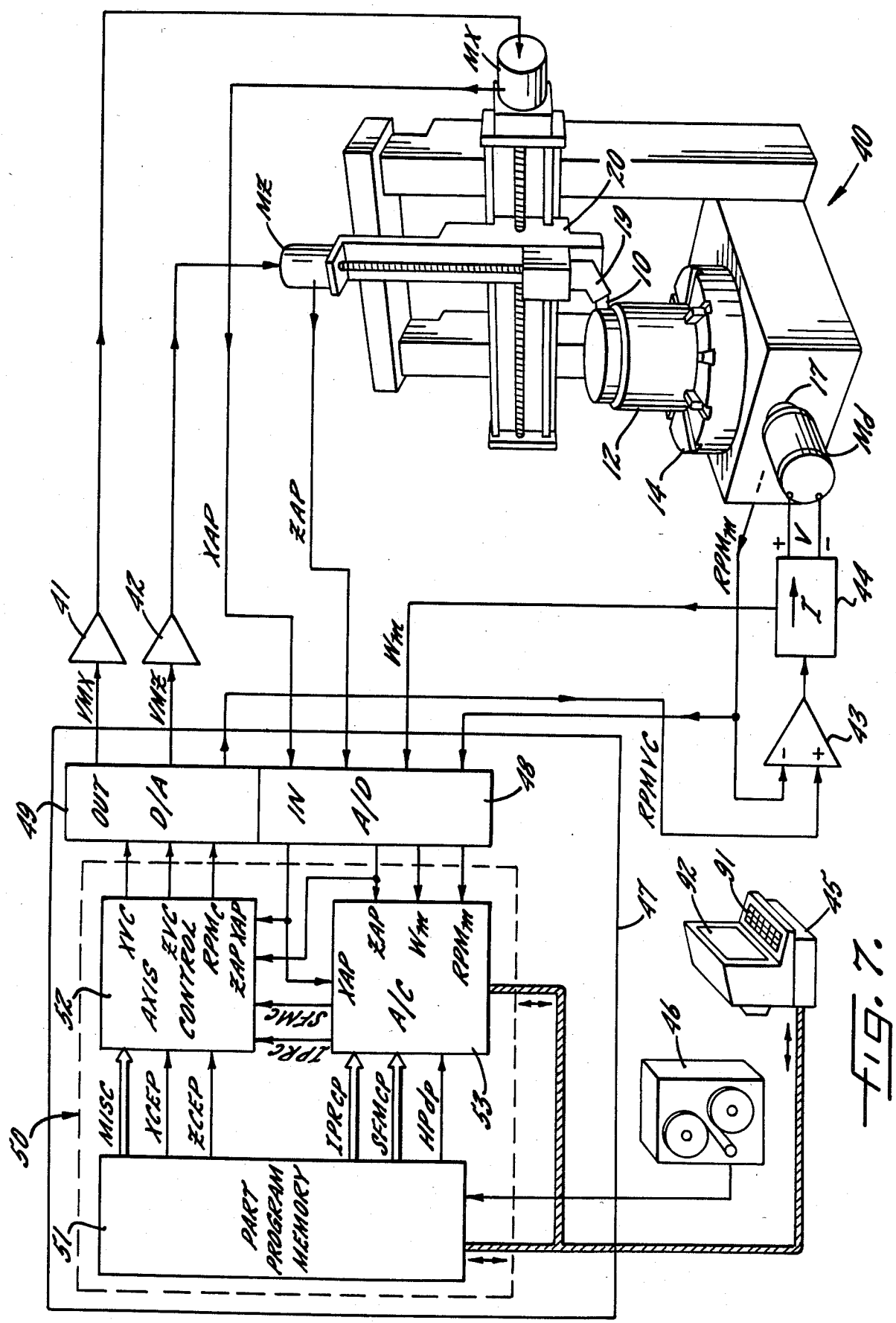

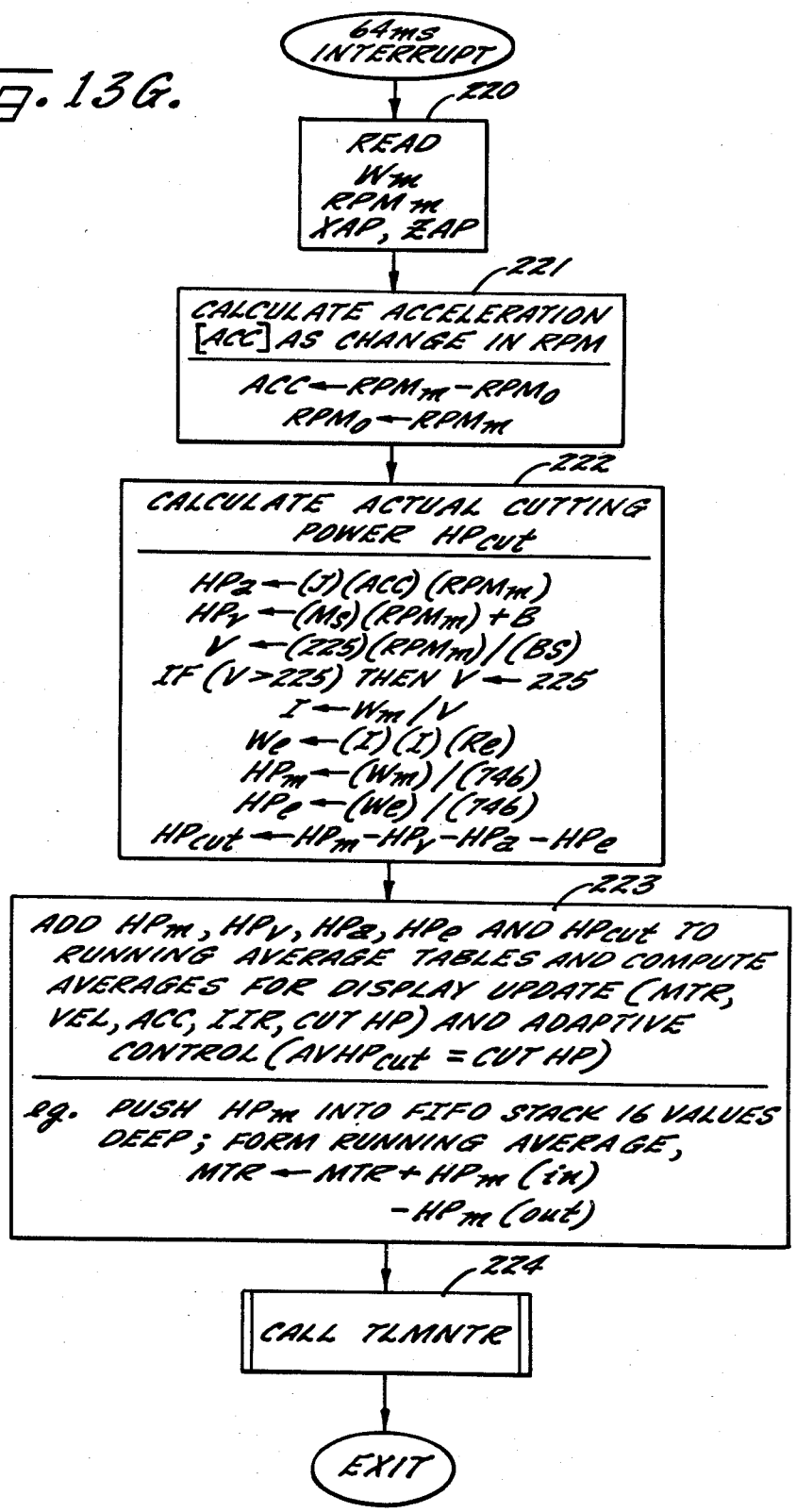

ADAPTIVE CONTROL FOR MACHINE TOOLS

RELATED APPLICATIONS

This application is a continuation-in-part of application Ser. No. 386,481 filed June 9, 1982, now U.S. Pat. No. 4,509,126.

BACKGROUND OF THE INVENTION

1. Field of the Invention

This invention relates to adaptive control in which the response of a feedback control automatically adjusts to gain variations in the controlled system. More particularly, the invention pertains to turning machine tools such as horizontal and vertical lathes. Specifically, the invention relates to machine tools with an adaptive control, in which machining parameters such as workpiece surface velocity at the cutting edge of the tool and tool feed velocity are continuously adjusted during machining in response to measured machining parameters during the machining operation.

2. Description of the Prior Art (Prior Art Statement Under Rule 97)

It is well known in the art that machining time may be decreased by controlling machine tool drive and feed inputs to maintain certain machining parameters at maximal limits. One such limit is the workpiece surface velocity at the cutting edge of the cutter tool, measured in surface feet per minute and thus known in the art as SFM. Excessive SFM may burn the tool, and thus tool makers specify a maximum SFM for a given tool. Mack, U.S. Pat. No. 3,840,791 issued Oct. 8, 1974, for example, describes a system in a turning machine for accelerating a rotating workpiece as the cutter at first approaches the workpiece in order to obtain a maximal SFM at the beginning as well as throughout the machining operation. Another such limit is the power to the machine drive, measured in horsepower and known as HP. It is known that the maintenance of a maximal HP is desirable to minimize machining time, absent other limiting factors.

It is also known that there are certain ranges of machining parameters that constrain the selection of maximal SFM or HP. One such parameter is the tool feed velocity into the workpiece, measured in inches per revolution for turning machines and thus known as IPR. IPR is a measure of the depth of penetration of the tool into the workpiece and thus the width of the shavings or "chip thickness" of material cut from the workpiece. The maximum permissible force on the tool tip sets the maximum IPR, and exceeding this maximum might cause chatter, or tool breakage. On the other hand, if the IPR is below a certain minimum, depending on the tool geometry (especially its "chip breaker") and workpiece material, a large mass of thin, curled strips will be produced at the cutter and may clog the machine. Normally, the turning machine is operated at or above this minimum IPR so that the cutter breaks the shavings into small chips that fall away clearly and are easily removed from the machine.

There are many well known mathematical techniques, such as linear programming, for optimizing a function of several parameters, functionally related in a known way, within given constraint boundaries. For machining parameters, however, it is known that many of the functional relations between controllable and measured parameters change throughout the machining operation due to dulling of the cutter edge and changing geometry and surface condition of the workpiece. Thus, it is known in the prior art that the optimization procedure should adapt to the changing conditions of the machining parameters and the functional relations between them.

The prior art methods of adaptive control, such as that disclosed by B. Beadle et al. in U.S. Pat. No. 3,784,798, issued Jan. 8, 1974, assumes that the functional relations between measured parameters, controllable parameters, and the parameters sought to be optimized maintain certain general characteristics despite the fact that the functional relationships change. In particular, an increase in a measured parameter results from either an increase or decrease of controllable parameters, and an increase in the parameter to be optimized results from either an increase or decrease of the controllable parameters. Thus, optimization may proceed in a stepwise fashion of incrementally changing controllable parameters most likely to increase the parameter to be optimized, but changing controllable parameters in a different fashion most likely to avoid a constraint in measured parameters when a constraint boundry is passed. This method homes in on and iteratively checks for a desired operating point and may oscillate back and forth across constraint boundaries.

Grinding machines have been provided with controllable feeds activated in response to changes in current, power, or speed of the motor providing the transverse cutting velocity. W. Muller, Great Britain Patent No. 782,432 issued Sept. 4, 1957 discloses an automatic grinding machine having a feed that is turned on and off in response to whether the grinding motor current or speed is less or greater, respectively, than a preset current or speed threshold. Muller also employs a rapid idle traverse to initially advance the grinding disc up to the workpiece, with contact detected by the resultant increase in motor current or drop in motor speed. R. Lenning, U.S. Pat. No. 3,589,007 issued June 29, 1971, discloses a grinding wheel with its feedrate controlled in response to the force exerted on the grinding wheel when it is in cutting engagement with the workpiece. The force is proportional to the power supplied to the grinding motor, and the difference between the measured force and a preselected reference force is used to energize the feed. When the workpiece is reduced to a predetermined size, the reference force is changed. It should be noted that none of these systems responsive to feed motor power determine the actual power delivered to the cutting interface, for example, by correcting for acceleration. Thus the response of these control systems must be limited to insure stability.

Cutting efficiency of rotary saws for slicing semi-conductor wafers has been monitored to measure the condition of the edge of the saw. R. Demers, et al., U.S. Pat. No. 4,228,782 issued Oct. 31, 1980, discloses a system for controlling the blade-to-boule feedrate of a wafer cutting saw so that the blade-to-boule force, measured by a mechanical force transducer, is maintained generally constant. The measured blade-to-boule force is compared to a reference force and the error is applied to a feedrate control. During the cutting of the initial and final edges of the wafer the force selection is overridden by a maximum rate-of-feed limitation which is intended to prevent excessive shock and too rapid penetration during initial contact, which could otherwise damage the saw or chip the boule surface due to excessive pressure. The cutting efficiency of the saw is measured by the rate of feed, and the time required to cut a wafer is used as a criterion for determining when the saw blade needs to be dressed or replaced.

The measurement of the electrical power consumed by the drive motor of a turning machine has been used to sense tool breakage and to regulate tool feedrates. Commercial systems are available, for example, that decrease the feedrate if the drive motor power is above a preset maximum threshold, and increase the feedrate if the drive motor power is below a preset minimum threshold. The maximum threshold is set above the minimum threshold, defining a window over which the gain of the feedback control loop is set to zero in order to insure stability. The rate at which the feedrate changes, or response factor, is a predetermined constant, preferably set to the largest possible value which will allow stable operation of the machine. In such machines provisions are made for the user to select a number of high or low measured power limits and associated limit delays in order to control user defined machine functions enabled if the high or low limit is reached continuously for a time period longer than the associated limit delay. A low limit, for example, could be used to detect tool breakage. Moreover, a predetermined machine high power limit is usually provided as a protection feature to shut off the machine if the machine high power limit is exceeded for a time greater than a predetermined machine limit time delay. A somewhat shorter predetermined spindle surge time may be specified to disable the user selected limits when the machine high limit is exceeded, since temporary power surges are randomly encountered during normal machining and thus should be discounted when drive power is monitored to control user functions. An idle power predetermined maximum limit is typically provided along with a predetermined initial "air cut" feedrate and a preset transitional "impact" feedrate so that the tool is first brought into contact with the workpiece at a rapid "air cut" feedrate, and contact is detected by the increase in measured drive power above the idle power limit, whereupon the feedrate is switched to the impact feedrate and held for a predetermined impact hold time before the feedrate control loop is established. Moreover, a predetermined minimum feed limit is typically provided in terms of a percentage of a predetermined initial feedrate to set a floor below which the feedrate will not fall during normal operation of the machine. The combination of a high minimum feed limit and a low machine high power limit possibly could shut off the machine if a tool becomes dull, but at the expense of limiting the permitted operating ranges of workpiece and tool parameters. The use of a low machine high power limit, for example, is particularly ineffective in detecting tool dulling if feedback control reduces the machining rate to maintain a generally constant power in response to tool dulling.

SUMMARY OF THE INVENTION

An important aim of the invention is to maintain the machining power of a machine tool at a desired power level using a feedback control loop having a time-variant response factor that is adaptively adjusted to a maximal allowable value in response to changing machining parameters as the machining process progresses.

Another general aim of the invention is to continuously regulate machining power levels by varying a plurality of machine control inputs, and apportion the control input signals in a time-variant and optimal fashion in response to changing machining parameters as the machining process progresses. A related general aim is to provide an adaptive control compatible with user-adjustable override controls for adjusting the desired machining power by independently scaling individual machine control input signals, despite the general tendency of an adaptive control to compensate for gain variations in the response of the machine to individual control signals.

A specific objective of the present invention is to automatically adjust tool drive velocity and tool feed velocity to maintain a desired cutting horsepower level, regardless of changing depth and workpiece material properties, thereby allowing the programmer to use less conservative machining parameters.

Another object of the invention is to decrease machining time, since a constant maximal horsepower may be maintained and less conservative limits for machining parameters may be selected to maximize machining speed.

Yet another object is to provide a means of adaptively controlling a machine tool based on the horsepower actually consumed at the tool-workpiece interface, regardless of acceleration of the rotating workpiece or rotating cutting tool and power losses in the drive for rotating the workpiece or cutting tool. A related object is to provide an automatic means for calculating the system inertia, and other system losses, thereby making it possible to compensate for the drive losses and the acceleration of rotating workpieces or cutting tools of various sizes and shapes.

Still another object of the invention is to increase tool life by keeping machining parameters within feedrate constraints known to reduce wear and prevent tool breakage.

And yet another object is to provide a means for determining when a tool is becoming dull or breakage is imminent while simultaneously maintaining cutting power at a desired constant level. A specific object is to provide a means for detecting tool dulling to a predetermined or unacceptable degree, or imminent breakage by calculating and monitoring the relative or actual cutting efficiency of a tool in terms of power required for removal of a unit volume of workpiece material, substantially independent of cutting depth, cutting surface velocity, and feedrate.

Still another object is to provide a means for initiating contact of the tool with the workpiece and engaging an adaptive machining power control system and conversely disengaging the adaptive control system and completing the machining process in a controlled manner while minimizing stress overloads on the tool.

BRIEF DESCRIPTION OF THE DRAWINGS

FIG. 7 is a pictorial and schematic diagram of an exemplary embodiment of the invention controlling a vertical turret lathe.

FIG. 13A through FIG. 13H comprise a flowchart of a numerical procedure for execution in the numerical control unit of FIGS. 8 and 9 to adaptively control the vertical turret lathe shown in FIG. 7 as shown in the timing diagram of FIG. 12. Specifically, FIG. 13A is a flowchart of the executive program executing the adaptive control procedure outlined in FIG. 5A. FIG. 13A' shows the modification of the executive program in FIG. 13A required for executing the adaptive control procedure outlined in FIG. 5B. FIG. 13B is a flowchart of the subroutine TEST used by the executive program of FIG. 13A to determine the next commanded values of SEM and IPR based on a comparison of the estimated desired machining rate to threshold levels. FIG. 13C shows the subroutine PCD for determining the program constants of friction Ms and B, and the moment of inertia J. FIG. 13D shows the first part of the 32 mS interrupt procedure which performs the feedhold and initializing velocity control sequences. FIG. 13E shows the second part of the 32 mS interrupt procedure including the reading of the part program memory, calculation of path vectors, and the soft engagement and disengagement functions. FIG. 13F is a flowchart of the axis subroutine which generates the feed and drive control signals. FIG. 13G is a flowchart of the 64 mS interrupt which periodically calculates the actual cutting power at the cutter edge.

FIG. 13H is a flowchart of the tool monitor subroutine TLMNTR which calculates the relative cutting efficiency factor for detecting broken tools, tool wear, and tool protection conditions, and executing a feed hold when these improper conditions occur during machining.

Figure 1A:
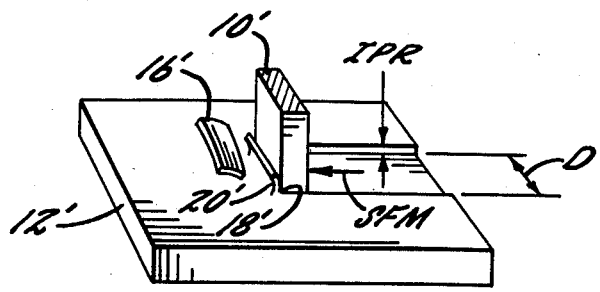
FIG. 1A, labeled prior art, is a perspective view of a generalized cutting tool engaged with a workpiece.

A glossary of selected terms has been appended before the claims for the convenience of the reader.

While the invention is susceptible to various modifications and alternative forms, a number of specific embodiments thereof have been shown by way of example in the drawings and will herein be described in detail. It should be understood, however, that they are not intended to limit the invention to the particular forms disclosed, but, on the contrary, the intention is to cover all modifications, equivalents, and alternatives falling within the spirit and scope of the invention as defined by the appended claims.

BEST MODE FOR CARRYING OUT THE INVENTION

I. Introduction to Machining Parameters

The exemplary embodiments of the invention herein described in detail generally concern the environment of a machine tool. In its most general form, as depicted in FIG. 1A, a machine tool employs a cutter tool 10' driven into a workpiece 12' so that chips of workpiece material 16' are cut from the workpiece by an edge 18' that cuts away workpiece material 20'. This is the basic mode of operation regardless of whether the machine tool is a lathe, a mill, a grinding machine, a drill, or the like.

Several parameters are illustrated in FIG. 1A that describe the machining process. One of the most important is the relative transverse velocity of the cutting tool edge 18' with respect to the workpiece 12' surface, which is conventionally measured in surface feet per minute and thus denoted as SFM. Another important machining parameter is the distance of the cutter edge below the surface of the workpiece in a direction normal to the workpiece surface and thus also normal to the direction of the velocity SFM. This distance is denoted IPR (also known in the art as "chip thickness") which has a special meaning for turning machines, as will be described below. A third important machining parameter is the depth of cut D in a direction parallel to the workpiece surface but normal to velocity SFM. Inspection of FIG. 1A reveals that the cross-sectional area A of the workpiece shaving 20' is the product of the distance IPR and the depth D. Since SFM is the velocity at which the shaving 20' appears to be emitted from the edge 18' of the cutter 10', the machining rate dC/dt, defined as the rate at which workpiece material is removed, is the product of SFM, IPR, and D. (In all equations, except otherwise noted, a rationalized system of units is assumed; for example, the factor of 12 to convert inches to feet as commonly used in industry is implicitly assumed.)

The exemplary embodiments of the present invention will be described specifically with respect to a turning machine such as a vertical turret lathe and the like as shown schematically in FIG. 1B. The cutter 10 engages a workpiece 12 which is mounted on a table 14 that is rotated by a drive 17. The cutter 10, for example a ceramic or tungsten carbide insert, is held in a tool holder 19 which is moved in a radial and an axial direction by a tool feed 20. The axial direction is conventionally denoted as the Z direction and the radial direction is conventionally denoted as the X direction so that the tool feed velocity may be resolved into components $F_x$ and $F_z$.

Figure 1B:
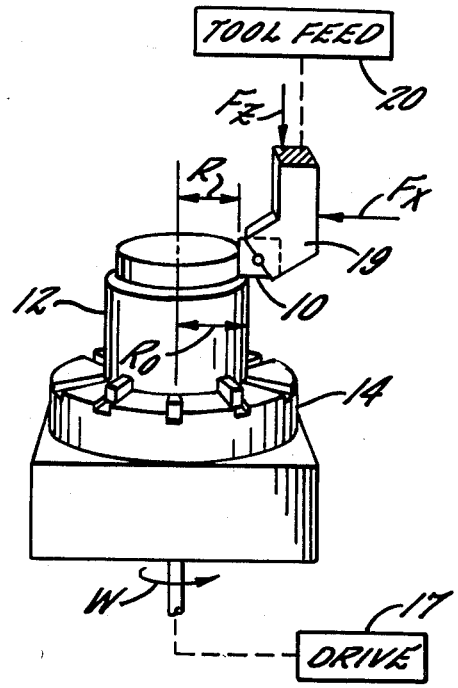
FIG. 1B, labeled prior art, is a perspective view of a schematic representation of a vertical turret lathe shown to illustrate the relation between the cutting tool and the workpiece.
Figure 1C:
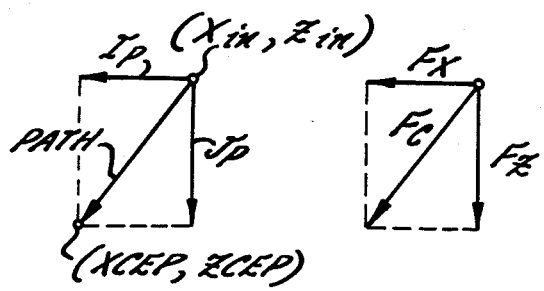
FIG. 1C, labeled prior art, shows the displacement vectors and feed velocity vectors representing the relative motion of the cutting tool being fed into the workpiece.

The relation between the tool feed velocity vectors and the displacement vectors of the cutting tool 10 are shown in detail in FIG. 1C. The resultant tool feed velocity is denoted as $F_c$. The feed velocity vectors $F_x$ and $F_z$ geometrically similar to the displacement vectors Ip and Jp conventionally designating the X displacement component and the Z displacement component respectively. The resultant displacement vector is denoted as PATH which is a vector from an initial point ($X_{in}$, $Z_{in}$) to a terminal point (XCEP, ZCEP).

Figure 1D:
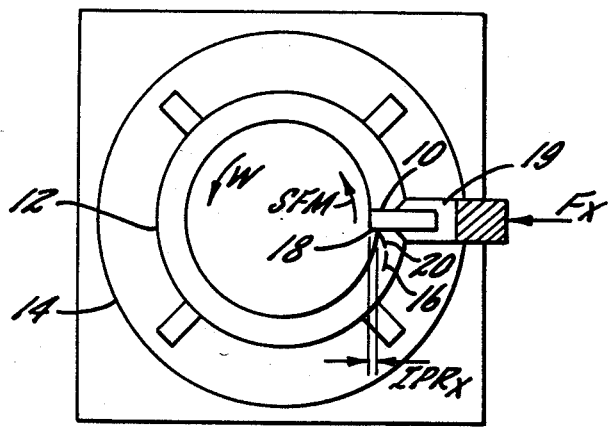
FIG. 1D, labeled prior art, is a top view of the vertical turret lathe schematic of FIG. 1B drawn to illustrate a facing operation.

The vertical turret lathe of FIG. 1B may be operated in one of two modes or a combination thereof. In a facing mode, the tool feed is advanced radially inward along the X axis into the workpiece, as shown in FIG. 1D, so that the velocity SFM is equal to the angular velocity w of the workpiece multiplied by the changing radius R of the cutter edge 18 from the central axis from the workpiece. Since the locus of the cutter edge with respect to the workpiece 12 traces out a spiral, the distance of the cutter edge into the surface of the workpiece is equal to the inward radial feed $F_x$ of the cutting tool into the workpiece divided by the rotational velocity RPM=w/2π. Conventionally the feedrate of the cutting tool is measured in inches per minute and the rotational velocity is measured in revolutions per minute so that the parameter IPR has dimensions inches per revolution, thus explaining the meaning of the mnemonic IPR. The distance IPR in FIG. 1D is in the x direction and thus in FIG. 1D IPR is given the subscript x. The depth of cut D is in the Z direction.

Figure 1E:
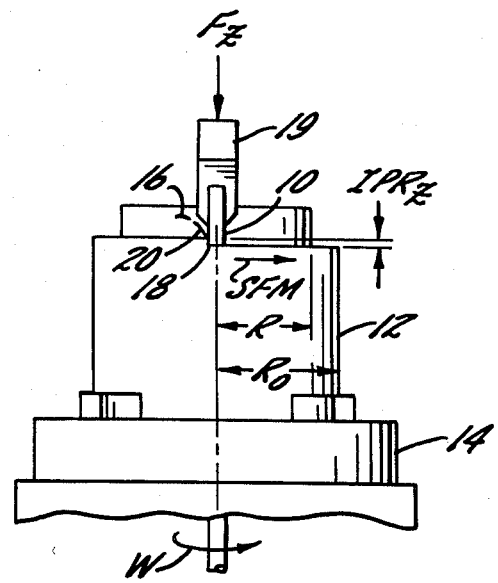
FIG. 1E is a side view of the vertical turret lathe schematic of FIG. 1B drawn to show a turning operation.

The other mode of operating a verical turret lathe is shown in FIG. 1E. For a turning cut, the cutter is fed in the Z direction into the workpiece so that the locus of the cutter edge with respect to the workpiece is a helix. Thus the distance IPR is in the Z direction and the depth of cut D is in the X direction. It should be noted, however, that a rigorous definition of the velocity SFM is not readily apparent since SFM is not constant along the lower edge of the cutter 10 in contact with the workpiece in FIG. 1E. If the parameter D is defined as the width of the shaving or chip 16, then D is equal to the outer radius $R_o$ minus the inner radius R. Then it is possible to defined an effective or average SFM so that the machining rate dC/dt is still equal to the product of D, SFM, and IPR. Noting that since the amount of material removed in one revolution is equal to (IPR) ($\pi$) ($R_o^2 - R^2$), the effective SFM may be derived as:

$$dC/dt = (SFM_{eff})(IPR)(D) = (RPM)(IPR)(\pi)\cdot(R_o^2 - R^2) \quad (1\text{-}1)$$

But since $$(R_o^2 - R^2) = (R_o + R)(R_o - R) = (R_o + R)(D)$$

$$SFM_{eff} = (RPM)(\pi)(R_o + R) = (2)(\pi)(RPM)\frac{(R_o + R)}{2} \quad (1\text{-}2)$$

$$SFM_{eff} = w\frac{(R_o + R)}{2} = wR_{av} \quad (1\text{-}3)$$

Thus the effective SFM may be defined in terms of an average radius:

$$R_{av} = R_o + R/2$$

In general, the tool feed 20 will move the cutter 10 in a programmed path in both the X and Z directions, and the workpiece 12 will be cut by the rounded corner, or tip, at the edge 18 of the cutter 10 engaging the workpiece 12. In such a case the distance IPR may be defined as the magnitude of the resultant path velocity $F_c$ divided by the rotational velocity RPM of the workpiece. Also, without loss of generality, the velocity SFM may be defined as a product of the angular velocity w and the average radius $R_{av}$ being approximately the radial distance from the axis of the workpiece to the center of the area of contact of the workpiece with the cutter 10. The depth of cut D may be defined generally as the effective width of the shaving or chip 16 cut from the workpiece. "Chip thickness" remains in all cases essentially equal to IPR.

II. Cutter Tip Horsepower

The actual machining process occurs at the cutter tip 18 and the conditions at the cutter tip have a major effect on the machining process and the quality of the resultant machined article. Aside from the controllable parameters IPR, SFM, and D, uncontrollable parameters such as the hardness and density of the workpiece material and the sharpness, temperature, and physical integrity of the cutter 10 may have primary influence on the quality of the machined article. The applicants have discovered that the actual horsepower expended at the cutter tip is a useful guide to these uncontrolled and uncontrollable parameters of the workpiece and cutter and that the actual horsepower at the cutter tip may be determined and used to regulate the machining process to improve the quality of the machined article without increasing machining time or shortening tool life. In accordance with an important aspect of the present invention, the applicants have discovered a method of determining the actual cutter tip horsepower from the horsepower consumed by the drive 17 by applying a number of corrections based on pre-determined constants which may be determined before the machining process or during an initial start-up procedure. In accordance with an exemplary embodiment, the drive 17 is an electric motor and the horsepower consumed by the drive is conveniently measured by a watt meter. Then the true power expended at the cutter tip $HP_{cut}$ is derived from the measured electrical power $HP_m$ by subtraction of the estimated (i.e., measured with precision or with some approximation) electrical resistive loss $HP_e$, mechanical friction loss $HP_v$, and the net power transferred to the inertial mass of the drive means and the rotating parts of the machine tool during net acceleration $HP_a$ according to:

$$HP_{cut} = HP_m - HP_e - HP_v - HP_a \quad (2\text{-}1)$$

Figure 2:
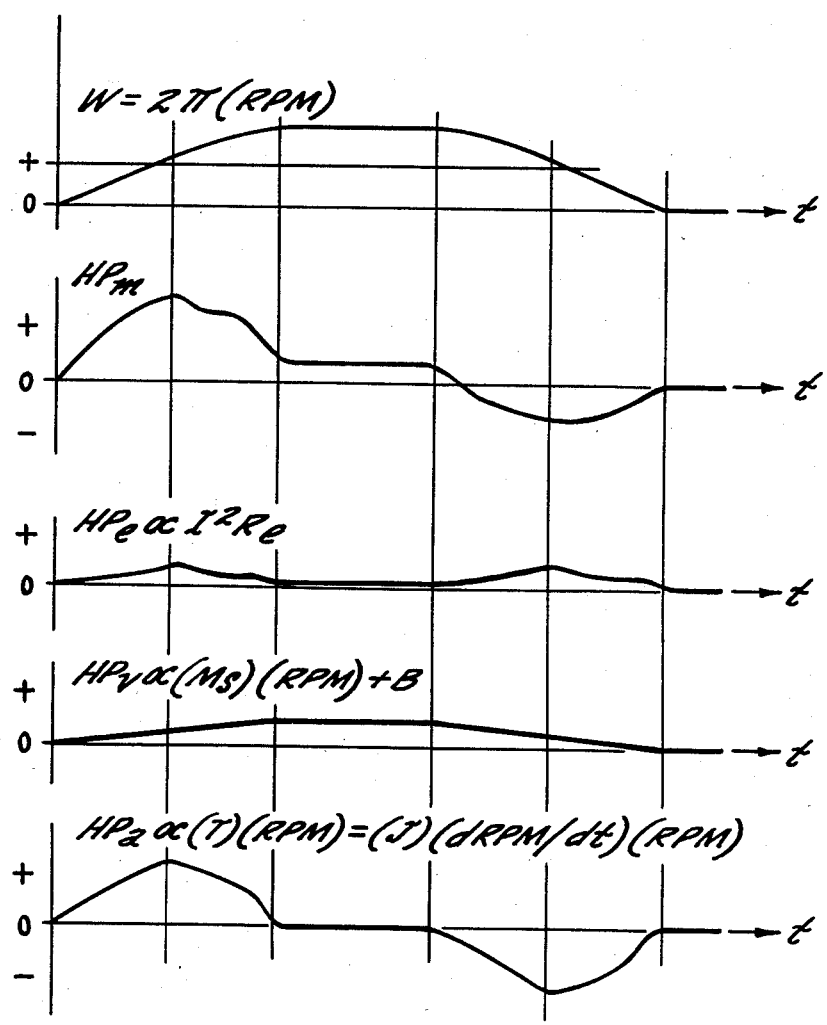
FIG. 2 is a graph of the time variation of the angular velocity of the workpiece, the measured power consumed by the drive, the electrical power consumed by the electrical resistance in an electrical motor drive, the power lost due to a mechanical friction, and the net power transferred to the inertial mass of the drive and workpiece in a turning machine.

This equation is illustrated in FIG. 2, which shows that the various corrections $HP_e$, $HP_v$ and $HP_a$ add up to the measured power $HP_m$ when the cutting tool is disengaged so that $HP_{cut}$ is zero.

The electrical resistive loss or power consumed and dissipated as heat in the motor winding circuit of the drive motor, is proportional to the characteristic resistance $R_e$ of the motor windings and the square of the current I flowing through the drive motor:

$$HP_e = (I^2)(R_e)/(746) \quad (2\text{-}2)$$

where $HP_e$ is in units of horsepower, I is in units of amperes, and $R_e$ is in units of ohms. The units conversion factor of 746 is shown since it is universally recognized in the art. Although the resistance $R_e$ is somewhat dependent on temperature, satisfactory results are obtained by assuming that the resistance of the motor is constant. The resistance $R_e$ may be measured with an ohmmeter or may be supplied by the motor manufacturer. The drive motor current I may be continuously measured with an ammeter but for a DC drive motor satisfactory results may be obtained by measuring I indirectly from $HP_m$ and RPM.

If the voltage V across the motor windings is known, then the current I is related to measured horsepower $HP_m$ expressed in watts $W_m$ as:

$$W_m = (746)(HP_m) \quad (2\text{-}3)$$

according to:

$$I = W_m/V \quad (2\text{-}4)$$

By using this expression for the current, then the $I^2R$ loss of power, as heat, in the resistance of the motor circuit becomes:

$$HP_e = \frac{W_m^2}{V^2}(R_e)/(746) \quad (2\text{-}5)$$

But the voltage V need not be measured directly since for a DC motor V is approximately a linear function of RPM up to a known base speed BS at which V assumes a constant rated voltage Vop so that:

$$V = \frac{(RPM)(Vop)}{BS} \text{ if } RPM \leq BS$$

$$V = Vop \text{ if } RPM \geq BS$$

The base speed BS and rated voltage Vop are constants characteristic of a given type of motor and are usually stamped on the motor nameplate by the motor manufacturer.

Mechanical friction loss $HP_v$ is essentially proportional to the rotational velocity RPM of the drive 17. The friction loss predominates at a constant RPM. Satisfactory results are obtained by assuming that the total friction loss $HP_v$ is a linear function of a pre-determined coefficient of friction Ms and intercept constant B according to:

$$HP_v = (Ms)(RPM) + B \quad (2\text{-}7)$$

Ms and B are preferably determined for each workpiece by initially cycling the machine with the cutting tool disengaged up to several different constant RPMs. Then the frictional loss $HP_v$ at each constant RPM is determined by subtracting the electrical loss $HP_e$ from the measured horsepower $HP_m$. A standard least squares statistical procedure computes the constants Ms and B from the various data points of RPM and associated $HP_v$. A more precise estimate for the frictional loss $HP_v$ could be obtained by fitting the measured frictional loss $HP_v$ as a function of RPM to a quadratic or higher order polynomial or function of RPM. The linear function in Equation (2-7) is itself a two-term polynomial.

Variations in the measured power $HP_m$ due to acceleration are very significant and since they are not solely proportional to RPM, it is very important to correct for the power devoted to acceleration $HP_a$ whenever a feedback type control mechanism controls the machine tool in response to the measured power $HP_m$. Otherwise the feedback control loop may become unstable since the uncompensated $HP_m$ will contain a large differential component responsive to transients. The net power required for acceleration is proportional to the torque T and the rotational velocity RPM, but the torque T is itself proportional to a constant moment of inertia J and the time rate of change of the rotational velocity dRPM/dt according to the equations:

$$HP_a = \frac{(RPM)(T)}{63,000} \quad (2\text{-}8)$$

$$T = (J)(dRPM/dt) \quad (2\text{-}9)$$

$$HP_a = \frac{(J)(RPM)(dRPM/dt)}{63,000} \quad (2\text{-}10)$$

The units conversion factor of 63,000 is shown since it is well known in the art. For turning machines, the moment of inertia J is preferably determined for each workpiece since the moment of inertia in practice includes the inertial mass of the drive motor, the workpiece, and any other rotating components of the machine tool. Then the moment of inertia is determined, for example, by an initial procedure wherein the machine tool is accelerated and decelerated with the cutting tool disengaged. The net power $HP_a$ due to acceleration is calculated from the measured drive power $HP_m$ when RPM is changing:

$$HP_a = HP_m - HP_e - HP_v \quad (2\text{-}11)$$

Thus J is computed as:

$$J = \frac{HP_a(63,000)}{(RPM)(dRPM/dt)} \quad (2\text{-}12)$$

Figure 3A:
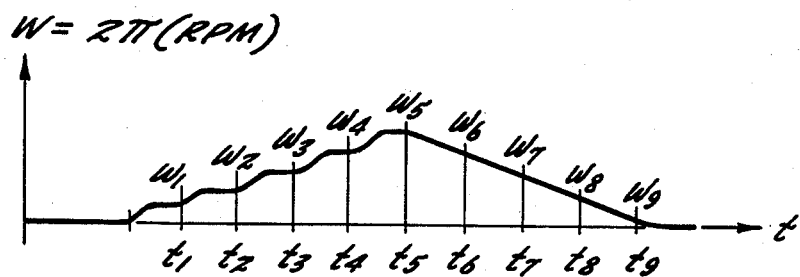
FIG. 3A is a graph of the time-varying angular velocity in a turning machine being stepwise accelerated and continuously decelerated for the calculation of constants of friction and moment of inertia, respectively.
Figure 3B:
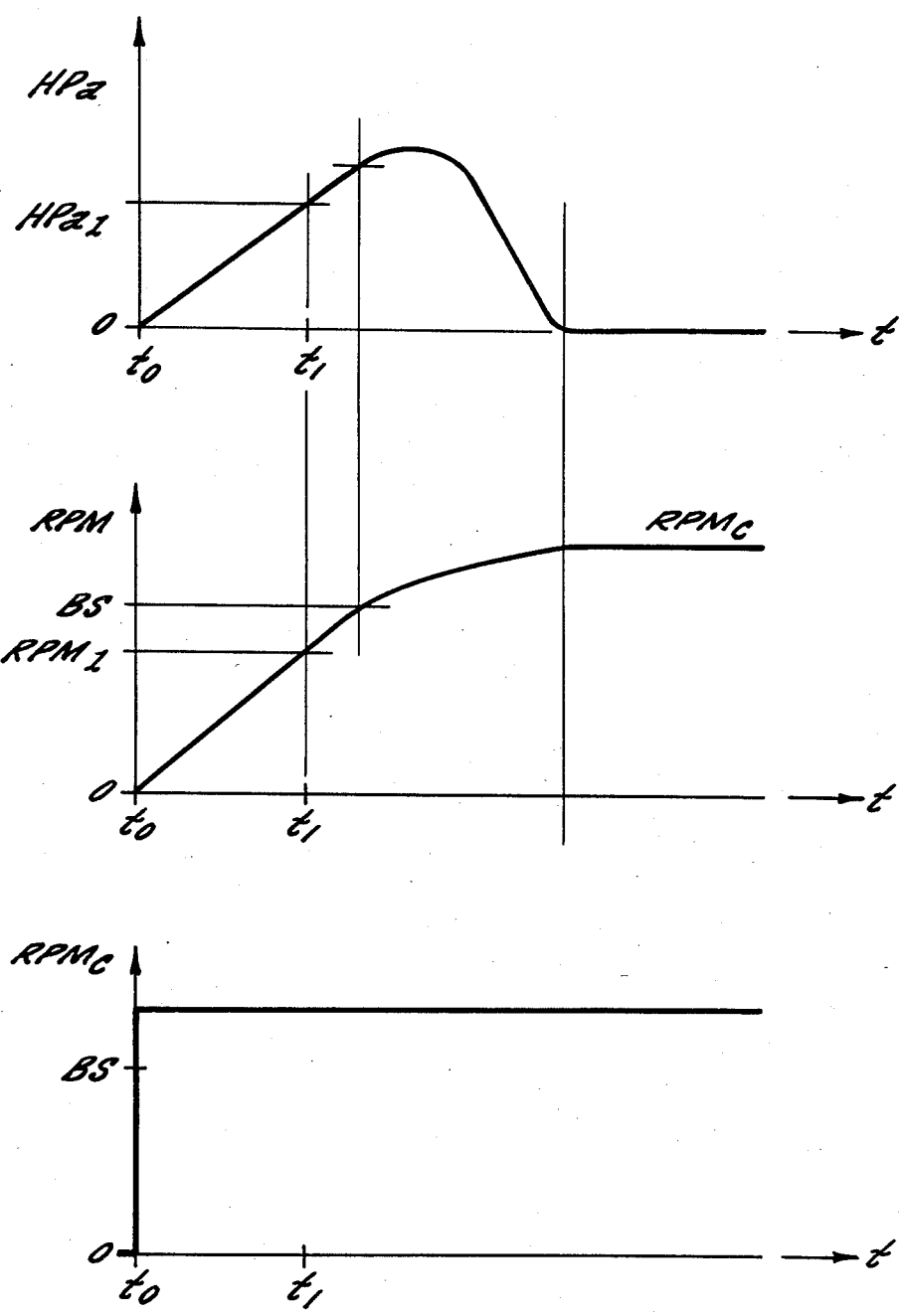
FIG. 3B is a graph of the horsepower due to acceleration, and the rotational velocity for a stepwise change in commanded drive velocity to a DC drive motor during the preferred procedure of accelerating the drive at a constant rate to determine the moment of inertia.

As shown in FIG. 3A, during an initial procedure the constants Ms and B estimating the frictional loss are determined during an initial stepwise acceleration of the drive and then the moment of inertia J is calculated during a continuous deceleration of the drive. Alternatively, for a DC drive motor, the moment of inertia J is quickly calculated during a subsequent acceleration by driving the DC motor with a large stepwise change in commanded drive velocity $RPM_c$, as shown in FIG. 3B. The DC drive motor responds automatically by continuously accelerating at a constant rate, at least so long as the rotational velocity RPM is less than the DC drive motor's base speed BS. This technique exploits the fact that a DC drive motor, as typically used in machine tools, has a constant maximum torque when operating below base speed BS.

Note that when the angular acceleration is constant, the time rate of change in the rotational velocity dRPM/dt is merely the time differential $(RPM_i - RPM_{i-1})/(t_i - t_{i-1})$. Thus, the moment of inertia J corresponding to the data in FIG. 3B is:

$$J = \frac{HP_a(t_1 - t_0)(63,000)}{(RPM_1)^2} \quad (2\text{-}13)$$

For the calculation and subsequent use of the moment of inertia J, the units conversion factor of 63,000 may be omitted if the factor is likewise omitted from the calculation of $HP_a$ according to equation (2-10). An exemplary numerical procedure for precisely carrying out these calculations and corrections to measured horsepower using a numerical control unit is discussed infra under subheading V, "Exemplary Embodiment of Adaptive Control Method for Controlling Cutter Tip Horsepower in a Turning Machine."

III. Adaptive Control of Machining Power

Figure 4:
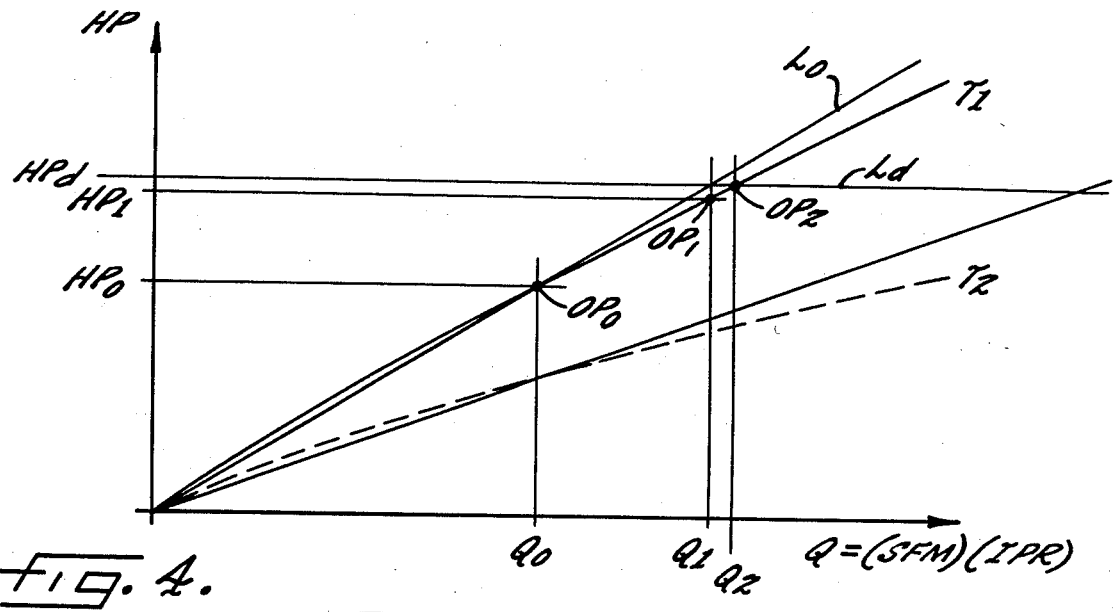
FIG. 4 is a graph of the response of the cutting power in a machine tool to the "relative machining rate" at which the machine tool is driven.

According to an important aspect of the present invention, an iterative adaptive control procedure is used to automatically control a relative machining rate control input Q in order to bring the machining power HP into conformance with a desired set point $HP_d$. In terms of the basic controllable machining parameters SFM and IPR, the relative machining rate Q is the product of SFM and IPR. As shown in FIG. 4, the functional relation between the independent variable Q and the dependent variable HP is both non-linear and time variant. The functional relations T1 and T2, for example, are measured at respective time intervals that are themselves widely spaced in time compared to the duration of the time intervals. Thus it is impossible to know in advance what value of commanded relative machining rate Q is needed to achieve a desired set point $HP_d$, due to the fact that there are other variables such as workpiece and cutter conditions that have a variable influence on the machining power HP.

As described in detail below, a machining parameter called the relative cutting efficiency CEFR as well as the relative machining rate Q are defined independently of the depth of cut D. The relative cutting efficiency CEFR is directly proportional to the actual cutting efficiency factor CEF if the depth of cut D is assumed to be constant. Similarly, the relative machining rate Q is directly proportional to the actual machining rate dC/dt if the depth of cut D is assumed to be constant. Consequently, the terms "relative cutting efficiency" and "relative machining rate" encompass the respective terms "actual cutting efficiency" and "actual machining rate". Any machining operation, for example, that is responsive to the actual cutting efficiency factor CEF necessarily is responsive to the relative cutting efficiency factor CEFR since the former is even more rigorous than the latter.

The applicants have discovered that the commanded relative machining rate Q required for a desired set point machining power $HP_d$ may be rapidly determined by an iterative procedure wherein the next value of commanded relative machining rate $Q_i$ is determined from the present value of relative machining rate $Q_{i-1}$ and the current measured value of machining power HP according to the iterative equation:

$$Q_i = (Q_{i-1})(HP_d)/(HP_{i-1}) \quad (3\text{-}1)$$

FIG. 4 illustrates graphically the solution to the iterative equation. Starting from a present value of relative machining rate $Q_0$, the present value of the machining power $HP_0$ is determined from the curve at T1 on the operating point $OP_0$. The iterative formula is equivalent to a linear extrapolation from the operating point $OP_0$ along a line $L_0$ through the origin to the horizontal set point line $L_d$. The intersection of line $L_0$ and $L_d$ has an abscissa that is the next value of relative machining rate $Q_1$. Repeating this graphical procedure, one finds that the next value of machining power is $HP_1$ and that at the end of the second iteration, a value of relative machining rate $Q_2$ is attained that is almost exactly the relative machining rate required for the set point $HP_d$. It should be noted, however, that even if the set point $HP_d$ is not changed, at some other time the functional relation T2 between the independent variable Q and the dependent variable HP may change from T1 to T2 (e.g., if the workpiece material becomes less hard) but the iterative procedure will automatically readjust the relative machining rate Q to achieve the set point $HP_d$.

Figure 5A:
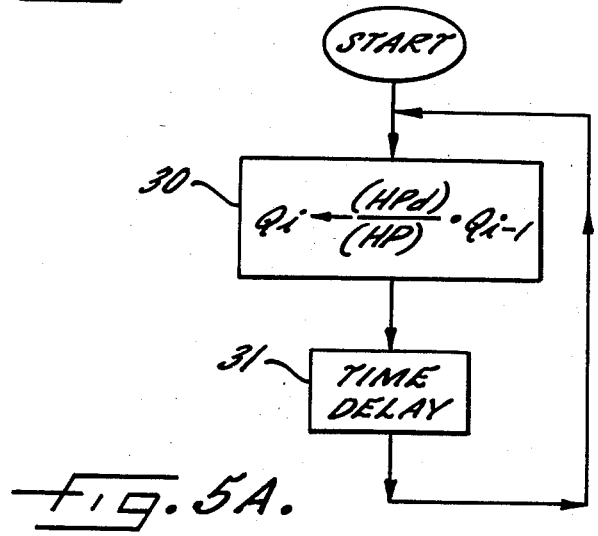
FIG. 5A is a simplified flow diagram of the control procedure for an iterative ratio control directly responsive to the previously calculated commanded machining rate.

In terms of a procedure in a numerical control unit, the simplified flowchart for the method is shown in FIG. 5A. The control loop consists of two main steps, a calculation step 30 which adjusts the value of the commanded relative machining rate Q by the ratio of the value of the set point $HP_d$ to the value of the machining power HP, and a time delay 31. The time delay is required in order to insure stability. The delay time must be longer than the time delay during which it is certain that the machine tool will respond to the commanded relative machining rate. Otherwise, there will be overshoot and oscillation in the step response of the system.

For a vertical turret lathe such as is shown in FIG. 1B, the response time of the spindle drive 17 is about 0.1 second and the response time of the tool feed 20 is approximately 0.01–0.02 second. So that the machine tool will properly respond to a change in commanded machining rate, the time delay 31 must be set to at least approximately four times the response time of the tool feed 20 or the spindle drive 17, depending on whether the tool feed or the spindle drive is adjusted to change the machining rate. But then the time delay 31 is substantial compared to the response of the overall adaptive control. If, for example, the machining parameters of the workpiece at the cutting interface change just after a new machining rate Q is calculated, the adaptive control could not possibly respond until after the time delay 31 and the next value of the machining rate is calculated. The time delay 31 is inherent, and cannot be compensated for by increasing the gain of the loop.

Furthermore, the gain of the adaptive controller varies inversely proportional to changes in the time delay 31, as is shown in section IV below.

For machine tools it is possible to distinguish between the commanded value of machining rate $Q_c$ and the actual or measured value of machining rate $Q_m$ so that the gain of the adaptive control system can be made independent of the time delay 31. As shown in the preferred procedure of FIG. 5B, the time delay 31 may be eliminated by calculating the commanded machining rate $Q_c$ as the product of the actual or measured machining rate $Q_m$ and the ratio of the desired horsepower $HP_d$ to the actual or measured horsepower HP. Elimination of the time delay gives significantly improved results since substantial changes in machining parameters of the workpiece at the cutter interface may, in some situations, occur within intervals of time shorter than the response time of the tool feed and spindle drive.

Figure 5B:
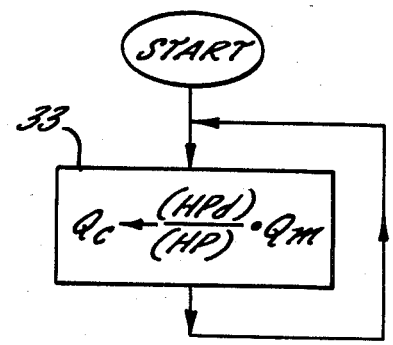
FIG. 5B is a simplified flow diagram of the control procedure for an iterative ratio control directly responsive to the current measured value of the commanded machining rate.
Figure 5C:
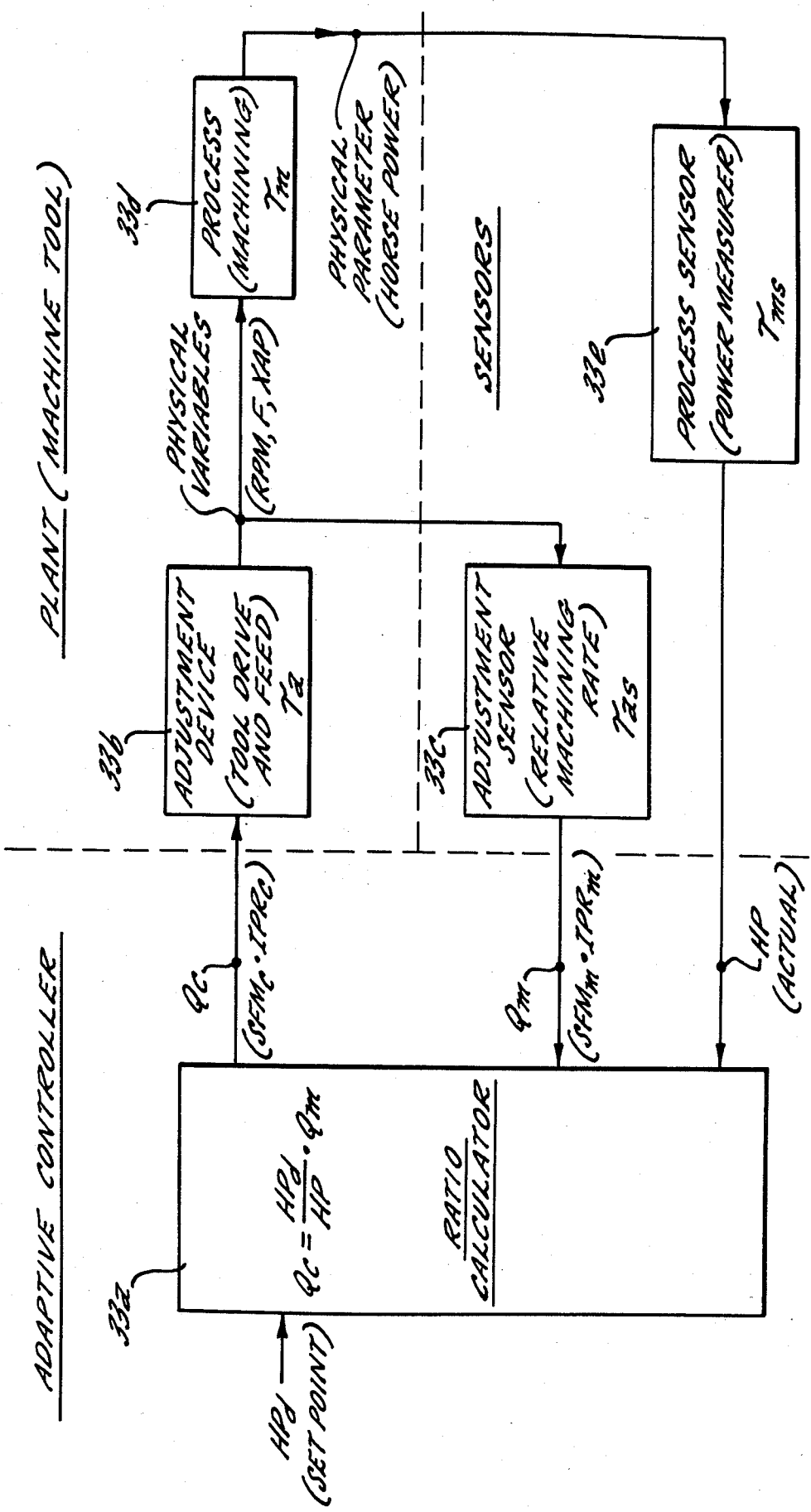
FIG. 5C is a simplified block diagram, conforming substantially to the FIG. 5B flow diagram for the preferred ratio control for machine tools.

A block diagram of the preferred machine tool control system using the method of FIG. 5B is shown in FIG. 5C. The components are identified in terms of a generalized system comprised of an adaptive controller using a ratio calculator 33a to control a machine tool comprising the tool feed and drive 33b, an adjustment sensor 33c, the machining process 33d, and the power measurer such as a wattmeter 33e. In general terms, the machine tool is the controlled physical system or "plant," and the tool feed and drive 33b is an "adjustment device" regulating the "process" 33d. The wattmeter 33e is a "process sensor" measuring the response of the process 33d to the adjustment device 33b. Note that in the machine tool field alterative process sensors could measure the force, temperature or vibration of the cutting tool in response to machine tool adjustments. In other words, for machine tools the process sensors preferably indicate various machining difficulties which increase with increased commanded machining rate. For mills or grinding machines, for example, the lateral force on the mill or the normal force on the grinding wheel, while not strictly proportional to the drive horsepower, may be a better indication of machining difficulty than the spindle or drive horsepower used in rotating the mill or grinding wheel against the workpiece.

The method of FIG. 5B is preferable to the method of FIG. 5A whenever the response time or time constant $\tau_a$ of the adjustment device 33b is substantial in comparison to the response times $\tau_m$ and $\tau_{ms}$ of the process 33d and the process sensor 33e. The input $Q_c$ produces the physical variables (e.g. RPM, and feed F) which are outputted by device 33b to form, in effect, the input to the process 33d; and in many cases such physical variables are easily measured by an adjustment sensor 33c having a negligible or a relatively short time constant $\tau_{as}$. The method of FIG. 5B would find useful application, for example, in controlling a nuclear reactor, wherein the adjustment device 33b positions a control rod, the process is a fission reaction, the commanded value $Q_c$ is a control rod position, and the process sensor 33e measures neutron flux which is the plant parameter to be controlled. The method of FIG. 5B may also be advantageously utilized in the control of machine tools, and especially turning machines, as described in greater detail below.

Generally speaking, the control procedure and system of FIGS. 5B and 5C is the preferred form of the invention for controlling turning machine tools. The preferred form illustrated by FIGS. 5B and 5C (also FIG. 13A', later described) acts with immunity from influence caused by the dynamic response time $\tau_a$ of the adjustment device 33b. That is, the dynamic response time $\tau_a$ has no effect on total open loop gain, and in consequence the sample time $\Delta t$ of a computer-implemented iterating system may be chosen without regard to such sampling time per se adversely influencing total system stability. Moreover, by choosing short sample times, a given plant (e.g., a given machine tool) may be adaptively controlled as to a given parameter (e.g., horsepower) with total loop lags or delays which are less with the FIG. 5B method than with the FIG. 5A method.

The common thread and generic advantage in the method embodiments illustrated by both FIG. 5A, on the one hand, and FIGS. 5B, C on the other hand, is that the ratio of set point value to the actual value of the controlled parameter results in a controller having what is, in effect, a variable gain that changes automatically to compensate for the time-variant and unforseeable changes in the transfer function of the controlled plant. While variable gains have been used in prior art systems for application to an error quantity created by subtracting an actual parameter value from a desired set point value, such subtractive error systems involve more complicated apparatus and manipulative steps. Using either a previously established commanded value or an adjustment sensor (33c) to estimate the value of the controlling physical variable, the ratio technique here described avoids the need for any modeling and provides a control system which responds rapidly to changes in plant characteristics.

In the controlling of machine tools such as the vertical lathe illustrated in FIG. 1B, the iterative method illustrated in FIG. 4, FIG. 5A and FIG. 5B has a theoretical basis in terms of a machining parameter known as the "cutting efficiency factor" CEF. Despite variations in feed velocity $F_c$ and rotational drive velocity RPM, the amount of energy required to remove a unit volume of material (here denoted $CEF_v$), is fairly constant for a given cutting tool with a given degree of sharpness acting on a given workpiece material. Mathematically:

$$CEF_v = \frac{HP}{(SFM)(A)} = \frac{HP}{(SFM)(IPR)(D)} \quad (3-2)$$

Note that no system of units is specified in Equation (3-2). Thus for $CEF_v$ to be expressed in terms of absolute units such as kilowatt-hours per cubic inch, the units of HP, SFM, IPR and D must be specified to determine a corresponding units conversion factor $K_f$. For $CEF_v$ in kilowatt-hours per cubic inch, HP in horsepower, SFM in feet per minute, and IPR and D in inches, the conversion factor is:

$$\frac{kilowatt - hr}{in^3} = (K_f) \frac{horsepower}{(ft/min)(in^2)} \quad (3-3)$$

$$K_f = 0.746 \frac{kilowatt}{horsepower} \cdot \frac{hr}{60 \, min} \cdot \frac{ft}{12 \, in} = 0.00136 \quad (3-4)$$

It is reasonable to assume that the depth of cut D is generally constant and the units conversion factor is ignored so that a "relative" cutting efficiency factor CEFR may be defined as:

$$CEFR = \frac{HP}{(SFM)(IPR)} = \frac{HP}{Q} \quad (3\text{-}5)$$

Note that when efficiency or sharpness of a cutter *decreases,* CEFR *increases,* and thus CEFR is a numerical measure of the cutting inefficiency. The same effect occurs as the workpiece material become harder in the sense of machinability.

The problem of adaptive control of a turning machine involves the determination of control signals to adjust controllable machining parameters such as feed velocity $F_c$ and drive velocity RPM so as to obtain a desired machining power $HP_d$, despite changing machining parameters that cause the actual machining power HP to deviate from the set point machining power $HP_d$, and while keeping machining parameters such as IPR and SFM within specified limits or constraints. According to an important feature of the present invention, the required new values for the controllable machining parameters are calculated with the assumption that the parameter CEFR, at the time the machining parameters are measured, will be the same in value when the system reaches the desired operation at the power setpoint $HP_d$. In fact, there may be some variation at the cutter interface and in CEFR. The assumption results, however, in rapid convergence of the measured machining power HP into agreement with the desired machining power $HP_d$ since the effective variation in CEFR is only a fraction of the variation in the machining power HP due to speed and feed changes.

For the turning machine here treated as a specific example, the parameter CEFR is calculated from sampled values $IPR_m$ and $SFM_m$:

$$IPR_m = F_c/RPM_m \quad (3\text{-}6)$$

$$SFM_m = 2\pi(R_m)(RPM_m) \quad (3\text{-}7)$$

$$CEFR = \frac{HP}{(SFM_m)(IPR_m)} = \frac{HP}{2\pi(F_c)(R_m)} \quad (3\text{-}8)$$

Then a relative machining rate may be calculated that will achieve a desired power $HP_d$ if CEFR does not actually change:

$$Q_c = (IPR_c)(SFM_c) = \frac{HP_d}{CEFR} = \frac{(IPR_m)(SFM_m)(HP_d)}{HP} \quad (3\text{-}9)$$

This Equation (3-9) gives a unique value for the relative machining rate $Q_c$ so that the product of $IPR_c$ and $SFM_c$ is defined. By picking a value for one of the latter commanded variables, the other may then be computed, and both applied as inputs to the control system. In some cases, constraints may be imposed to determine the specific values of $IPR_c$ and $SFM_c$. Some constraints are dictated by the machining process itself because of the workpiece material, the cutting tool composition and the cutting tool geometry. For the turning lathe here treated as a specific example, a maximum limit, $IPR_{max}$, for a given depth of cut D specifies a maximum cross-sectional area A of the workpiece material shavings 20 and thus the maximum force on the cutter tip 18. Exceeding $IPR_{max}$ may cause excessive chatter of the tool 10, preventing precise machining, and causing excessive tool wear or breakage. A minimum IPR, here called $IPR_{min}$, should always be maintained so that the shavings 20 break into chips 16 rather than long strips, thus preventing a large mass of shavings from accumulating and clogging the machine tool. A maximum SFM, here called $SFM_{max}$ should not be exceeded since the friction at the cutter tip 18 results in a heating effect proportional to SFM, and excessive heating may burn the cutter tip and quickly dull the edge of the cutter. Thus cutter manufactures usually specify an $SFM_{max}$ for cutters of various compositions. A minimum SFM, $SFM_{min}$, may also be specified. If operation of the turning machine below some minimum point ($IPR_{min}$, $SFM_{min}$) is required so as not to exceed $HP_d$, then the cutter 10 is probably dull and should be replaced. These four constants for the maximum and minimum values are selectable by a skilled machine operator or programmer; and for any given cutter and workpiece material they are manually keyed, or read with part program data, into the memory of a numerical control system.

Figure 6:
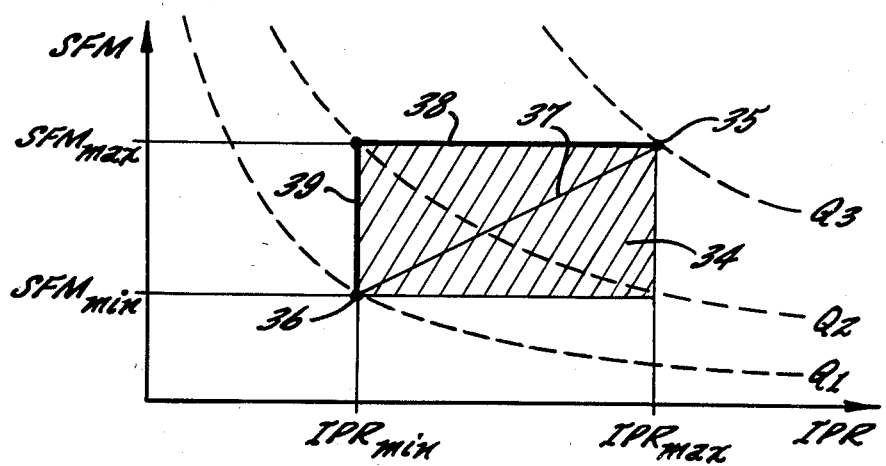
FIG. 6 is a graph of drive velocity in surface feet per minute versus feed velocity in inches per revolution showing the regions of permissible operation, the preferred operating points within the region of permissible operation, and the relative machining rate associated with the critical points of the region of preferred operation.

As shown in FIG. 6, the area bounded by the critical points ($IPR_{min}$, $SFM_{min}$) ($IPR_{max}$, $SFM_{min}$) ($IPR_{max}$, $SFM_{max}$), ($IPR_{min}$, $SFM_{max}$) represents a rectangle 34 of permissible operation. Curves $Q_1$, $Q_2$, $Q_3$ illustrate a family of curves, each of which defines the locus of constant horsepower as the product $Q = IPR \cdot SFM$ remains constant when IPR and SFM take on different values, providing that workpiece-cutter interface conditions, and thus CEFR, remain constant. If CEFR decreases or increases, any given one of the Q curve family then represents constant horsepower of a lower or higher magnitude.

In accordance with the present invention, if the existing actual values $IPR_m$ and $SFM_m$ (and thus $Q_m$) produce an actual horsepower HP which differs from the set point $HP_d$, then a new $Q_c$ is determined from Equation (3-9), a value of $IPR_c$ (or $SFM_c$) is picked, and the other commanded value $SFM_c$ (or $IPR_c$) is computed. For the exemplary constraint rectangle 34 of FIG. 6, both such commanded values are limited to reside in or on the rectangle as successively new commanded values direct the system to operate on different ones of the family of Q curves, it being assumed that CEFR remains constant. If conditions change at the workpiece-cutter interface (e.g., the tool becomes duller), and a horsepower error arises, the corrective action of Equation (3-9) readjusts $IPR_c$ and/or $SFM_c$ to a point on the applicable Q curve which results in elimination of the error.

The inventors have discovered that it is desirable, in actual practice, to operate the machine tool with the lowest IPR consistent with the objective of making actual horsepower equal to the set point $HP_d$. This reduces the forces on, and alleviates vibration at, the cutter tip for any given operating value of horsepower. Thus, once a new commanded value $Q_c$ is determined from Equation (3-9), a value of SFM is picked to equal the maximum value $SFM_{max}$ represented by the line 38 in FIG. 6, and a corresponding value of $IPR_c$, as required to produce $Q_c$ in the machine, is determined from Equation (3-9). If this procedure results in a computed $IPR_c$ which is less than $IPR_{min}$, the operating point is restricted to lie on the minimum constraint line 39. If the minimum product point 36 (here, $Q_1 = IPR_{min} \cdot SFM_{min}$) is reached, corrective action is taken such as a "feed hold" which terminates machining or reversing the direction of the tool feed velocity $F_c$ so that the cutter tool 10 is disengaged from the workpiece 12 and may be replaced with a sharp tool. Alternative corrective action could comprise only stopping the feed or drive, or merely displaying a suitable message to the operator. A "feed hold" could also be executed only upon the minimum product point being reached a preselected number of times within a preselected time period.

In the preferred embodiment, the selection of one commanded value and the computation of the other commanded value (namely, the values of $IPR_c$ and $SFM_c$) is carried out according to the range in which the computed value of $Q_c$, from Equation (3-9), falls:

If $Q_c \geq Q_3 \equiv (IPR_{max})(SFM_{max})$ then set  (3-10)
$SFM_c = SFM_{max}$
$IPR_c = IPR_{max}$
DISPLAY "HP UNDER UTILIZED" ($HP_d$ may be raised)

If $(IPR_{min})(SFM_{max}) \equiv Q_2 \leq Q_c \leq Q_3 \equiv$  (3-11)
$(IPR_{max})(SFM_{max})$ then set
$SFM_c = SFM_{max}$ $$IPR_c = \frac{Q_c}{SFM_{max}} = \left[\frac{(IPR_m)(HP_d)}{(HP)}\right]\left[\frac{(SFM_m)}{(SFM_{max})}\right]$$

If $(IPR_{min})(SFM_{min}) \equiv Q_1 \leq Q_c \leq Q_2 \equiv$  (3-12)
$(IPR_{min} \cdot SFM_{max})$ then set $$SFM_c = \frac{Q_c}{IPR_{min}} = \left[\frac{(SFM_m)(HP_d)}{(HP)}\right]\left[\frac{(IPR_m)}{(IPR_{min})}\right]$$

$IPR_c = IPR_{min}$
If $Q_c < Q_1 \equiv (IPR_{min})(SFM_{min})$ then  (3-13)
TAKE CORRECTIVE ACTION
(E.G. Feed Hold and Change Tool)

The machine controllable parameters then are determined from $IPR_c$ and $SFM_c$:

$$RPM_c = SFM_c / 2\pi R_m \quad (3\text{-}14)$$

$$F_c = (IPR_c)(RPM_m) \quad (3\text{-}15)$$

It should be noted that in (3-10) a message "HP UNDER UTILIZED" is displayed to the operator to indicate that the machining process is limited by IPR and SFM constraints rather than the desirability of operating at the operator-selected or part-program selected set point horsepower $HP_d$. No corrective action need be taken, but the operator could consider increasing the $IPR_{max}$ and $SFM_{max}$ constraints via manual override controls, described further below. The operator could also consider whether the actual or programmed depth of cut is too small.

In Equation (3-11) it should be noted that for operation on the constant SFM segment 38 of FIG. 6, $SFM_m$ will equal $SFM_{max}$ so that:

$$IPR_c = \frac{(IPR_m)(HP_d)}{(HP)} \quad (3\text{-}11A)$$

In other words, the commanded value of the feed rate is obtained by multiplying the measured value of the feed rate by the ratio of the desired horsepower to the measured horsepower. Similarly, in Equation (3-12) for operation on the constant IPR segment 39, $IPR_m$ will equal $IPR_{max}$ so that:

$$SFM_c = \frac{(SFM_m)(HP_d)}{(HP)} \quad (3\text{-}12A)$$

A schematic of an exemplary control system according to the control method of the present invention is shown in FIG. 7 driving a conventional vertical turret lathe generally designated 40. Operation of the lathe is performed by three motors; a drive motor $M_d$, an X direction tool feed motor $M_x$ and a Z direction tool feed motor $M_z$. These motors are driven by control signals RPMVC, VMX, and VMZ respectively. The feed motors, $M_x$, $M_z$ are driven directly by servo drive amplifiers 41 and 42 respectively. The drive motor $M_d$ is controlled by a separate analog feedback loop which receives a drive tachometer signal $RPM_m$ for comparison to the control signal RPMVC using a differential drive amplifier 43 so that the drive control signal RPMVC commands a particular RPM value. As in conventional turret lathes, resolvers, Inductosyn devices, or pulse generators working into counters generate position indicating signals XAP, ZAP representing the actual position of the cutter tool, so that the velocity and position of the tool feed can be determined and precisely controlled.

The components of the vertical turret lathe generally designated 40 described above are well known in the art. In accordance with an important aspect of the present invention, an electronic wattmeter generally designated 44 senses the electrical power consumed by the drive motor $M_d$ and generates a power sensing signal $W_m$ which indicates measured drive power. A suitable electronic wattmeter is the OSIDC Watt Transducer model PC8-4-04 manufactured and sold by Ohio Semitronics, 1205 Chesapeake Avenue, Columbus, Ohio 43212. Other components of the system in FIG. 7 have the same physical appearance and construction as components well known in the art, such as an operator station terminal 45 having a keyboard 91 and cathode ray tube display 92, a part program tape drive 46, and a numerical control unit 47 having an input analog to digital (A/D) converter 48 and an output digital to analog (D/A) converter 49. The numerical control unit 47, however, is configured in a novel fashion by stored programming in a form schematically represented by the functional components generally designated 50. These functional components comprise a part program 51, an axis control unit 52, and an adaptive control unit 53.

In accordance with an important aspect of the present invention, the adaptive control unit 53 receives a set point signal $HP_{dp}$, and several control values $IPR_{cp}$, $SFM_{cp}$ comprising the maximum and minimum limits for IPR and SFM, and compares these programmed values to the actual cutter tip horsepower calculated from the watt meter signal $W_m$, the cutter position signals XAP and ZAP and the drive tachometer signal $RPM_m$, to generate command signals $IPR_c$ and $SFM_c$ in order to adaptively control the vertical turret lathe 40 so that the actual cutter tip power is maintained as closely as possible to the set point $HP_{dp}$. The axis control 52 receives the command signals $IPR_c$ and $SFM_c$ and also the position signals ZAP, XAP and generates machine control signals ZVC, XVC and $RPM_c$ that adjust the motor drive signals VMX, VMZ and RPMVC, so that the machine tool contours the workpiece according to a contour programmed in the part program memory 51 as X and Z coordinates XCEP, ZCEP. The axis control 52, however, also receives some miscellaneous MISC commands from the part program 51 in order to perform interpolation and some control functions peculiar to the adaptive control method of the present invention.

Figure 8:
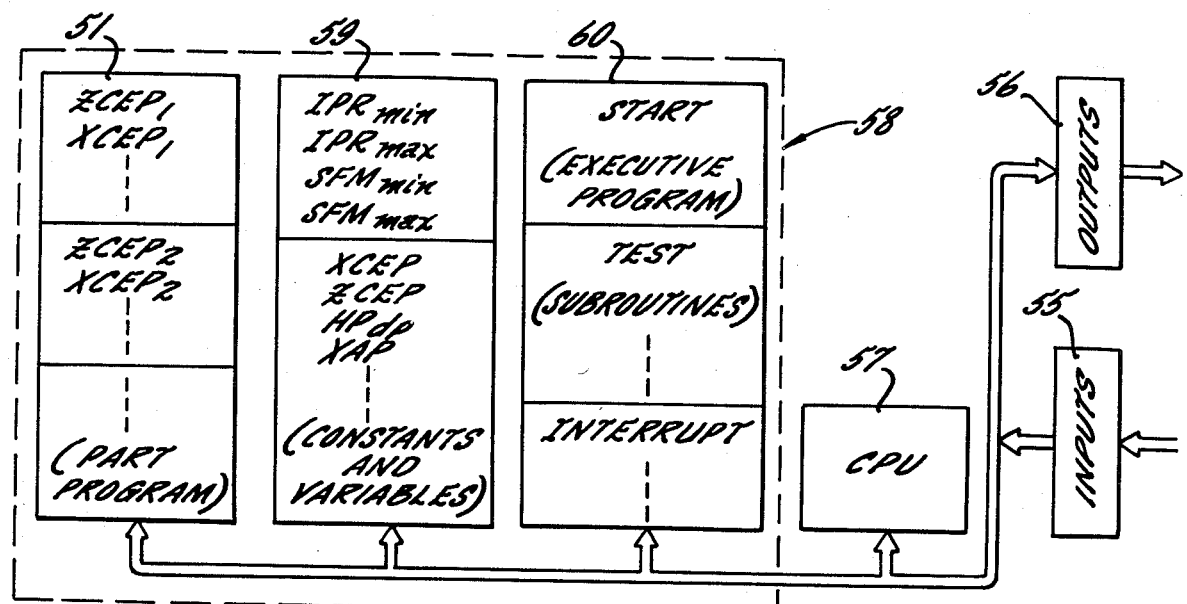
FIG. 8 is a schematic diagram of the hardware of the numerical control unit used in the exemplary embodiment of FIG. 7.

It should be noted that although the functions generally designated in the block 50 are schematically shown, the hardware for performing these functions has the general appearance of a numerical control unit generally designated 50' in FIG. 8. The numerical control unit has, for example, input registers 55, output registers 56, a central processing unit 57 which performs logical and algebraic functions, and a memory generally designated 58 for storing constants, variables, machine instructions and other data at predetermined addresses. In accordance with an exemplary embodiment of the present invention, the memory 58 is subdivided into three main parts; the part program memory 51, a working memory of constants and variables 59, and an adaptive control procedure memory 60 containing a sequence of instructions for execution by the central processing unit 57 in order to configure the numerical control unit 50' in the functional form generally designated 50.

The part program 51 is organized into a sequence of blocks, with each block being associated with the movement of the cutting tool between two pairs of X, Z coordinates. In each block a pair of target coordinates (XCEP, ZCEP) is stored. Also each block contains block constants describing how the numerical control unit 47 will function during the time that the cutter is moving to the target coordinates of a particular block from the last set of target coordinates. It should be noted that each time a new pair of target coordinates is read from the part program 51, the block constants, such as $IPR_{min}$, $IPR_{max}$, $SFM_{min}$, $SFM_{max}$ and the set point $HP_{dp}$ are also read and transferred with the target coordinates to the constant and variable storage 59. Although these block constants may change between blocks in the part program memory 51, they are essentially constant as far as the adaptive control procedure is concerned.

The general configuration of the adaptive control procedure follows the conventional configuration of an executive program, numerous subroutines called by the executive program, and a few interrupt routines which are automatically executed at periodic rates. The precise set and sequence of instructions in the adaptive control procedure, however, is highly detailed, the details being a matter of the programmer's choice. An exemplary embodiment of the instruction sequence is discussed infra in sub-heading V, "Exemplary Embodiment of Adaptive Control Method for Controlling Cutter Tip Horsepower in a Turning Machine."

Figure 9:
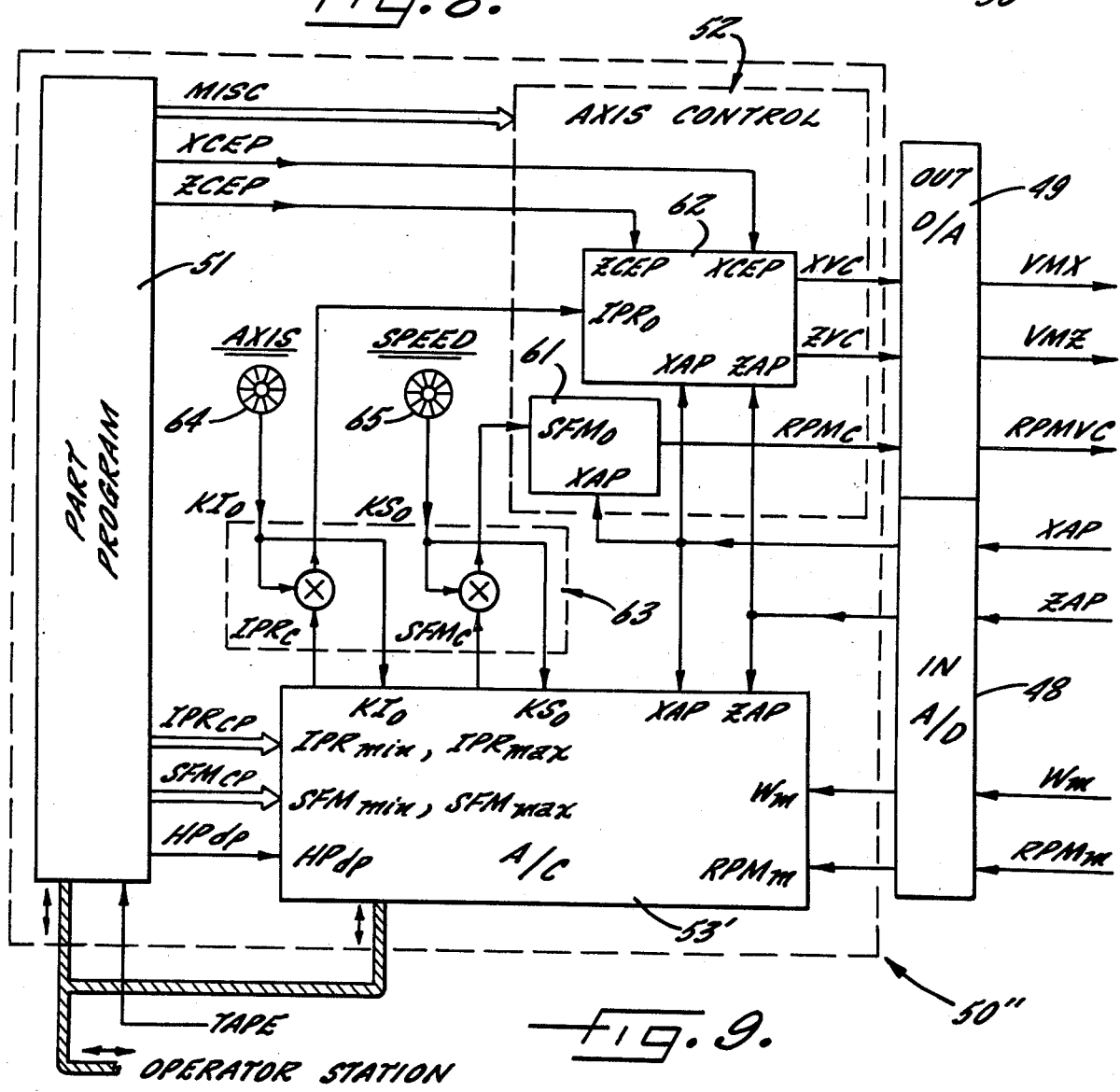
FIG. 9 illustrates the addition of override controls for scaling the feedrate and drive velocity command signals in the exemplary embodiment of FIG. 7.

The functions generally designated 50 in FIG. 7 may be expanded to include more detail and additional features as shown in FIG. 9. The AXIS control 52, in particular, has a functional block 61 for generating the rotational velocity control signal $RPM_c$ from an SFM control signal $SFM_o$ by essentially dividing the value of $SFM_o$ by the radius $R_m$ measured in terms of the actual X coordinate position XAP. The AXIS control 52 also has an interpolator 62 which generates the cutter feed control signals XVC and ZVC so that the desired cutter coordinates XAP, ZAP track the programmed cutter coordinates XCEP, ZCEP in a desired fashion and so that the cutter tool is driven at a resultant feed velocity $F_c$ set by the control signal $IPR_o$.

FIG. 9 also includes an override function 63 which receives a scale factor $KI_o$ from an "AXIS" control 64 and a scale factor $KS_o$ from a "SPEED" control 65 and scales the command signals $IPR_c$ and $SFM_c$ from the adaptive control unit 53' to generate the control inputs $IPR_o$, $SFM_o$ to the axis control 52 according to:

$$IPR_o = (IPR_c)(KI_o) \quad (3\text{-}16)$$

$$SFM_o = (SFM_c)(KS_o) \quad (3\text{-}17)$$

The AXIS control 64 and SPEED control 65 may be potentiometers, digital controls or thumbwheel switches for directly entering the values $KI_o$, and $KS_o$ or numeric values for $KI_o$, $KS_o$ may be keyed in from the operator station 45. In either case, the AXIS 64 and SPEED 65 controls correspond to override controls conventionally used to allow the machine operator to introduce "override" adjustments on the "SPEED" or SFM or the "AXIS" or IPR parameters to vary the machining rate Q. The controls 64 and 65 are typically calibrated in terms of a percentage factor to be applied to the programmed IPR and SFM.

In accordance with an important feature of the present invention, the adaptive control unit 53' receives the scale factors $KI_o$ and $KS_o$ as inputs so as to be compatible with user adjustable override controls 64, 65 for adjustment of the desired machining power by independently scaling the individual machine control input signals $IPR_o$, $SFM_o$, despite the general tendency of the simplified adaptive control unit 53 of FIG. 7 to compensate for gain variations in the response of the machine to the individual control signals $IPR_o$, $SFM_o$. By way of example, if the adaptive control unit 53 of FIG. 7 is used in place of the adaptive control unit 53' of FIG. 9, then if the operator reduces $IPR_o$ and $SFM_o$ by setting, for example, the AXIS and SPEED controls to 50% corresponding to a value of one-half for $KI_o$ and $KS_o$ then the AXIS control would initially reduce the feed velocity signals XVC, ZVC and $RPM_c$ by 50%, but the resulting reduction in machining power sensed from the corresponding reduction in the measured cutter tip horsepower would cause the adaptive control unit 53 to increase the control outputs $IPR_c$, $SFM_c$ until the AXIS control inputs $IPR_o$, $SFM_o$ were increased to their initial values before the AXIS 64 and SPEED 65 adjustors were turned down.

Applicants have discovered that this undesirable tendency of the adaptive control unit to cancel any operator's override adjustment may be eliminated by also feeding the scale factor signals $KI_o$ and $KS_o$ to the adaptive control unit 53' and using these scaling factors to adjust the comparison of the machining horsepower to the programmed or primary set point $HP_{dp}$. The adaptive control unit 53' functions, in effect, to scale and hold the programmed set point $HP_{dp}$ by the same scaling factors to arrive at the corrected and actual horsepower set point $HP_d$. The preferred method of interfacing the conventional AXIS 64 and SPEED 65 adjustors to the adaptive control unit 53', so that the latter does not restore $IPR_o$ and $SFM_o$ to values originally existing before any change in the scale factors $KI_o$ and $KS_o$, is to create the horsepower set point signal $HP_d$ by multiplying the "programmed set point" $HP_{dp}$ by the factor $(KI_o)(KS_o)$ according to the relation:

$$HP_d = (KI_o)(KS_o)(HP_{dp}) \quad (3\text{-}17)$$

If the AXIS factor $KI_o$ is reduced from 100% to 90%, for example, when the adaptive control is operating on the constant $SFM_{max}$ line 38 in FIG. 6, then $IPR_o$ is reduced 10% by the change in $KI_o$ and causes the actual feed velocity $F_c$ to be reduced by 10%; the measured cutter tip power $HP_m$ will drop by about 10% due to this reduction in feed rate, but the set point horsepower signal $HP_d$ as formed according to Equation (3-17) also drops by 10%. Since the constant SFM control Equation (3-11) sets $IPR_c$ proportional to $HP_d/HP_m$, $IPR_c$ will not significantly change. This leaves the adjustor 64 effective to produce $IPR_o$ reduced by 10% from its original value and the system operates with its horsepower set point $HP_d$ automatically reduced by 10% from its original value. In general, the compensation according to Equation (3-17) causes the commanded values $IPR_c$ and $SFM_c$ to remain essentially unchanged so that the values of $IPR_o$ and $SFM_o$ are scaled by manipulation of the adjustors 64 and 65—and this is accompanied by scaling the programmed horsepower primary set point signal $HP_{dp}$ by the same factors to arrive at the final and effective horsepower set point $HP_d$.

IV. Generalized Adaptive Control Methods

Figure 10A:
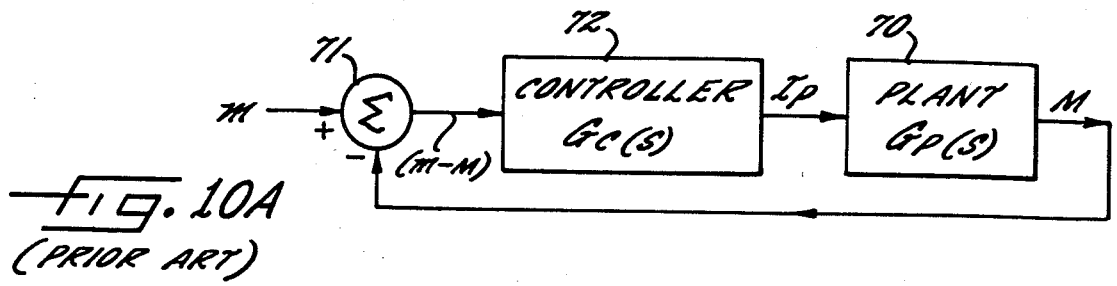
FIG. 10A, labeled prior art, is a block diagram of the conventional prior art control loop.

In light of the foregoing, it may be now understood that the invention is more broadly characterized than the exemplary embodiment of a control system for a machine tool. As shown in FIG. 10A, the conventional feedback control for a physical system 70, termed the "plant" in control theory, having a transfer function $G_{P(s)}$ arithmetically compares the system output M to a set point value m using a comparator 71 to arrive at a difference signal (m-M) which is processed by a control function $G_{C(s)}$ in a "controller" 72 to generate an input signal $I_p$. The system output M may be solved for in terms of the set point m according to:

$$G_{P(s)} = M_{(s)}/I_{p(s)} \tag{4-1}$$

$$I_{p(s)} = G_{C(s)}(m_{(s)} - M_{(s)}) \tag{4-2}$$

$$M_{(s)} = G_{C(s)} G_{P(s)}(m_{(s)} - M_{(s)}) \tag{4-3}$$

$$M_{(s)} = \frac{(m_{(s)} G_{C(s)} G_{P(s)})}{1 + G_{C(s)} G_{P(s)}} \tag{4-4}$$

The subscript (s) denotes that all of the variables are frequency-dependent and may be analyzed in the Laplace domain. Thus Equation (4-4) shows that for the output M to track or follow the set point m, it is desirable for the magnitude of the control function $G_{C(s)}$ to be as large as possible so that the open loop gain, defined as $G_{C(s)}G_{P(s)}$ is large. But the magnitude of the control function cannot be made arbitrarily large because in practice there is a frequency-dependent phase shift in the plant transfer function $G_{P(s)}$ so that at some frequency, the open loop gain is $-1$ and the denominator in Equation (4-4) goes to zero, thereby signalling instability. In practice, the control function $G_{C(s)}$ may be made frequency dependent so as to counteract or compensate the phase shift in the plant transfer function $G_{P(s)}$. One typical method of selecting the control gain $G_{C(s)}$ to compensate an arbitrary plant transfer function is to use an integrator having a frequency dependency according to:

$$G_{C(s)} = k/s \tag{4-5}$$

Then the performance of the feedback control system may be simply but conveniently characterized by k, termed the "response factor," since k describes how fast the input $I_p$ responds to the error (m-M) according to:

$$dI_p/dt = k(m-M); \; sI_{p(s)} = k(m_{(s)} - M_{(s)}) \tag{4-6}$$

In practice, it is desirable to set the response factor k to as large a value as possible while simultaneously achieving stability.

A specific problem recognized by the applicants in the field of machine control is that if the machine tool is represented by a plant transfer function $G_{P(s)}$, the transfer function is time variant and in particular its magnitude even at very low frequencies is highly variable so that the optimum value for k in Equation (4-5) is also time variant. The applicants recognized that although this is true for machine tools, as exemplary embodiments of a control system particularly adapted to machine tools have been described supra, there are other time variant systems in which the control system according to the present invention is useful.

Figure 10B:
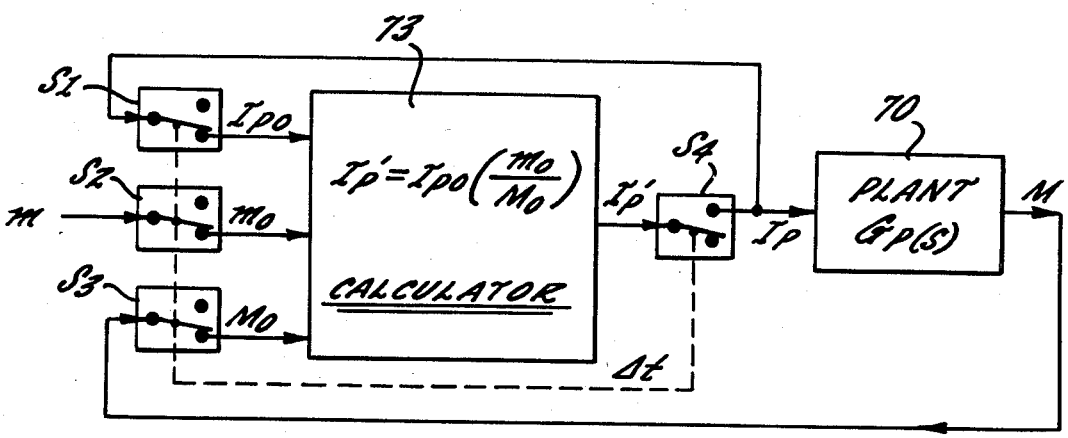
FIG. 10B is a generalized block diagram of one embodiment of the present invention as illustrated in broad functional terms.

As shown in FIG. 10B, the applicant's invention corresponding to the method of FIG. 5A may be adapted to the arbitrary system or plant 70 by the use of a calculator 73 which performs a ratio type rather than a difference or error comparison. In other words, the applicants have discovered that an error signal may be conveniently generated by dividing the target value m by the output M rather than just by subtracting the output M from the target value m. In FIG. 10B, the calculator 73 is interfaced to the plant 70 and set-point or target m by samplers S1, S2, S3 and S4. The samplers provide a delay function so that the output $I_p'$ of the calculator is never fed back directly to the input $I_{po}$. Preferably the input samplers S1, S2, and S3 are periodically switched in opposite phase to the output sampler S4, the sampling period being denoted $\Delta t$. The combination of the calculator 73 and the samplers S1–S4 may be embodied in an iterating, computer-implemented numerical control unit with executive programming (to be described), the numerical control unit having input and output A/D and D/A converters such as shown at 48 and 49 in FIG. 7.

Figure 10C:
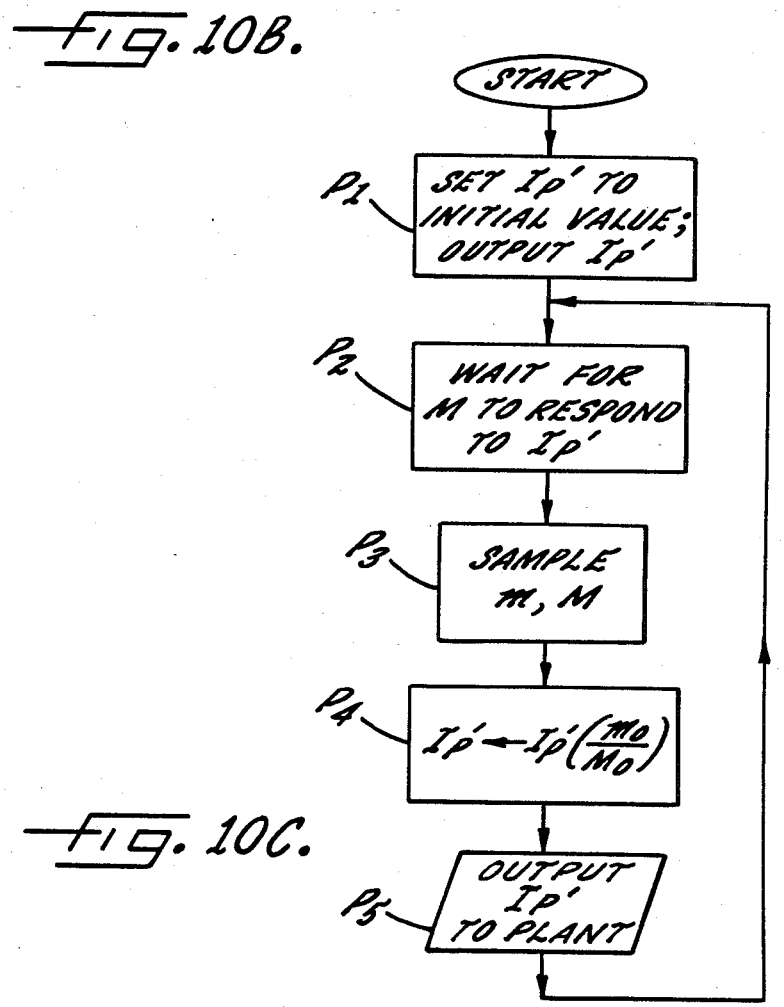
FIG. 10C is a flowchart of the numerical procedure for implementing the block diagram of FIG. 10B in a numerical control unit.

To perform the calculator 73 functions indicated in FIG. 10B, the procedure shown in FIG. 10C is executed by the numerical control unit. The first step P1 is for the numerical control unit to assume and send in an initial value for the input $I_p'$. After waiting a delay time for the output M of the system 70 to respond to the input $I_p'$ as shown in step P2, the numerical control unit in step P3 samples the set point m and the system output M. In step P4, the numerical control unit adjusts its value of $I_p'$ by the ratio of the sampled, actual value of the set point $m_o$ divided by the sampled value of the system output parameter $M_o$. In step P5, this adjusted value is outputted to the system. The iterative loop is completed by returning to step P2 to wait for the system output M to respond to the new input $I_p'$ before continuing.

To compare the iterative control system and procedure of FIGS. 10B and 10C with the prior art system of FIG. 10A, the algebraic comparison of the calculator equation of the numerical control unit equation in step P4 may be mathematically converted to differential form to arrive at a subtractive expression for error:

$$I_p' = I_{po}\left(\frac{m_o}{M_o}\right) \tag{4-7}$$

$$I_p' - I_{po} = I_{po}\left(\frac{m_o}{M_o} - 1\right) \tag{4-8}$$

-continued $$I_p' - I_{po} = \frac{I_{po}}{M_o}(m_o - M_o) \tag{4-9}$$

$$I_p' - I_{po} \approx \Delta t \frac{dI_{po}}{dt} \tag{4-10}$$

$$\frac{dI_p}{dt} = \frac{1}{\Delta t}\left(\frac{I_{po}}{M_o}\right)(m_o - M_o) \tag{4-11}$$

$$k_a \approx \frac{1}{\Delta t}\left(\frac{I_{po}}{M_o}\right) = \frac{1}{\Delta t \, G_p} \tag{4-12}$$

Thus, the embodiment of the invention shown in FIG. 10B is somewhat analogous, in result but not in method or apparatus, to a subtractive error, integrator type controller; but in startling contrast to such an integrator type controller, the present invention results in a response factor $k_a$ being automatically set inversely proportional to the plant gain $G_p \approx G_{p(s)}$ at $s=0$, i.e., for the low frequency range of the plant transfer function. Somewhat surprisingly, the response factor $k_a$ for the apparatus of FIG. 10B is also inversely proportional to the sampling period $\Delta t$. This may be undesirable in some cases because one may wish to make $\Delta t$ as small as possible in order to have the value of the input $I_p$ to the plant change nearly continuously. On the other hand, the FIG. 10B embodiment in theory removes any error in a single iteration (unlike the integrator of FIG. 10A), and should result in full convergence of the control parameter actual values to the set point after only a few iterations.

To secure the advantages of the present invention while at the same time permitting a short sampling interval $\Delta t$, the procedure of FIG. 5B and the apparatus embodiment of FIG. 5C may be used. By that procedure, the effect of the sampling period $\Delta t$ on the gain or response factor $k_a$ is eliminated. Thus, Equation (4-12) with the term $\Delta t$ removed becomes applicable. The response factor $k_a$, in effect, becomes automatically inversely proportional to the process transfer function where $Q_m$ is treated as the process input and $Q_c$ is the input command to the adjustment device 33b. Since the iteration periods can now be quite short, the apparatus of FIG. 5C applied to the control of a given process can be made to operate with the aggregate of lags or delays around the closed loop smaller than such aggregate in the apparatus arrangement of FIG. 10B.

As another alternative to secure an effective response factor inversely proportional to plant gain, but permitting short sampling periods $\Delta t$, the calculator 73 in FIG. 10B may be modified also to perform an interpolation or digital filtering function, for example, according to:

$$I_p'' = I_{po}\left(\frac{m_o}{M_o}\right) \tag{4-13}$$

$$I_p' = \frac{I_p'' + (N-1)I_{po}}{N}$$

or equivalently:

$$I_p' = I_{po}\frac{\frac{m_o}{M_o} + N - 1}{N} \tag{4-14}$$

where N is a user-selected number of sampling periods required to effectively determine the operating point for the plant. Equations (4-13) and (4-14) can be converted to differential form to show that the response factor for interpolation or filtering is reduced inversely proportional to the product of $\Delta t$ and N according to:

$$I_p' - I_{po} = I_{po}\left[\frac{\frac{m_o}{M_o} - 1}{N}\right] \tag{4-15}$$

$$I_p' - I_{po} = \frac{1}{N}\left(\frac{I_{po}}{M_o}\right)(m_o - M_o) \tag{4-16}$$

$$\frac{dI_p}{dt} \approx \frac{1}{N\Delta t}\left(\frac{I_p}{M_o}\right)(m_o - M_o) \tag{4-17}$$

$$k_{an} = \frac{1}{N\Delta t}\left(\frac{I_p}{M_o}\right) = \frac{1}{N\Delta t \, G_p} \tag{4-18}$$

Thus it can be seen that the response factor $k_{an}$ can be made arbitrarily small by making N arbitrarily large. In practice, other known methods of interpolation and digital filtering may be used, as is illustrated and described below in conjunction with the subroutine FILTER of FIG. 13F, generally designated 210.

It should be noted that the numerical control step P4 of FIG. 10C may be put into differential form, thereby making the arithmetic comparison explicit according to:

$$I_p' \leftarrow I_p' + \frac{I_p'}{M_o}(m_o - M_o) \tag{4-19}$$

For interpolation, the step P4 in the numerical procedure is:

$$I_p'' \leftarrow I_p'\left(\frac{m_o}{M_o}\right) \tag{4-20}$$

$$I_p' \leftarrow \frac{I_p'' + (N-1)I_p'}{N}$$

or equivalently in terms of a single step according to:

$$I_p' \leftarrow I_p' + \frac{1}{N}\left(\frac{I_p'}{M_o}\right)(m_o - M_o) \tag{4-21}$$

Summarizing Equations (4-1) to (4-21), it has been shown that the ratio control method of the present invention provides a controller response factor which changes automatically so as to be inversely proportional to the transfer function of the controlled plant—at least for zero or the lower ranges of frequencies encountered. When the plant gain and transfer function are, as here, unforeseeably time variant, such inverse change of the controller response keeps the system parameter in agreement with the set point. In terms of understanding this advantageous operation, it may be seen that the method and apparatus of the present invention produces the same sort of performance results as a subtractive error system (FIG. 10A) with a controller 72 having an integrator that somehow automatically time varies its integration factor $k_a$ such as to keep the latter always inversely proportional to the plant transfer function.

Figure 10D:
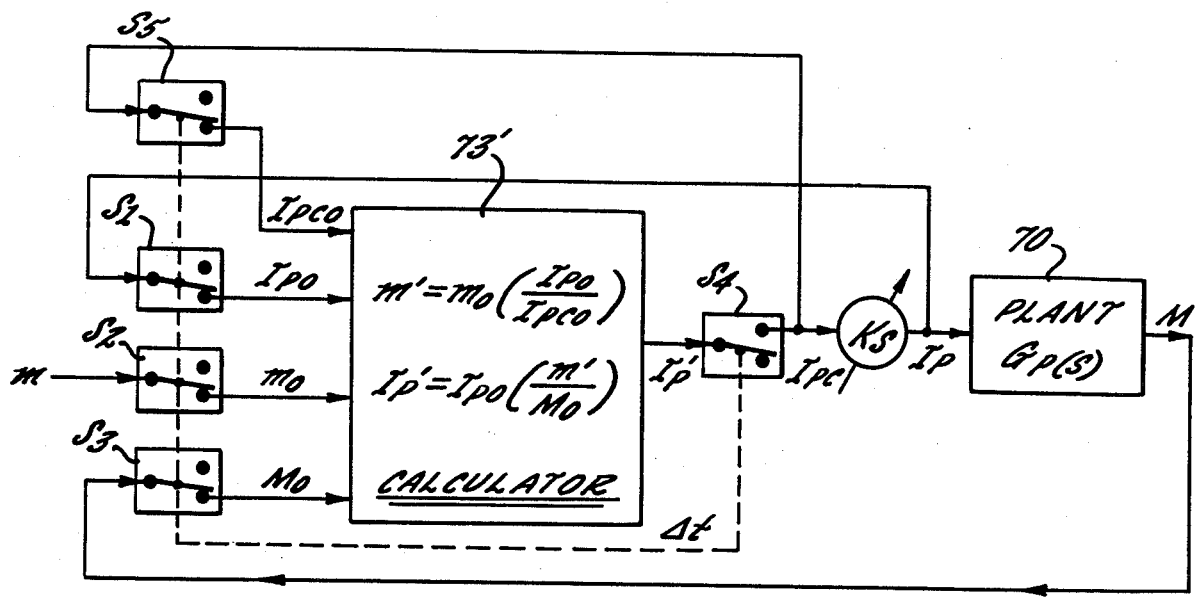
FIG. 10D is a block diagram corresponding to FIG. 10B with the addition of an override control for scaling the control signal in the control loop.
Figure 10E:
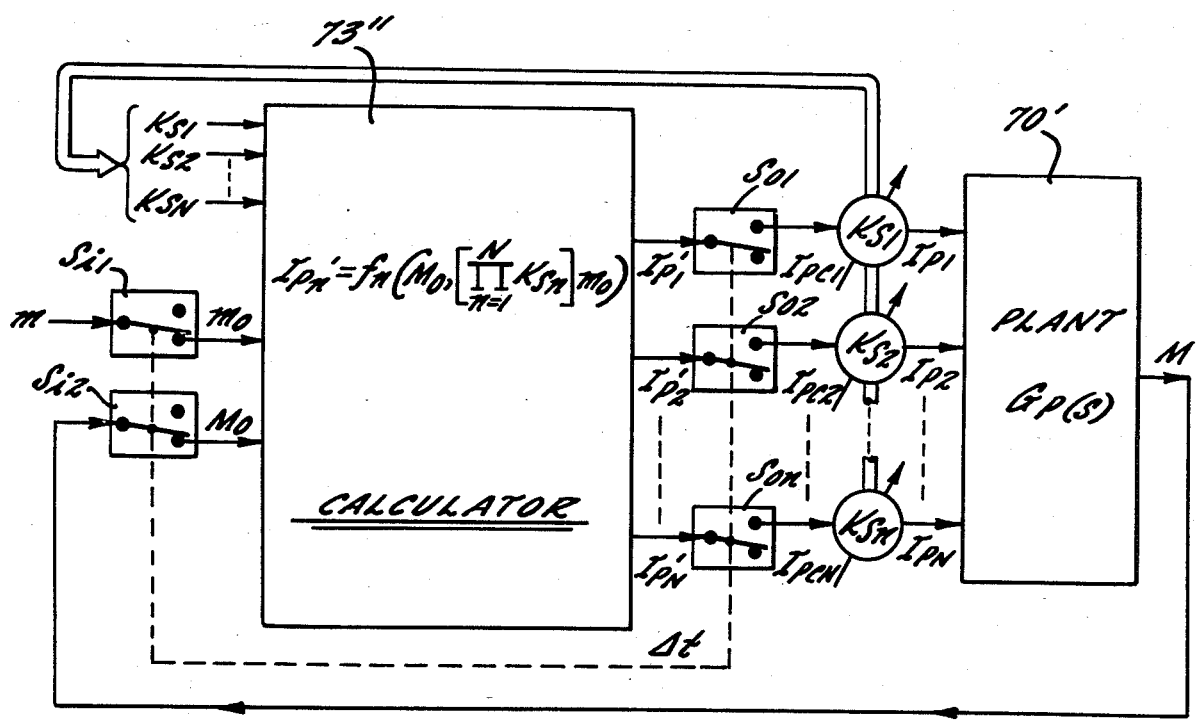
FIG. 10E is a block diagram illustrating a system corresponding to the block diagram of FIG. 10D but with the addition of a plurality of override controls.

The override feature of FIG. 9 may, of course, be incorporated into any embodiment of the present invention. This has been illustrated by the generalized showing in FIG. 10D wherein the calculator 73' responds also to the human operator-adjusted value of the scale factor $k_s$ by taking the ratio of $I_{po}$ and $I_{pco}$ and scaling the primary set point $m_o$ to arrive at the effective set point $m'$. To generalize the use of the override feature for any kind of calculator control function $f_n$, FIG. 10E mathematically asserts that the set point argument of the control function $f_n$ is scaled by the product $$\prod_{n=1}^{N} ks_n$$

of all of the scale factors. This is a sufficient condition to insure that a change of scale factor $ks_n$ will scale the system output M by the same scale factor $ks_n$ since in the linear case the output M is initially scaled by the factor $ks_n$ and a linear change in the argument $M_o$ of the calculator function $f_n$ will be balanced by the linear change in the $m_o$ argument of the function so that the control values $I'_{pn}$ will not change. A noteable feature of the system of FIG. 10E is that even if the iteration time $\Delta t$ is very long, the system output M responds immediately to adjustments of the override controls $ks$, and the calculator 73" responds to any change in gain of the system 70' and apportionment of the control signals $I_{p1} \ldots I_{pN}$ selected by the ratios of the respective scale factors $ks_1 \ldots ks_N$.

V. Exemplary Embodiment of Adaptive Control Method For Controlling Cutter Tip Horse Power in the Turning Machine Now that the invention has been described functionally and in its broadest aspects, it should be apparent that it may be implemented in a variety of specific embodiments. To illustrate how a specific embodiment is reduced from a general functional description, a preferred exemplary embodiment for adaptive control of the actual cutter tip horsepower in a turning machine will be described in detail. In other words, the functional descriptions illustrated in FIG. 2 to FIG. 9 will be precisely defined by describing a particular adaptive control procedure for the instruction memory 60 which may be executed in the numerical control unit 50' of FIG. 8. Also, the miscellaneous signals MISC shown in FIG. 9 will be described in detail further including soft engagement, disengagement, and tool monitoring functions such as tool breakage detection, tool wear, and tool protection.

Figure 11:
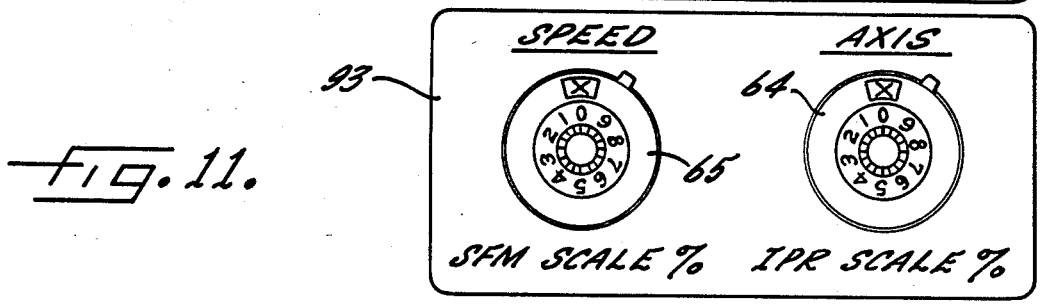
FIG. 11 is a pictorial diagram of an operator interface for use with the exemplary embodiment shown in FIG. 7.

The interface between the user and the exemplary embodiment is the operator station 45 in FIG. 7 which has a keyboard 91, a cathode ray tube display 92 and an override control panel 93 as shown in FIG. 11. The operator is informed of whether the adaptive control is off or on and is given the numerical values of the machining power in terms of $HP_m$, $HP_v$, $HP_a$, $HP_e$, and $HP_{cut}$ averages corresponding to the columns MTR, VEL, ACC, IIR, and CUT in FIG. 11. Associated with SFM are the variables $SFM_{min}$, $SFM_o$, $SFM_{max}$, $HP_{dp}$ and $HP_d$ corresponding to the column entries MIN, ACT, MAX, PROG HP and DES HP in FIG. 11. Associated with IPR, the parameters $IPR_{min}$, $IPR_o$, $IPR_{max}$, and RPM are the column entries MIN, ACT, MAX and RPM in FIG. 11.

Figure 12:
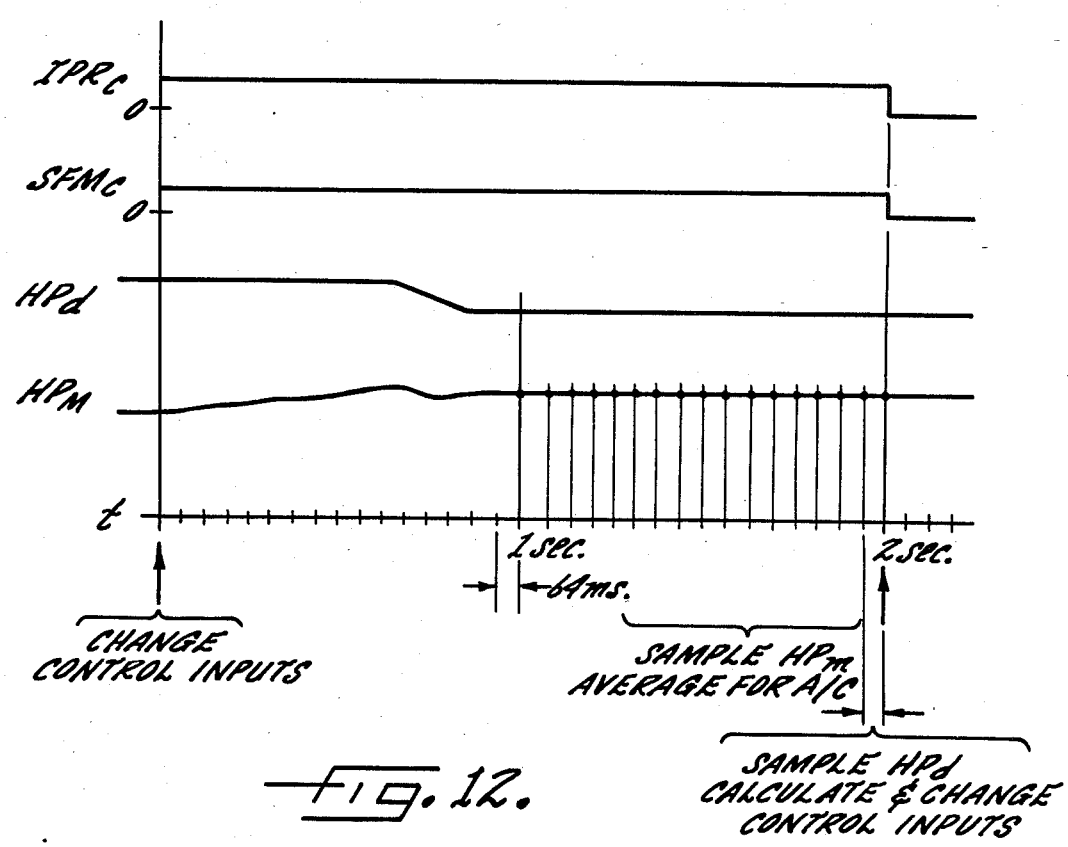
FIG. 12 is a timing diagram of the basic signals in the exemplary embodiment of the invention.

Also of relevance to the design of the exemplary embodiment for the control procedure is the actual timing involved in sampling the system inputs and outputs and set points. As shown in FIG. 12, the control inputs $IPR_c$ and $SFM_c$ are updated every two seconds. After a time delay of one second for the turning machine to respond to the change in inputs, the measured horsepower $HP_m$ is sampled at 16 points spaced 64 milliseconds apart to form an average suitable for use in the adapative control calculations. After the measured horsepower $HP_m$ is obtained, the set point $HP_d$ is compared to the actual cutter tip horsepower $HP_{cut}$ derived by correcting the measured horsepower $HP_m$ and then the control inputs $IPR_c$ and $SFM_c$ are adjusted in an amount that is estimated to bring the machining power $HP_{cut}$ into agreement with the desired set point $HP_d$.

Figure 13A:
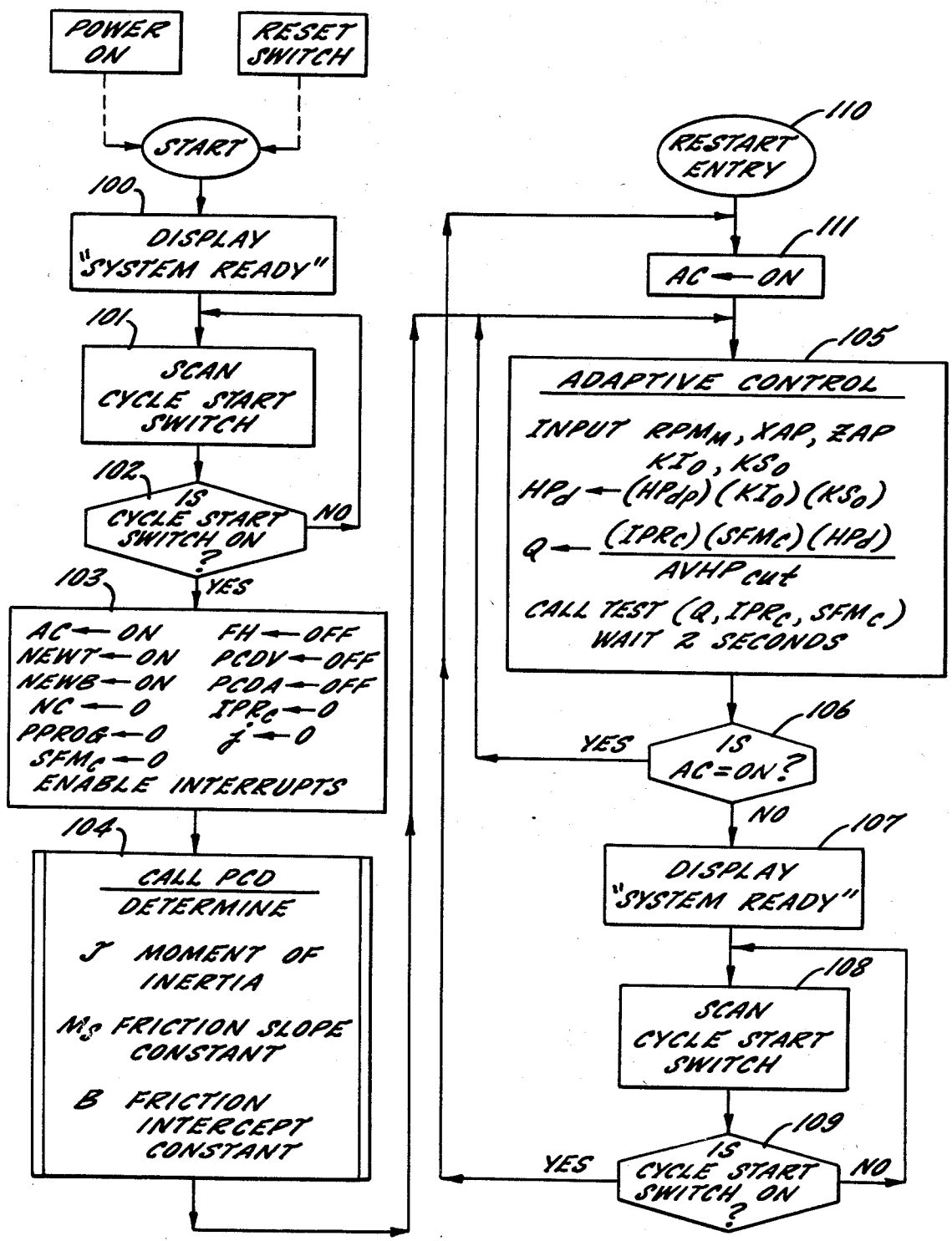
Figure 13A:
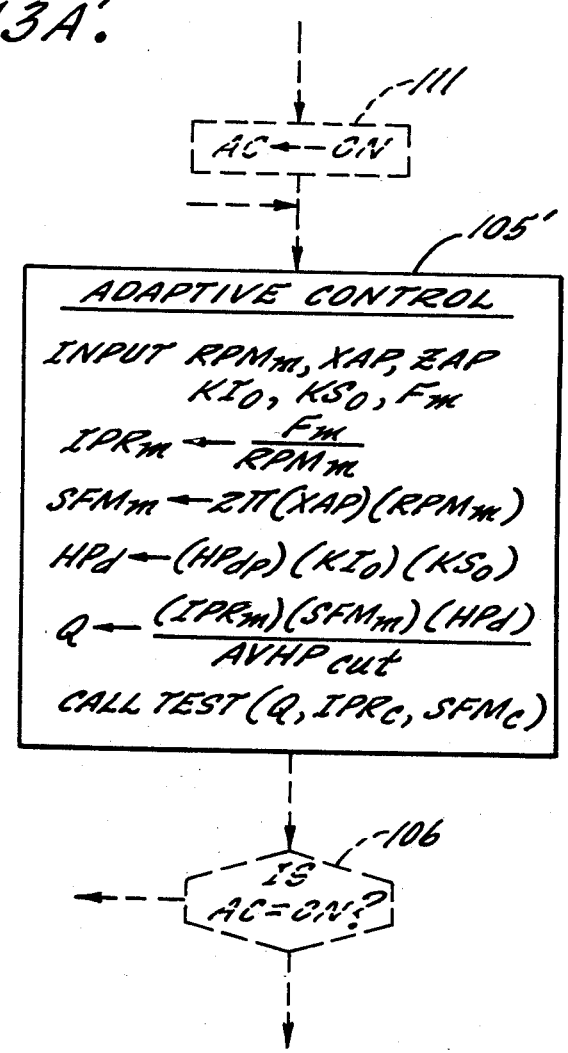

In its broadest aspects, the adaptive control procedure is defined by an executive main program that contains the iterative adaptive control loop as shown in FIG. 13A. The executive program is started when the turning machine is turned on or when a reset switch is activated. The first step 100 is for the numerical control unit to display a system ready message on the cathode ray tube of the operator station terminal. Then in step 101, the numerical control unit continuously scans the cycle start switch that is conventionally used on machine tools. When the numerical control unit determines that the cycle start switch is depressed in step 102, it knows that the machine operator has inserted a workpiece in the turning machine and has correctly inserted and adjusted a cutter in the tool holder. Then in step 103, the numerical control unit initially sets a number of software switches (i.e., flags) and accumulators to initial values and enables the interrupts which perform the background functions that are continuously and repetitively performed at 64 millisecond and 32 millisecond intervals. These switches and accumulators specifically are the adaptive control mode switch AC which provides a method of terminating the adaptive control loop upon an improper tool condition, the feed hold switch FH which tells the interrupt routines to execute a feed hole, a program constants determination switch for velocity PCDV which tells the interrupt routines to determine the velocity constants Ms and B, the program constant determination acceleration switch PCDA which tells the interrupt routines to calculate the moment of inertia J, the counter NC used to determine if there is a sufficient number of initial cut horsepower samples to use as a threshold for tool monitoring, an index PPROG to a current block in the part program memory, a switch NEWB used to determine whether a new block should be read from the part program memory, and the initial values $SFM_c$ and $IPR_c$ of SFM And IPR respectively. All of these switches and accumulators are turned off or set to zero, except for the AC switch which is turned on with $SFM_c$ set to zero and $IPR_c$ set to zero for the initial program constants determination, and the new block switch NEWB and new tool switch NEWT which are turned on so that the first part program block will be read and so that the cutting efficiency factor for the new tool will be measured.

After the interrupts are enabled, the subroutine PCD is called in step 104 to determine the moment of inertia J, friction slope constant Ms and friction intercept constant B. Once these initial constants are determined, the adaptive control calculations are performed in step 105 by inputting the current values of the rotational velocity $RPM_m$, the actual position coordinates of the cutter tip XAP, ZAP, and the user-adjusted override factors $KI_o$ and $KS_o$. The desired horsepower setpoint $HP_d$ is calculated as a product of a programmed horsepower $HP_{dp}$ and the user adjusted factors $KI_o$ and $KS_o$. Then the relative machining rate Q (forming an updated commanded value called $Q_c$ in Equation (3-9)) is calculated as the product of $IPR_c$ and $SFM_c$ adjusted by the ratio of $HP_d$ to $AVHP_{cut}$ (the latter representing determined actual cutter tip horsepower). Since $IPR_c$ and $SFM_c$ are used to calculate Q at step 105 in FIG. 13A, the method of FIG. 5A is being used rather than that of FIGS. 5B and 5C. The examplary embodiment of FIGS. 13A and 13F includes the digital filtering and an added two-second waiting delay, as mentioned with respect to FIGS. 5A and 10B.

As shown at 105 (FIG. 13A), the subroutine TEST (FIG. 13B) is called to use the newly calculated value of relative machining rate Q in order to determine new values of $IPR_c'$ and $SFM_c$. The adaptive control function 105 is then terminated by a two-second delay before the loop is closed by a test of the AC switch in step 106. Normally successive passes through steps 105 and 106 will continue during machining of a part. But if the AC switch is turned off, which may result from operator intervention or automatic stoppage due to tool breakage, etc., a "system ready" prompt is displayed in step 107. The cycle start switch is scanned in step 108 and its closure (by the human operator) is detected in step 109 to restart the AC control loop at the entry point 110 whereupon the AC switch is turned on in step 111 and the adaptive control calculations are repeated in step 105.

As indicated above with reference to FIGS. 5B and 5C, it is advantageous and preferable to calculate Q from actual values of $IPR_m$ and $SFM_m$. The latter two physical variables are, of course, easily calculated from transducer signals reflecting sensed values of the actual feed rate $F_m$, the actual rotational speed $RPM_m$ and the actual radius position of the cutter tip location (here the X axis position XAP) measured relative to the workpiece rotational axis. The preferred embodiment is conveniently implemented by replacing the step 105 (FIG. 13A) procedures with those shown at step 105' in FIG. 13A'.

The actual feed velocity may be sensed, for example, by a tachometer driven from the feeding lead screw, or preferably from sampling the actual position sensing device to obtain $F_m$ as a change in position over a known sampling interval. In some cases, the previously commanded feed velocity $F_c$ is a fair estimate of actual feed velocity as was assumed in Equation (3-6). A tachometer or an RPM digitizer is suitable as a source of the measured signals $RPM_m$. The measured value $IPR_m$ is calculated simply as $F_m/RPM_m$. The measured value $SFM_m$ is calculated as $2\pi \cdot XAP \cdot RPM_m$, where XAP is the radial displacement R of the cutter tip from the workpiece axis. The new relative machining rate Q is then formed as shown in step 105' by using the measured values $IPR_m$ and $SFM_m$ which together form the existing or measured rate called $Q_m$ in FIG. 5C. The new commanded machining rate Q is arrived at simply by multiplying the measured value $Q_m$ by the ratio of horsepower set point to measured cutter tip horsepower.

The two-second interval measured off in step 105 (FIG. 13A) is not necessary and is advantageously omitted in step 105' of FIG. 13A'. It will be recalled that in the method of FIG. 5A, a time delay is used to assure stability, but at the expense of slowing down the response of the adaptive control to changes in the workpiece or cutter properties at the cutter interface (e.g., unforseeable changes in CEFR). But in the method of FIGS. 5B and 13A', the gain and stability of the adaptive control is independent of any time delay, and hence the affirmative creation of a time delay (as in FIG. 5B) can be omitted and sampling times shortened so that the response of the adaptive control to changes at the cutter interface is accomplished without extreme or intolerable lags.

Figure 13B:
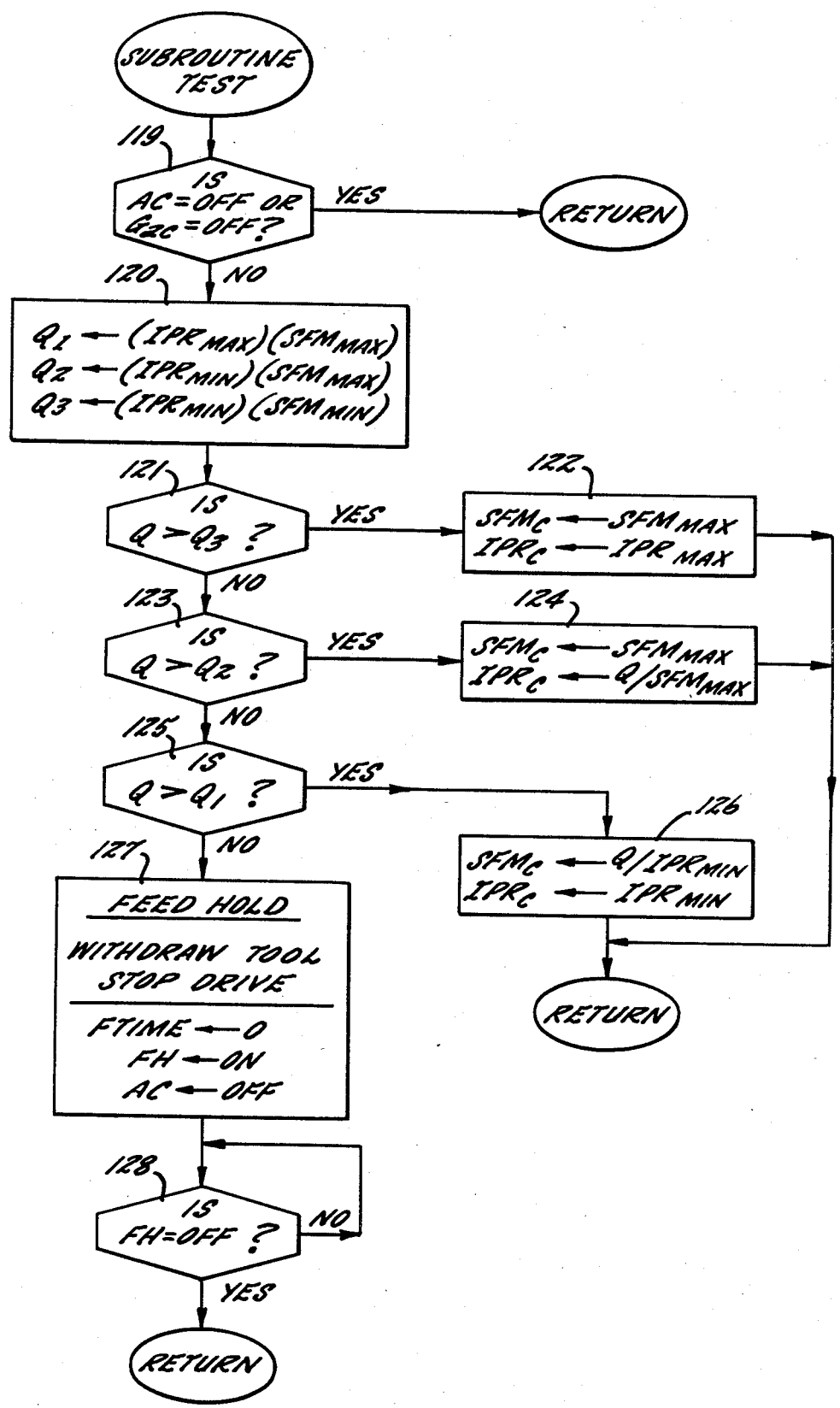

The subroutine TEST is shown in FIG. 13B. First in step 119, the switches AC and $G_{ac}$ must both be on for new values of $SFM_c$ and $IPR_c$ to be calculated; otherwise, execution of the subroutine is immediately terminated. To determine the new values of $SFM_c$ and $IPR_c$, the critical points or thresholds $Q_1$, $Q_2$, $Q_3$ for the relative machining rate are calculated in step 120 from the IPR and SFM min and max values. Recall that these values are obtained from the part program memory as will be further described below in conjunction with the description of FIG. 13E. If the new value of relative machining rate Q is greater than the highest threshold $Q_3$ as determined in step 121, then in step 122 the commanded value $SFM_c$ is set to the maximum value of SFM and the commanded value $IPR_c$ is set to the maximum value of IPR. A message could also be displayed in step 122 indicating that the desired cutting horsepower is not fully utilized. If the relative machining rate Q is not greater than the highest threshold $Q_3$, then it is compared with the second threshold $Q_2$ in step 123 to determine if it is between the second and third thresholds $Q_2$ and $Q_3$ respectively. If it is between these two thresholds, then in step 124 the commanded value $SFM_c$ is set to $SFM_{max}$ and the commanded value $IPR_c$ is set to the commanded value Q divided by $SFM_{max}$. If the value of Q is not greater than the second threshold $Q_2$, then in step 125 the value of Q is compared to the lowest threshold $Q_1$ and if it is greater than the lowest threshold $Q_1$ or thus between the lowest threshold $Q_1$ and the second threshold $Q_2$, then in step 126 the commanded value of $SFM_c$ is set to the value of Q divided by $IPR_{min}$ and the commanded value $IPR_c$ is set to $IPR_{min}$. But if the value of Q is not greater than the lowest threshold $Q_1$, then the value of Q cannot be obtained by any permissible combination of the commanded values $SFM_c$ and $IPR_c$ in which case the machining process must be terminated. Thus in step 127, a "feed hold" is requested together with action which causes withdrawal of the tool and stopping of the drive. For this purpose, the feed hold timer FTIME is set to zero and the feed hold switch FH is turned on, and the AC switch is turned off. The feed hold switch FH passes a feed hold request to the 32 mS interrupt where it is serviced as shown in FIG. 13D as described below. When it is serviced as detected by step 128, execution returns to the adaptive control step 105 in FIG. 13A and since the adaptive control switch AC was turned off, the adaptive control loop will be terminated by step 106 until the cycle start switch is reset by the operator and detected by the numerical control unit in step 109 of FIG. 13A.

Figure 13C:
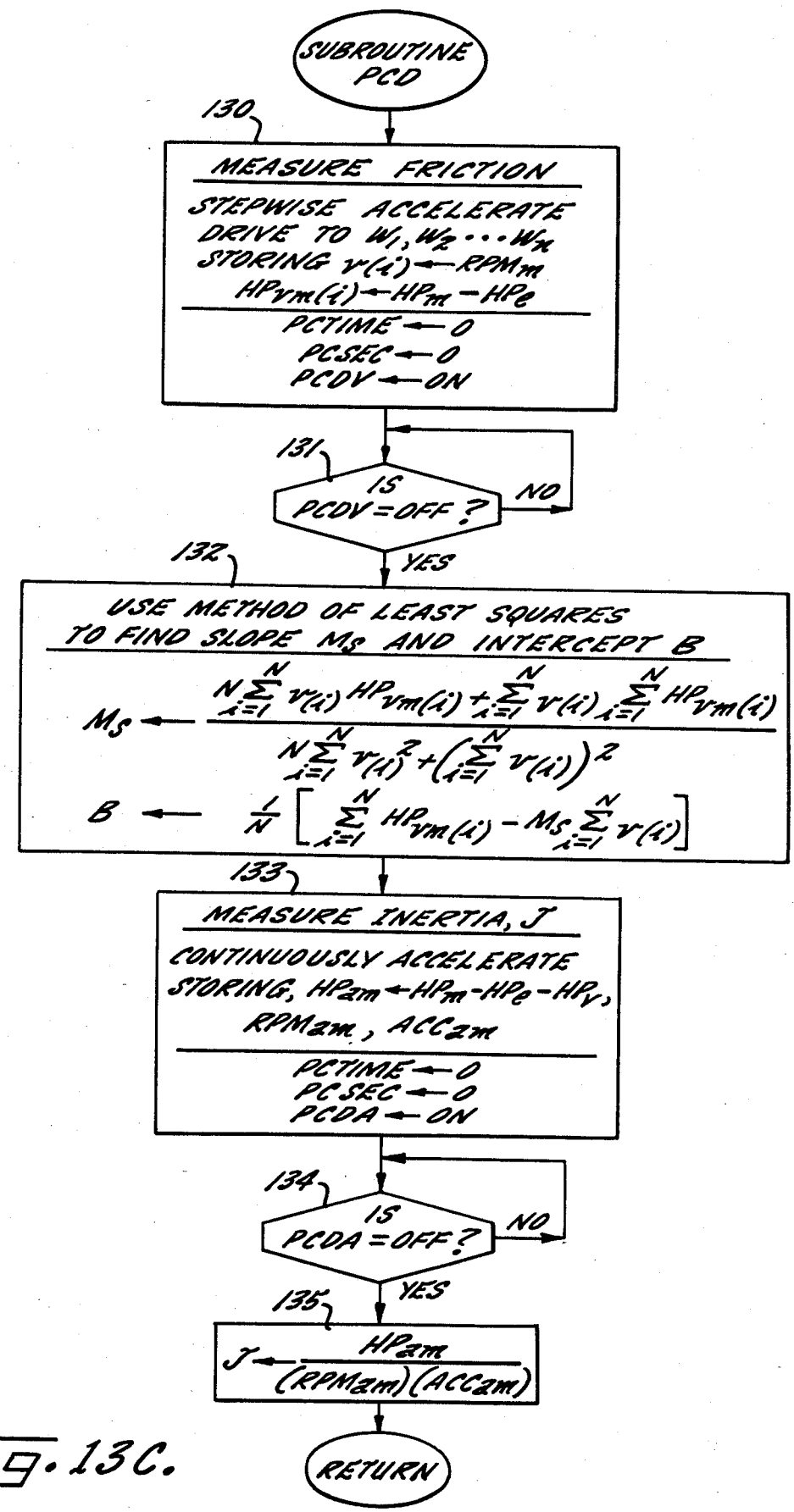
Figure 13D:
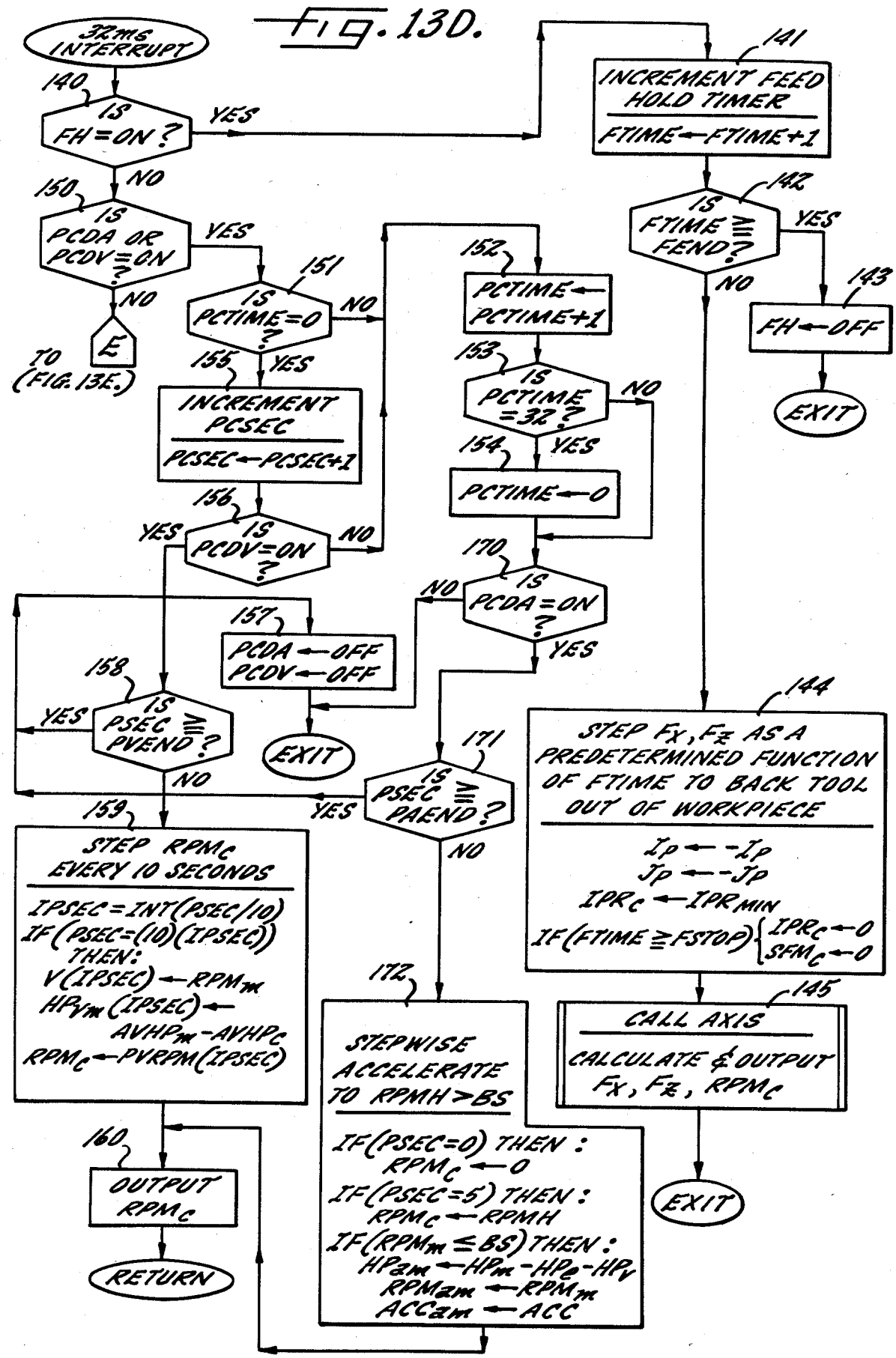

The determination of the program constants is performed by the subroutine PCD shown in FIG. 13C. First the 32 mS interrupt described below in FIG. 13D is requested to stepwise accelerate the drive to a plurality of angular velocities corresponding to the acceleration shown in FIG. 3 by setting the program constant timers PCTIME and PCSEC to zero and setting the velocity program constant switch PCDV on. The subroutine PCD then waits for the request to be serviced by sensing in step 131 whether the switch PCDV is off. When PCDV is off, the interrupt routine in FIG. 13D has measured the frictional horsepower $HP_{vm}$ at a number of different values of RPM which are stored in a vector v. Then the friction constants Ms and B are determined from these data points by the standard statistical technique of least squares according to the equations summarized in step 132. After the friction slope Ms and intercept B are determined, the horsepower due to acceleration is calculated as requested by step 133 by setting the program constant timers PCTIME and PCSET to zero and turning on the acceleration switch PCDA. This request is processed by the interrupt in FIG. 13D which continuously accelerates the drive as shown in FIG. 3B and described below, and when the subroutine PCD senses that the servicing is complete by testing the switch PCDA in step 134, the moment of inertia J is calculated in step 135 in accordance with equation (2-12).

A 32 millisecond interrupt (FIG. 13D) is used to service the feed hold, program constants determination, soft engagement, and soft disengagement functions and to read the part program memory, calculate the path vectors and provide the axis control of the cutter feed and machine tool drive. The feed hold function is performed if the feed hold switch FH is on as detected in step 140 whereupon the feed hold timer FTIME is incremented in step 141. The feed hold timer is in effect a program step counter for executing a feed hold sequence. Thus the end of the feed hold sequence is determined by comparing the feed hold timer FTIME to an end time FEND in step 142 and if the end time is reached, the feed hold switch is set off in step 143 to complete the interrupt procedure, thus passing the feed hold switch FH back to step 128 in FIG. 13B indicating that the feed hold sequence is completed. But if the feed hold timer FTIME is less than the end time FEND, the cutter is backed out of the workpiece as a function of the feed hold timer FTIME to terminate the machining process. The simplest method of backing the cutter out of the workpiece is to reverse the direction of the cutter feed by reversing the path vectors Ip and Jp as shown in step 144. Also the commanded rate of the feed $IPR_c$ is set to $IPR_{min}$ so that the rate of retraction is a constant value. When the feed hold timer FTIME reaches a stop time FSTOP, the feed and drive are stopped by setting $IPR_c$ to zero and $SFM_c$ to zero so that the cutter is retracted from the workpiece by a generally constant distance. The actual retraction of the cutter is for convenience performed by the AXIS subroutine in step 145.

The 32 millisecond interrupt of FIG. 13D also initially cycles the machine tool with the cutter disengaged according to the angular velocity profile of FIGS. 3A and 3B for program constant determination. If the interrupt detects that either the acceleration switch PCDA or the velocity switch PCDV is on, in step 150, the program constant timers PCTIME and PCSEC are serviced so that the timer PCSEC indicates the number of seconds into either the stepwise acceleration sequence of FIG. 3A or the continuous acceleration sequence of FIG. 3B by performing the incrementing and comparisons of steps 151, 152, 153, 154, and 155. From these steps, it is seen that the timer PCTIME counts out 32 interrupt intervals each time the second counter PCSEC, is incremented.

The velocity switch PCDV is tested in step 156, and if it is on the velocity stepwise acceleration sequence is initiated. The second counter PCSEC is compared to an end time PVEND at step 158 to determine if the velocity sequence is finished and if so, the program constant determination switches PCDA and PCDV are turned off in step 157. But if the second counter PSEC is less than the end time PVEND, then the velocity switch PCDV is tested to determine whether the stepwise acceleration is required for velocity constants determinations as shown in step 158. If the velocity switch PCDV is on, then the drive velocity is increased in steps at ten second intervals according to step 159. The ten second intervals are conveniently tested by determining whether the second counter PSEC is divisible by 10 and if so, the current rotational velocity is measured and put into a velocity array v using the ten second counter IPSEC as an index and the horsepower due to friction coincident with the velocity is calculated and put into an array $HP_{vm}$ also using the ten second counter IPSEC as an index. It should be noted that this horsepower due to frictional velocity is just the average measured horsepower $AVHP_m$ minus the average horsepower lost in the electrical drive motor due to the effective resistance of the motor windings $AVHP_e$. These averages are calculated in the 64 millisecond interrupt routine of FIG. 13G, further described below. After the velocity array v and horsepower due to velocity array $HP_{vm}$ are updated, the commanded velocity $RPM_c$ is stepped to the next level as programmed in a pre-determined constant array PVRPM also using the second timer IPSEC as an index. Then the commanded value $RPM_c$ is outputted in step 160 to accelerate the drive.

While the determination of the friction constants Ms and B requires a stepwise change in the rotational velocity, the determination of the moment of inertia J requires a continuous net acceleration, which of course may be either positive or negative. For this purpose, the acceleration switch PCDA is tested during each of the 32 millisecond interrupt times at step 170. Then the second timer PSEC is compared in step 171 to an end time PAEND to determine if the acceleration sequence is completed. If it is not completed, then according to the preferred acceleration sequence of FIG. 3B for a DC drive motor, the drive is stopped and, in latter passes through step 172 of the 32 millisecond interrupt, the DC drive motor is stepwise commanded to a maximum RPM, RPMH, that is greater than the motor's base speed BS. The measured values $HP_{am}$, $RPM_{am}$, and $ACC_{am}$ are also determined so long as the rotational velocity $RPM_m$ is less than base speed BS. The net horsepower transferred to the inertial mass of the machine tool drive $HP_{am}$ is calculated by subtracting the horsepower loss due to the electrical resistance in the drive motor winding $HP_e$ and the horsepower loss due to the mechanical friction in the machine tool drive $HP_v$ from the horsepower $HP_m$ consumed by the drive motor. Note that when the acceleration sequence is completed, the measured values $HP_{am}$, $RPM_{am}$ and $ACC_{am}$ will be those values measured just before RPM exceeds the base speed BS. This completes the control of the machine tool drive for calculation of the program constants in the 32 millisecond interrupt.

Figure 13E:
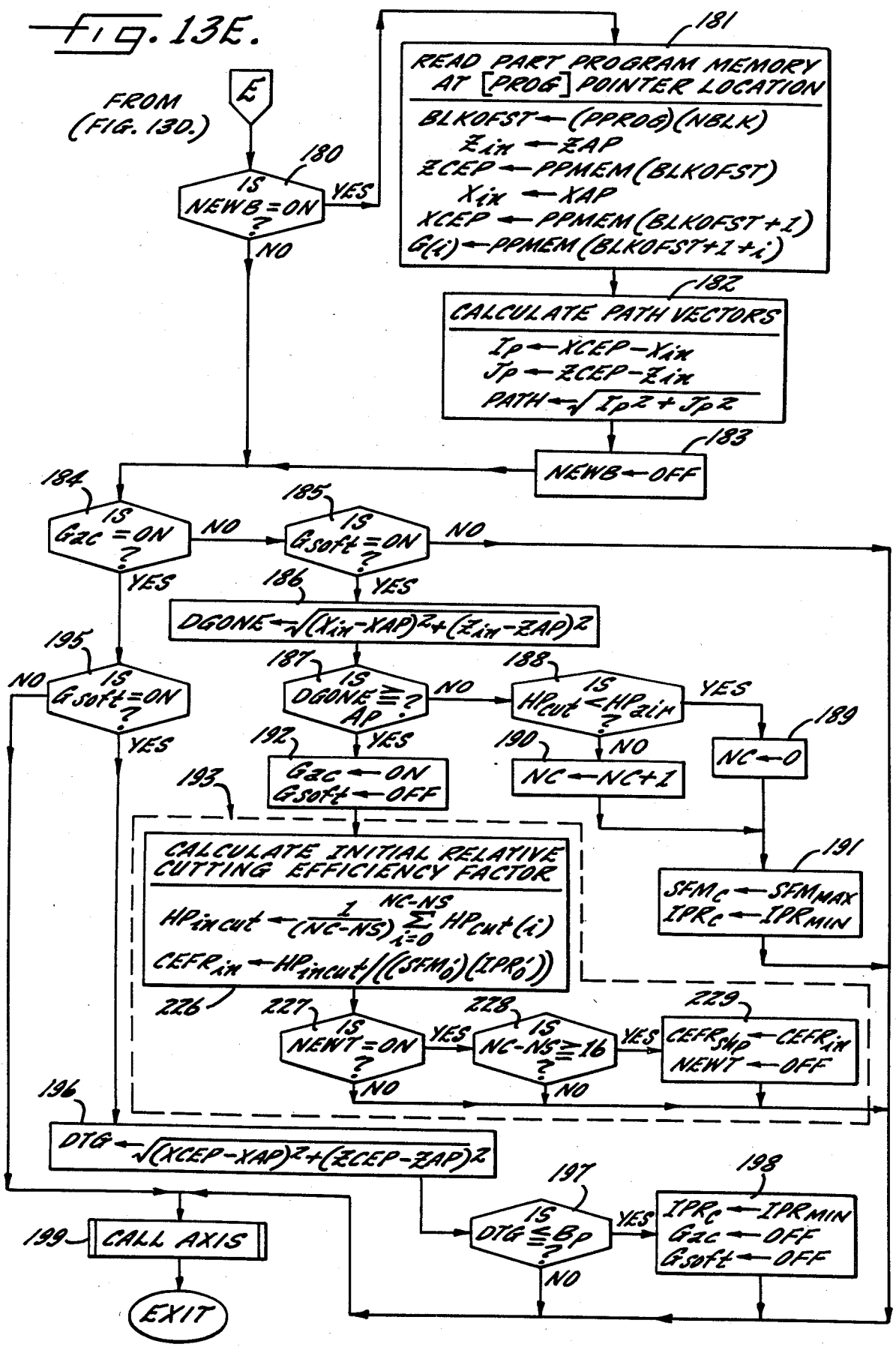

Turning now to FIG. 13E, which is actually a continuation of the 32-millisecond interrupt as indicated by the off-page connector E which is common to FIG. 13D and FIG. 13E, it is seen that the new block switch NEWB is tested in step 180. If the switch is on, the part program memory considered as an array labelled PPMEM is read in step 181 at all memory locations representing the next block. The offset index of the part program memory PPMEM array, the block offset BLKOFST, is calculated as the product of a block number PPROG and the number NBLK of part program memory locations per block. The value of the part program memory at the block offset BLKOFST is the first block constant in the block which is the Z coordinate ZCEP of the desired ending position. When ZCEP is read, it is also desirable to store an initial Z coordinate which could in fact be the old Z coordinate ZCEP but as shown it is probably more desirable to store the actual position ZAP as the initial coordinate $Z_{in}$. Similarly, the next target X coordinate XCEP is read at location BLKOFST +1 and similarly the other block constants generally represented as an array G are read at increasing part program memory PPMEM locations. These other constants include, for example, the maximum IPR operating level $IPR_{max}$, the minimum IPR operating level $IPR_{min}$, the maximum SFM operating level $SFM_{max}$, the minimum SFM operating level $SFM_{min}$, the target horsepower $HP_{dp}$, the incremental beginning distance Ap, the incremental ending distance Bp, the AC flag $G_{ac}$, the soft engagement flag $G_{soft}$, the tool monitor flag $G_{tm}$, the tool breakage flag $G_{tb}$ and minimum CEFR factor $C_{min}$, the tool protect flag $G_{tp}$ and maximum CEFR factor $C_{max}$, and the tool wear flag $G_{tw}$ and AVCFR factor $C_{tw}$. Alternatively, these flags and constants may be handled in the known model fashion; i.e., only changes in the logic states of the flags or changed values of the block constants are programmed in the part program memory.

In step 182, the path vectors Ip and Jp and the resultant path length PATH are calculated from the differences between the initial and target coordinates. To complete these steps of reading and processing the current block of the part program memory, the new block switch NEWB is switched off in step 183 so that the next block will be read only when requested by the AXIS subroutine in FIG. 13F as described below.

A. Soft Engagement Function

The 32 millisecond interrupt also performs a soft engagement function. One of the miscellaneous constants stored in the part program memory is a soft switch $G_{soft}$ which signals that the current path vector is either into workpiece surface if the AC flag $G_{ac}$ is also off, or is a path that will break out of the workpiece if the flag $G_{ac}$ is also on.

If the cutting tool is not engaged with the workpiece, then the adaptive control should be off since then the cutting power is not responsive to either IPR or SFM. Thus, there must be some method for initially contacting the cutter with the workpiece and turning the adaptive control on. The applicants have discovered that the preferable method of initially contacting the workpiece with the cutter and turning the adaptive control on is to command the SFM at the maximum value $SFM_{max}$ and the IPR at the minimum value $IPR_{min}$ and to drive the cutter a sufficient depth into the workpiece for the measured horsepower values to stabilize. The point of initial contact may be determined either by knowing beforehand the workpiece profile or by actually measuring the increase in cut horsepower $HP_{cut}$ when the cutter contacts the workpiece. In the exemplary embodiment, both methods will be described. The adaptive control is turned on when the cutter position (XAP, ZAP) is a pre-determined distance Ap from the initial position ($X_{in}$, $Z_{in}$) which is presumed to have been programmed by the prior block target coordinates (XCEP, ZCEP) to be the feed position of the workpiece surface. But in the exemplary embodiment, the increase in cutting horsepower $HP_{cut}$ above a threshold level $HP_{air}$ set to be greater than the air or noise value of cutter horsepower $HP_{cut}$ when the cutter is disengaged, is used to insure that measurements of the cutter horsepower $HP_{cut}$ are considered only when the cutter is engaged with the workpiece. The initial measurements of $HP_{cut}$ are used to calculate an initial horsepower $HP_{incut}$ which is itself used to calculate an initial relative cutting efficiency $CEFR_{in}$. This initial relative cutting efficiency is used for detecting tool breakage, tool wear, and to protect the tool from excessive transient forces as further described below in conjunction with the tool monitor function.

Turning again to FIG. 13E, if the adaptive control flag $G_{ac}$ is off as detected in step 184 and the soft engagement flag $G_{soft}$ is on as detected in step 185, the soft engagement function has been selected. The distance gone from the initial coordinates ($X_{in}$, $Z_{in}$) is calculated in step 186. In step 187, the distance gone DGONE is compared to a pre-programmed initial cut distance Ap, which is one of the miscellaneous constants G(i) read from the part program memory blocks, to determine whether initial cutting is taking place. In step 188, which is also an alternate method of determining when the initial cutting has started, the cut horsepower $HP_{cut}$ is compared to an air cut threshold value $HP_{air}$ and if the cutting horsepower $HP_{cut}$ is less than this initial air cut value, a sample counter NC is set to zero in step 189 since the measured cutting horsepower $HP_{cut}$ is probably indicative of cutting air rather than machining the workpiece. Otherwise, the counter NC is incremented as shown in step 190. In either event, during the initial cut into the workpiece, the commanded $SFM_c$ is set to its maximum value $SFM_{max}$ and the commanded $IPR_c$ is set to its minimum value $IPR_{min}$ as shown in step 191. When step 187 signals that the distance gone DGONE is greater than the pre-determined initial cut distance Ap, the adaptive control is turned on by setting the switch $G_{ac}$ on and the soft engagement is turned off by setting the switch $G_{soft}$ off in step 192.

An initial relative cutting efficiency is determined in the steps generally designated 193 by first calculating an initial cut horsepower $HP_{incut}$ and then calculating the initial relative cutting efficiency $CEFR_{in}$ as the initial cutting horsepower $HP_{incut}$ divided by the product of the control values $SFM_o$ and $IPR_o$. The control values $SFM_o$, $IPR_o$ are used instead of the commanded values $SFM_c$ and $IPR_c$ since for constant $SFM_c$ and $IPR_c$, a change in the override controls changes the cut horsepower $HP_{cut}$, but does not change the ratio of the cut horsepower $HP_{incut}$ divided by the control values $SFM_o$ and $IPR_o$. For cutting efficiency calculations, it is assumed that the control values $SFM_o$ and $IPR_o$ do not instantaneously change and thus represent the actual values of SFM and IPR, which can be assured by a suitable method of inputting the scale factors $KI_o$ and $KS_o$ into the numerical control unit. If these user adjusted scale factors are obtained by reading potentiometers with an analog to digital converter, for example, the fact that the operator cannot instantaneously change the positions of the potentiometer controls guarantee that the scale factors cannot instantaneously change. Otherwise digital low-pass filtering can be added to insure that the filtered values $SFM_o'$ and $IPR_o'$ do not rapidly change, and this is the preferred method. The AXIS subroutine, shown in FIG. 13F, includes such digital filtering. The precise steps generally designated 193 are further described below in conjunction with the tool monitor subroutine TLMNTR of FIG. 13H.

B. Soft Disengagement

Since the adaptive control cannot function properly when the cutter is cutting air, there must be some means to turn it off if the cutter is about to cut through the workpiece. The applicants have discovered that the best method of disengaging the cutter from the workpiece and terminating the adaptive control, which would otherwise accelerate to attempt to maintain constant machining power, is to sense when the cutting tool is within a pre-set distance Bp of breaking out of the workpiece, and thereupon to decrease the feed velocity of the cutter to the minimum feed velocity $IPR_{min}$ while maintaining SFM generally at the then-current value until the cutter breaks out of the workpiece.

Shown in FIG. 13E, the soft disengagement function is performed when the adaptive control flag $G_{ac}$ is on as detected in step 184 and when the soft engagement switch $G_{soft}$ is on as detected in step 195. The target coordinates (XCEP, ZCEP) are pre-programmed in the part program for the block with the AC flag set on and the soft engagement switch $G_{soft}$ set on to signal that the cutter is expected to break out of the surface of the workpiece. Then the distance to go before breaking out DTG is calculated in step 196 as the distance between the actual cutter position (XAP, ZAP) and the target coordinates (XCEP, ZCEP). To determine whether it is time to turn off the adaptive control and to reduce the IPR to $IPR_{min}$, the distance to go DTG is compared with an incremental ending distance Bp in step 197 and if the distance to go DTG is less than the incremental ending distance Bp, the commanded $IPR_c$ is set to the minimum value $IPR_{min}$, the adaptive control is inhibited by setting the flag $G_{ac}$ off, and the soft engagement feature is terminated by setting the switch $G_{soft}$ off as shown in step 198.

Figure 13F:
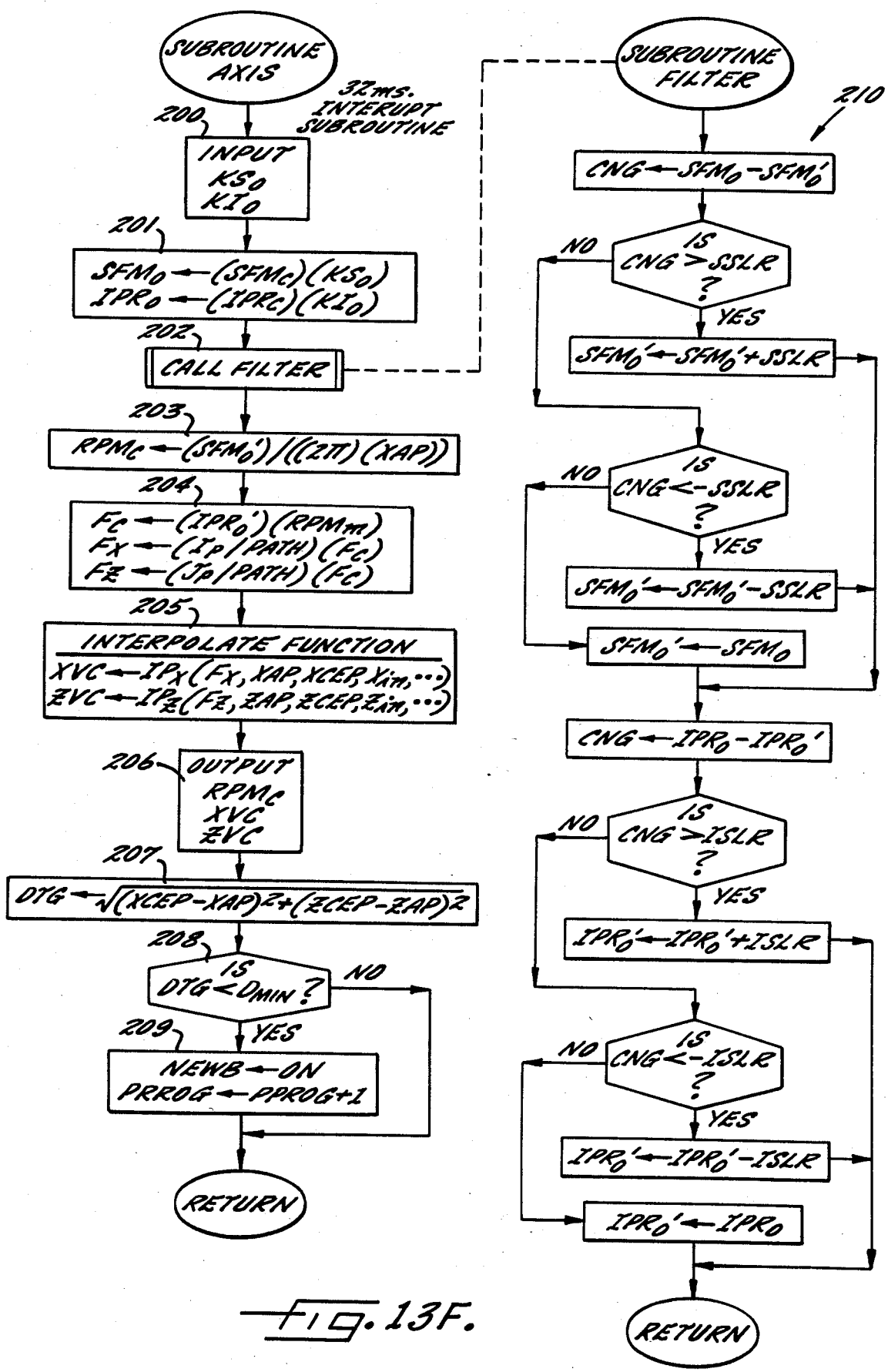

The 32 millisecond interrupt of FIGS. 13D and 13E is completed in step 199 by calling the AXIS subroutine of FIG. 13F which generates the actual machine control signals $RPM_c$, XVC and ZVC from the commanded values $SFM_c$ and $IPR_c$.

The AXIS subroutine first inputs the user adjusted scale factors $KS_o$ and $KI_o$ from the override controls in step 200. Then the control values $SFM_o$ and $IPR_o$ are computed by scaling the commanded values $SFM_c$ and $IPR_c$ by the scale factors $KS_o$ and $KI_o$, respectively in step 201. These control values are then filtered by calling the subroutine FILTER to generate filtered control values $SFM_o'$ and $IPR_o'$ in step 202. Then the commanded value of rotational velocity $RPM_c$ is calculated in step 203 as $SFM_o'$ divided by the product $2\pi$ times the actual position coordinate XAP which is in effect the radius $R_{av}$ from the axis of the workpiece to the cutter edge. In step 204, the magnitude of the resultant cutter feed velocity $F_c$ is calculated as the product of the control value $IPR_o'$ and the measured value $RPM_m$ and the X and Z displacement components $F_x$ and $F_z$ may be calculated by scaling the magnitude of the resultant $F_c$ by the factors Ip divided by PATH and Jp divided by PATH respectively.

In step 205, the components of the cutter feed velocity are passed to an interpolation function which converts them to the actual feed motor control signals XVC and ZVC. The simplest interpolation function merely sets the value of the motor control signals proportional to the feed velocity components $F_x$, $F_z$. Thus the cutter feed for a simple linear intrepolation moves the cutter tool from the initial coordinates ($X_{in}$, $Z_{in}$) to the final coordinates (XCEP, ZCEP) in a straight line. But it is sometimes desirable to move the cutter tool along a nonlinear path such as an arc of a given radius. The radius, for example, is one of the miscellaneous block constants G(i) stored in the part program memory. In such a case, the feed motor control signals XVC and ZVC are a function of the actual position coordinates (XAP, ZAP) in relation to the initial coordinates ($X_{in}$, $Z_{in}$) and the final coordinates (XCEP, ZCEP). Further details of a preferred interpolation function are provided in U.S. Pat. No. 3,656,124 issued Apr. 11, 1972 to John K. McGee, which is herein incorporated by reference. After each interpolation update at a 32 mS rate, the machine control signals $RPM_c$, XVC and ZVC are outputted in step 206 to effect a change in the machining process.

The AXIS subroutine also determines whether it is time to read a new block of constants from the part program memory. The distance to go DTG to the final coordinates (XCEP, ZCEP) is calculated in step 207 and compared to a minimum value $D_{min}$ in step 208. If the distance to go DTG is less than the minimum value, then the new block switch NEWB is turned on and the block pointer PPROG is incremented. This completes the AXIS subroutine.

Also shown in FIG. 13F is the subroutine FILTER generally designated 210 which limits the time rate of change of the filter output variables $SFM_o'$ and $IPR_o'$ to slew rate limits SSLR and ISLR respectively representing the permissible change in the output values per 32 millisecond interrupt interval. Some kind of digital filtering is preferable so that the control values $SFM_o'$ and $IPR_o'$ do not instantaneously change which could falsely trigger the tool function subroutine TLMNTR of FIG. 13H or which might possibly overdrive the feed and drive motors. It should also be noted that the subroutine FILTER has the effect of spreading out or softening the changes commanded by the adaptive control loop of FIG. 13A as actually executed in the subroutine calls to the TEST subroutine of FIG. 13B at steps 122, 124 and 126. The specific details of such digital filtering are not critical to the practice of the present invention, and will not be further described. An alternate approach for smoothing out large step changes in velocity, whether created by the part program or by the adaptive action here described, is disclosed in Kolell U.S. Pat. No. 4,041,287 to which the reader may refer.

The actual horsepower expended at the cutter tip $HP_{cut}$ is calculated and averaged at 64 millisecond intervals in an interrupt routine shown in FIG. 13G. The interrupt also performs a tool monitoring function since preferably the detection of a broken tool or excessive loads on a tool occurs quickly to reduce the damage done to the tool or workpiece. The 64 millisecond interrupt reads the electrical power consumed by the drive motor in watts $W_m$, the actual rotational velocity of the drive $RPM_m$, and the actual cutter tip position coordinates XAP, ZAP in step 220. Then in step 221, the rotational acceleration ACC is calculated as the change in rotational velocity over the 64 millisecond interrupt interval. The corrections to the measured power $W_m$ to obtain an actual cutting power $HP_{cut}$ are performed in step 222. The net horsepower transferred to the inertial mass of the rotating parts of the machine tool $HP_a$ is calculated as a product of the pre-determined moment of inertia J (previously stored in step 135 in FIG. 13C), the rotational acceleration ACC, and the rotational velocity $RPM_m$. The power taken up by the mechanical friction in the machine tool drive $HP_v$ is calculated as the sum of the intercept constant B and the product of the slope constant Ms (such constants being previously stored at step 132 in FIG. 13C) and the rotational velocity $RPM_m$. The voltage V across the drive motor terminals is calculated as the maximum drive voltage to the motor in volts, times the rotational velocity $RPM_m$ divided by the predetermined base speed constant BS. (It should be noted that some motor drives have adjustment controls for setting the base speed BS and maximum drive voltage to values different from the maximum rated voltage and rated base speed of the motor. These motor drives, for example, regulate the motor's field excitation to alter the electrical characteristics of the motor. In accordance with FIG. 13G, step 222, a 240 volt DC motor was adjusted for a maximum drive voltage of 225 volts.) Then the current I through the motor windings is computed by dividing the power in watts to the drive motor $W_m$ by the voltage V. The electrical power consumed by the resistance in the motor windings $W_e$ in watts is computed as the product of the square of the current I and the pre-determined constant of resistance $R_e$ of the motor windings in ohms. Then the measured horsepower $HP_m$ and the electrical horsepower $HP_e$ dissipated in the motor windings are obtained from the corresponding values in watts $W_m$ and $W_e$ respectively by dividing the wattage values by the units conversion factor 746 watts per horsepower. Finally, the cut horsepower $HP_{cut}$ is obtained by adjusting the measured horsepower $HP_m$ by subtracting the mechanical friction loss $HP_v$, the horsepower due to acceleration $HP_a$ and the net horsepower due to electrical loss in the motor windings $HP_e$.

In step 223, the various horsepowers $HP_m$, $HP_d$, $HP_a$, $HP_e$, and $HP_{cut}$ are added to running average tables and averages are computed for updating the display and for obtaining the average cut horsepower $AVHP_{cut}$ for adaptive control. These averages are obtained by pushing the horsepower values into a first-in-first-out (FIFO) stack, for example 16 values deep. Then the running averages are formed by incrementing the average by the horsepower pushed into the stack and subtracting from the average the horsepower pushed out of the stack.

To complete the 64 millisecond interrupt routine, the tool monitoring subroutine TLMNTR is called in step 224.

C. Tool Monitoring Functions

Figure 13H:
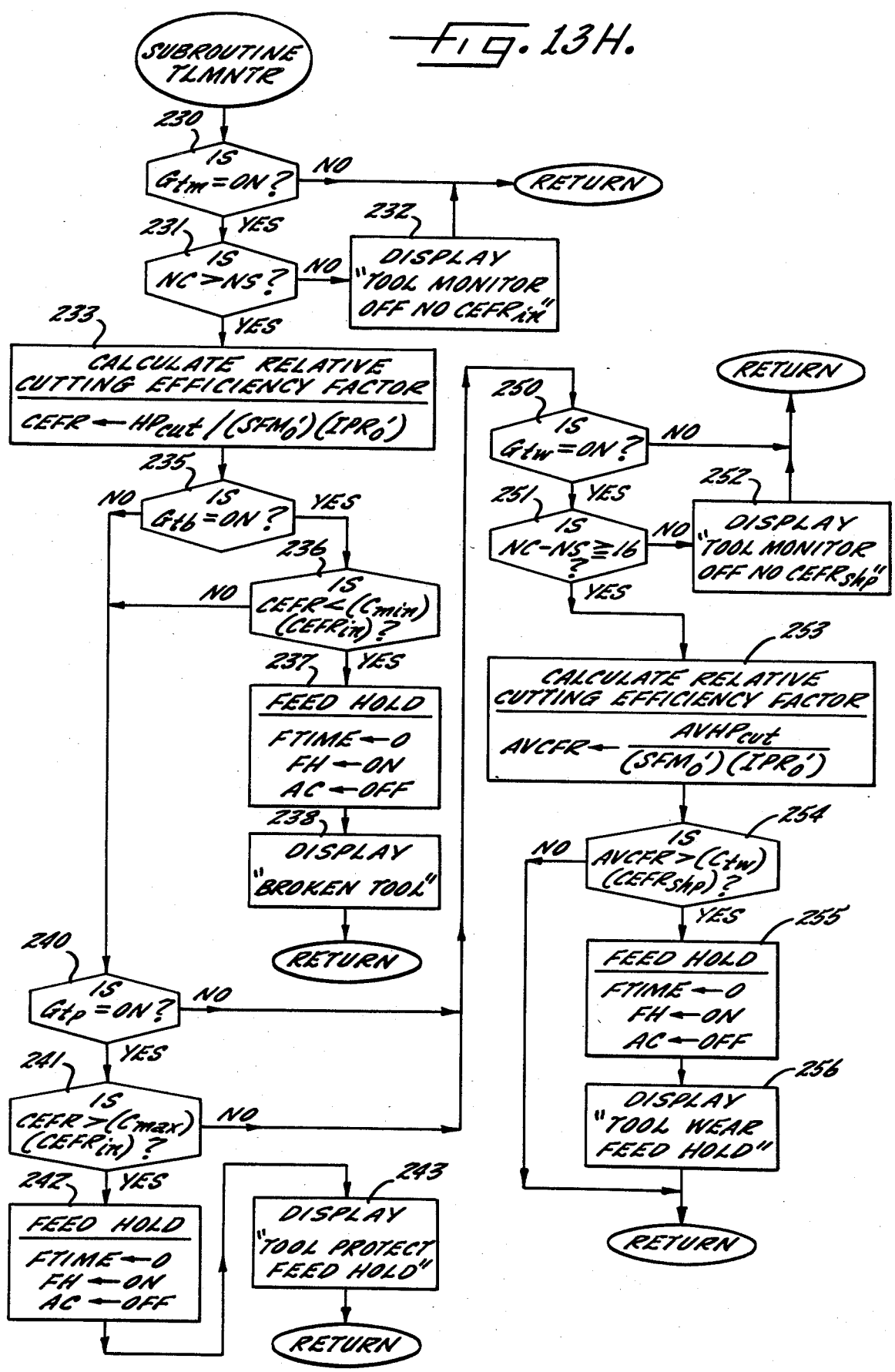

The subroutine TLMNTR in FIG. 13H calculates a relative cutting efficiency factor CEFR and detects improper tool conditions including a broken tool, an excessive tool load and a worn tool by comparing the relative cutting efficiency factor to an initial relative cutting efficiency factor. Recall that as defined in Equation (3-5) CEFR measures the inefficiency or dullness of a cutter. Equivalently, the reciprocal of CEFR measures the efficiency or sharpness of the cutter, and alternatively this reciprocal value could be compared to an initial reciprocal value. Of course, such an alternative is mathematically equivalent since merely the direction of an inequality is reversed when reciprocals of the terms are taken.

The tool monitoring may be disabled by a switch $G_{tm}$ obtained from and associated with each block in the part program memory. When the part program is made, program blocks representing paths initially into or out of a workpiece are programmed with this switch $G_{tm}$ off so that cutting air or initial contact with the workpiece will not be interpreted as a broken tool or an excessive tool load. The tool monitor switch $G_{tm}$ is tested in step 230 and if it is off the tool monitor subroutine is done. Otherwise in step 231 the counter NC is compared with the pre-determined number NS to determine whether an initial relative cutting efficiency factor $CEFR_{in}$ was determined in FIG. 13E. If not, then there is probably an error in programming of the tool monitoring switch $G_{tm}$ in the part program so that the error condition is displayed to the machine operator in step 232. Otherwise the relative cutting efficiency factor is calculated in step 233 as $HP_{cut}$ divided by the product of $SFM_o'$ and $IPR_o'$. It should be noted that performing comparisons of relative cutting efficiency factors to monitor tool conditions requires that the depth of cut D is generally constant, since it is the actual cutting efficiency factor $CEF_v$ defined as the horsepower required to remove a unit volume of material, that is relatively constant and $CEF_v$ equals CEFR/D. Of course, if the depth of cut D is not constant but is known, the actual cutting efficiency factor may be calculated or equivalently the relative cutting efficiency factor CEFR may be adjusted by the ratio of the depths for the initial cutting efficiency factor versus the current cutting efficiency factor according to the equation:

$$CEFR' = (CEFR)(D_{in})/(D_a) \quad (5-1)$$

where $D_{in}$ is the initial depth and $D_a$ is the current depth. Then the adjusted cutting efficiency factor CEFR' may be compared to the initial cutting efficiency factor $CEFR_{in}$. The depth of cut D may be a miscellaneous parameter G(i) stored in each block of the part program memory.

Once the relative cutting efficiency factor CEFR is determined, it is compared to maximum and minimum limit values to determine if an improper tool condition exists. The maximum limit value must be larger than the initial relative cutting efficiency factor $CEFR_{in}$ and preferably the maximum and minimum limits are determined by multiplying the initial cutting efficiency factor $CEFR_{in}$ by constants slightly greater or slightly less than 1, respectively. For example, if the broken tool switch $G_{tb}$ is on, as detected in step 235, then the relative cutting efficiency factor CEFR is compared to the product of the initial cutting efficiency $CEFR_{in}$ and a minimum factor $C_{min}$ as shown in step 236, with $C_{min}$ chosen to be slightly less than 1, for example 0.85. If the relative cutting efficiency factor CEFR exceeds this minimum limit then a "feed hold" is requested in step 237 by clearing the feed hold timer FTIME, setting the feed hold switch FH on and turning the adaptive control switch AC off. Then the broken tool condition is displayed to the operator in step 238 which completes the execution of the subroutine TLMNTR.

Another tool monitoring function that may be performed is the detection of excessive transient loads on the cutting tool. To protect the tool from these transient loads, the cutting efficiency factor is monitored and compared to a maximum limit since a transient load is characterized by a sharp increase in the cut horsepower $HP_{cut}$ while the relative machining rate $(SFM_o')(IPR_o')$ remains relatively constant so that the relative cutting efficiency factor CEFR rises nearly instantaneously coincident with the transient increase in cut horsepower $HP_{cut}$. The applicants have discovered that to catch these transients, the cutting efficiency factor is preferably repetively calculated at a fast rate, for example every 64 milliseconds which is the rate of the interrupt calling the subroutine TLMNTR.

As shown in FIG. 13H, the tool protect switch $G_{tp}$ from the current block of the part program memory is tested in step 240 and if it is on then the relative cutting efficiency factor CEFR is compared to a high threshold determined by the product of a maximum factor $C_{max}$ pre-set substantially greater than 1, for example, 1.2, and the initial cutting efficiency factor $CEFR_{in}$, as shown in step 241. If the relative cutting efficiency factor CEFR is greater than the high threshold, then an excessive transient load on the tool is detected and a "feed hold" is executed in step 242. The "tool protect" condition is displayed to the machine operator in step 243.

A third tool monitor function is the detection of a worn tool. By comparing the cutting efficiency factor of the tool to the initial cutting efficiency factor measured when the tool was sharp and first placed in the turning machine, an unduly worn tool may be detected. As a tool becomes dull, the cutting efficiency factor will increase even if there are programmed or adaptively created changes in SFM or IPR. In contrast to the detection of excessive transient loads on the tool, the detection of a worn tool should not be responsive to fast fluctuations in the cutting efficiency since a tool which is becoming duller should have a slowly rising cutting efficiency factor. Thus while the tool protect function preferably is repetitively performed at a high rate, the detection of tool wear may be performed at a rather slow rate or preferably is performed at a rather high rate using smoothed or average values which are not responsive to fast, transient changes in the cutting efficiency factor.

As shown in FIG. 13H, the relative cutting efficiency factor CEFR is monitored at the high rate of the 64 millisecond interrupt but comparisons are performed using average values. First, the tool wear switch $G_{tw}$ is sensed in step 250 and if it is on, then the initial relative cutting efficiency sample counter NC is compared to a pre-determined minimum number of samples NS to arrive at a difference representing the number of initial cutting efficiency factor samples that are averaged, and if this difference is greater than or equal to 16, an arbitrary number of samples thought necessary for a suitable average, then a suitable initial relative cutting efficiency factor for a sharp tool $CEFR_{shp}$ is available from the steps generally designated 193 in FIG. 13E.

Returning for a moment to FIG. 13E, the calculation of an initial relative cutting efficiency factor for a sharp tool $CEFR_{shp}$ is there illustrated. After an initial relative cutting efficiency factor is calculated in step 226, the new tool switch NEWT is tested in step 227 to see if it is on. The new tool switch is one of the switches initially set on in step 103 (FIG. 13A) when the machine is started and it is assumed that the machine is first started with a sharp tool. Since the tool wear function preferably senses an average value, the number of initial horsepower samples NC-NS is computed and compared to 16 in step 228. Note that NS represents the number of initial horsepower samples just after contact of the cutter with the workpiece, as detected in step 188, that must be taken before the machining process has sufficiently stabilize for a computed initial cutting efficiency factor to be meaningful and representative of continuous machining. Thus if there are more than 16 samples, the cutting efficiency factor for a sharp tool $CEFR_{shp}$ is set at step 229 to the initial cutting efficiency factor $CEFR_{in}$ which was computed in step 226 from the samples $HP_{cut(i)}$. Also in step 229, the new tool switch NEWT is set off so that subsequent calculations of $CEFR_{in}$ occurring coincident with subsequent soft engagements of the tool do not affect the value of $CEFR_{shp}$, since $CEFR_{shp}$ will be set only once during the initial soft engagement when the new tool switch NEWT is on in step 227.

Returning to FIG. 13H, the tool monitoring subroutine TLMNTR determines if the relative cutting efficiency $CEFR_{shp}$ has been calculated for a sharp tool by comparing the number of samples NC-NS to 16 in step 251. If $CEFR_{shp}$ is not available, the operator is told of this fact in step 252. Otherwise the current average relative cutting efficiency factor AVCFR is calculated by dividing the average cut horsepower $AVHP_{cut}$ by the product of $SFM_o'$ and $IPR_o'$ in step 253. Then the current average relative cutting efficiency factor AVCFR is compared to a high threshold limit somewhat above the initial cutting efficiency $CEFR_{shp}$. Preferably this is done by multiplying the cutting efficiency for a sharp tool $CEFR_{shp}$ by a pre-determined constant $C_{tw}$ with $C_{tw}$ pre-set to a value substantially greater than 1, for example, 1.1. Note that $C_{tw}$ is preferably set less than $C_{max}$, since the average value of CEFR is less than the maximum of the transient values of CEFR. The comparison is performed in step 254 and if the average cutting efficiency factor AVCFR is less than the threshold, the operator is instructed in step 256 that a tool wear feed hold has occurred. This completes the description of the tool monitoring function performed by the subroutine TLMNTR.

GLOSSARY OF SELECTED SYMBOLS

A: Cross-sectional area of cut=(IPR) (D).

$A_p$: Incremental beginning distance of cutter tip into the workpiece surface during soft engagement before adaptive control is turned on.

B: Friction intercept constant for estimating friction of the drive as a linear function of drive velocity.

BS: Base speed constant of a DC electric motor.

Bp: Incremental ending distance of cutter tip from point where adaptive control is turned off and soft disengagement begins to point where cutter tip breaks out of the workpiece.

C: Volume of workpiece material removed by machining.

$CEF_v$: Cutting efficiency factor, defined in terms of machining power required for removal of unit volume of workpiece material.

CEFR: Relative cutting efficiency factor defined as the ratio of machining power HP to relative machining rate Q=(IPR) (SFM).

D: Depth of cut, defined as the dimension of the cut normal to IPR and SFM.

d: Differential operator.

$F_c$: Net feed velocity of the cutter tip.

$F_x$: Feed velocity component in the X direction.

$F_z$: Feed velocity component in the Z direction.

HP: Machining power, in general, without limitation as to method of measurement or correction for losses.

$HP_a$: Net machining power loss (+ or −) transferred to the inertial mass of the moving parts of the machine tool assembly and thus associated with net acceleration (+ or −).

$HP_e$: Machining power loss consumed and dissipated as heat in the motor winding circuit of an electrical drive motor.

$HP_v$: Machining power loss due to mechanical friction in the machine tool drive, and excluding friction at the cutter tip.

$HP_{cut}$: Actual machining power dissipated at the cutter tip.

I: Electrical drive motor current.

Ip: X component of cutter tip displacement vector between successive reads of successive blocks of the part program memory.

$I_p$: Control input to a physical system.

IPR: (Inches Per Revolution) dimension of the cut in the direction of the cutting tool feed velocity, for a turning machine, proportional to the feed velocity $F_c$ divided by the rotational drive velocity RPM.

$IPR_c$: IPR commanded by the adaptive control unit.

$IPR_{max}$, $IPR_{min}$ $IPR_{min}$: Upper and lower limits on IPR for desired machine tool operation, respectively.

$IPR_o$: control input value to the machine tool, that will tend to result in an equal actual IPR.

J: Moment of inertia sensed by the drive.

Jp: Z component of cutter tip displacement vector between successive reads of successive blocks of the part program memory.

k: Response factor of a feedback control loop.

Ms: Friction slope constant for estimating friction of the drive as a linear function of drive velocity.

PATH: Distance or magnitude of the resultant cutter tip displacement vector between successive reads of successive blocks of the part program memory.

Q: Relative machining rate defined as the product of SFM and IPR.

$Q_c$: Commanded value of relative machining rate, defined as the product of $SFM_c$ and $IPR_c$.

$Q_m$: Measured value estimating the actual machining rate, defined as the product of $SFM_m$ and $IPR_m$.

R: Inner machined radius of the workpiece in a turning machine.

$R_o$: Outer machined radius of the workpiece in a turning machine.

$R_{av}$: Average or effective machined radius of the workpiece in a turning machine.

$R_e$: Electrical resistance of the drive motor windings.

RPM: (Revolutions Per Minute) Rotational velocity of the drive in a turning machine.

$RPM_c$: Commanded value of RPM.

$RPM_m$: Measured value estimating the actual RPM of the drive.

SFM: (Surface Feet Per Minute) Relative transverse velocity of the workpiece surface at and with respect to the cutter edge.

$SFM_c$: SFM commanded by the adaptive control unit.

$SFM_m$: Measured value estimating the actual SFM of the machine tool.

$SFM_{max}$, $SFM_{min}$: Upper and lower limits on SFM for desired machine tool operation, respectively.

$SFM_o$: SFM control input value to the machine tool, that will tend to result in an equal actual SFM.

s: Complex frequency parameter denoting frequency domain of the Laplace transform.

T: Torque exerted by the drive.

t: Time.

V: Voltage applied to the drive motor.

Vop: Rated voltage of the drive motor.

$W_m$: Measured drive power expressed in watts.

w: Angular velocity of the drive.

What is claimed is:

1. The method of adaptively controlling a plant process to maintain the value of a process parameter [M] substantially in agreement with the value of a desired set point [m], the plant having an automatic adjustment device [33b] responsive to a command signal [$Q_c$] to change at least one physical variable [Q], changes in said variable [Q] in turn causing the parameter [M] to change, the response of the parameter [M] to the variable [Q] being time variant in a fashion that is not predeterminable, said method comprising:
    (a) supplying a command signal [$Q_c$] to said adjustment device [33b] so that the latter produces the physical variable [Q],
    (b) sensing the actual value of the physical parameter [M], and
    said method being characterized by and including
    (c) obtaining an estimate [$Q_p$] of the present value of the physical variable [Q], and thereafter
    (d) correctively changing said command signal [$Q_c$] to take on a new value [$Q_{cn}$] equal to the estimate [$Q_p$] of the present value of the physical variable [Q] multiplied by the ratio of the set point value [m] to the actual value of the physical parameter [M].

2. The method set out in claim 1 further characterized in that said estimating step (c) obtains the estimate [$Q_p$] of the present value of the physical variable [Q] by sensing the actual value of the physical varible [Q].

3. The method set out in claim 1 further characterized in that said estimating step (c) and said correctively changing step (d) are iteratively repeated at spaced instants of time, each correctively changing step (d) being performed after a corresponding estimating step (c).

4. The method as set out in claim 3 further characterized in that each estimating step (c) estimates the present value [$Q_p$] of the physical variable [Q] as substantially equal to the new value [$Q_{cn}$] determined by the preceding correctively changing step (d).

5. An adaptive feedback control system for regulation of a plant having an automatic adjustment device [33b] establishing the value of at least one physical variable [Q] affecting a process [33d] in the plant, the control system accepting a set point value [m] corresponding to a particular physical parameter of the process [33d] that is responsive to the value of the physical variable [Q], the control system having a process sensor [33e] monitoring the value [M] of the physical parameter, wherein the improvement comprises:
    means [33c, 59] for obtaining an estimate [$Q_p$] of the present value of the physical variable [Q], and
    ratio calculator means [33a] for commanding the adjustment device to urge the physical variable [Q]

to take on a value substantially equal to the product of the estimate [$Q_p$] of the present value of the physical variable and the ratio of the set point value [m] to the value [M] of the physical parameter indicated by the process sensor.

6. The control system as claimed in claim 5, wherein the means [33c] for obtaining an estimate of the current value of the physical variable include an adjustment sensor measuring the value of the physical variable.

7. The control system as claimed in claim 5, wherein the ratio calculator means [33a] is part of a digital computer [50] programmed to iteratively calculate the product of the estimate of the current value of the physical variable and the ratio of the set point value to the value of the physical parameter indicated by the process sensor, and having means [56] for sending said product to the adjustment device [33b] so that the physical variable is urged to take on a value equal to said product.

8. The control system as claimed in claim 7, wherein the means [33c] for obtaining an estimate of the current value of the physical variable include memory means [59] for temporarily storing the product sent to the adjustment device [33b], and means [31] for establishing a time delay between iterations so that, at each iteration time, the temporarily stored product is a sufficiently valid estimate of the present value of the physical variable so that the control system is stable.

9. The method of adaptively controlling a plant process to maintain a process parameter [M] substantially in agreement with the value of a desired set point signal [m], the plant having an adjustment device [33b] responsive to a command signal [$Q_c$] to change at least one physical variable [$Q_m$], changes in said variable [$Q_m$] in turn causing the plant to change said parameter [M] with a time-variant gain transfer function [$G_{p(s)} = M/Q_m$] which is not predeterminable, said method comprising
 (a) supplying a command signal [$Q_c$] to said adjustment device so that the latter produces the physical variable [$Q_m$],
 (b) producing a first signal [$M_o$] representing the actual value of the parameter [M] created by the plant, and
 said method being characterized by and including
 (c) producing a second signal representing the actual value of the variable [$Q_m$], and
 (d) correctively changing said command signal [$Q_c$] to take on a new value [$Q_{cn}$] equal to said second signal multiplied by the ratio of said set point value to the value of said first signal, such that $Q_{cn} = Q_m \cdot (m/M_o)$.

10. The method set out in claim 9 further characterized in that said corrective changing step (d) is iteratively repeated at spaced instants in time.

11. The method set out in claim 9 or claim 10 further characterized by the steps of
 (e) at random points in time, adjusting the value of said command signal [$Q_c$] by changing an override scale factor [K] applied thereto, and
 (f) coincidentally with any performance of said step (e), adjusting the value of said desired set point [m] by identically changing the same scale factor [K] applied thereto.

12. The method of adaptively controlling a plant process to maintain a process parameter M substantially in agreement with the value of a desired set point signal m, the plant acting to change the parameter M according to changes in at least one input signal $I_p$ with a time-variant gain ($G_{p(s)} = M/I_p$) which is not predeterminable, said method comprising
 (a) supplying to the plant an input signal $I_p$,
 (b) producing a signal $M_o$ representing the actual value of the parameter M created by the plant, and
 said method being characterized by and including
 (c) correctively changing said input signal $I_p$ to take on a new value $I_{pn}$ equal to its original value $I_{pold}$ multiplied by the ratio of the set point signal to the actual value signal $M_o$, such that $I_{pn} = I_{pold} \cdot (m/M_o)$.

13. The method set out in claim 12 further characterized in that
 in the supplying step (a), the signal $I_p$ supplied to the plant is updated at spaced time instants i, i+1, i+2 . . . to take on successive values $I_{pi}$, $I_{p(i+1)}$, $I_{p(i+2)}$ . . . ,
 and in the correctively updating step (c), the signal $I_p$ is correctively updated at said spaced time instants by forming each new value $I_{p(i+1)}$ as the previous value $I_{pi}$ multiplied by the ratio $m/M_o$.

14. The method set out in claim 13 further characterized in that in the producing step (b), the signal $M_o$ is produced at spaced time instants j, j+1, j+2 such that the signal takes on values $M_{oj}$, $M_{o(j+1)}$, $M_{o(j+2)}$ . . . , and in the correctively changing step (c), said input signal $I_p$ is correctively updated at the spaced time instants i, i+1, i+2 . . . to create each successive value as the previous value multiplied by the ratio of the set point signal m to the actual value signal M such that $I_{p(i+1)} = I_{p(i)} \cdot (m/M_{or})$ where $M_{or}$ is the most recent value of the signal $M_o$ produced according to step (b).

15. The method set out in claim 12 further characterized in that said plant is a machine tool wherein the process is machining of a workpiece by a cutter, said parameter M is consumed horsepower, and said input signal $I_p$ is a command for the relative machining rate $Q_c$.

16. The method set out in claim 15 further characterized in that said consumed horsepower is essentially the power expended at the cutter tip as the workpiece is being machined.

17. The method set out in claim 15 further characterized in that the command for the relative machining rate $Q_c$ is formed by the product of two commanded variables for speed and feed, such variables being commanded by two respective command signals.

18. The method set out in claim 17 further characterized in that said two respective command signals are applied to the machine tool as desired values for surface speed $SFM_c$ and feed $IPR_c$ of the machining process, and from each successive change of the input signal $I_p$, and thus of the commanded relative machining rate Q, a value of one of said two respective command signals is picked and the other is computed according to the relationship $Q_c = SFM_c \cdot IPR_c$.

19. In an adaptive control for a physical system, such system acting in response to an input signal $I_p$ to change a controlled parameter HP which is affected by variables in addition to said input signal, the combination comprising:
 (a) means for producing a set point signal $HP_d$ representing a desired value for the parameter HP,
 (b) repetitive means for producing a signal $HP_m$ representing the actual value of the parameter HP while the system is operating with a known value $I_{po}$ of the input signal $I_p$,
 (c) repetitive means for determining a new value $I_{pn}$ for the input signal $I_p$ based upon the ratio $HP_d/HP_m$ of the set point to the actual value multiplied by the known $I_{po}$, such that $I_{pn}=(HP_d/HP_m)\cdot I_{po}$ and (d) repetitive means for changing the input signal $I_p$ to agree with the determined value $I_{pn}$, so that the actual value $HP_m$ of the controlled parameter HP converges toward the value of the set point signal $HP_d$ despite variations in the variables other than the input signal $I_p$ which affect the controlled parameter HP.

20. The method of adaptively controlling a plant process to maintain a process parameter M substantially in agreement with the value of a desired set point signal m, the plant having an adjustment device responsive to at least one command signal $I_{pc}$ to vary a physical variable $I_p$ which affects the parameter M with a gain $G_{p(s)}=M/I_p$ which is time variant and non-predeterminable, said method comprising (a) creating at least one command signal $I_{pc}$, (b) multiplying said command signal by an operator-adjustable override factor K to produce a final command signal $I_{pco}$ such that $I_{pco}=K\cdot I_{pc}$, (c) creating a set point signal m representing a desired value of the parameter M, (d) multiplying said set point m by the same operator-adjustable factor K to produce a final set point signal $M_o$, (e) sensing, and representing by a signal $M_o$, the actual value of said parameter M, (f) sensing, and representing by a signal $I_{pm}$, the actual value of said physical variable $I_p$, and (g) correctively changing said command signal $I_{pc}$ to take on a new value $I_{pcn}$ equal to the value of the actual variable $I_p$ multiplied by the ratio of the final set point signal $m_o$ to the actual value signal $M_o$, such that $I_{pcn}=I_{pm}\cdot(m_o/M_o)$ whereby said parameter M converges in value toward agreement with the value of said set point signal m when the factor K is 1.0, but upon operator-performed adjustment of said override factor K to values other than 1.0 to modify the range of variation of said variable $I_p$, the negating of the override action is avoided by a corresponding change in the effective set point $m_o$ at which said parameter is maintained.

21. The method defined by claim 20 further characterized in that (a1) said step (a) includes creating a plurality of n command signals $I_{pc1}, I_{pc2} \ldots I_{pcn}$ jointly affecting the process parameter M, (b1) said step (b) includes multiplying each of said individual command signals by a respective one of individual operator-adjustable override factors $K_1, K_2 \ldots K_n$ such that individual final command signals are created, viz.

$I_{pco1}=K_1\cdot I_{pc1}$ $I_{pco2}=K_2\cdot I_{pc2}$ $I_{pcon}=K_n\cdot I_{pcn}$ and applying the final command signals to said adjustment device, and (d1) said step (d) includes multiplying said set point signal m by all of said override factors to produce a final set point signal $m_o=K_1\times K_2\times \ldots K_n\times m$.

22. An iterative control system for regulating a physical plant [70'], the plant receiving a control signal $[I_p]$ and emitting an output value [M], the control system receiving a set point value [m], and the control system having a calculator [73''] for repetitively generating the control signal $[I_p]$ as a predetermined control function [f(M, m)] of the output value [M] and the set point value [m], the function being predetermined so that the output value [M] tends to track the set point value [m], wherein the improvement comprises:

the control system having a user adjustable override control [64, 65] supplying an override factor [K], means for scaling the control function [f] of the calculator [73''] by the scale factor [K] to generate the control signal $[I_p]$ so that the value of the control signal $[I_p]$ is substantially equal to the product [Kf] of the control function [f] and the scale factor [K], and wherein the set point value [m] is scaled by the scale factor [K] before being applied to the control function [f], so that the tendency of the control function [f] to negate the override action is avoided by a correspondingly scaled set point value [Km] being applied to the control function [f].

23. The control system as claimed in claim 22, wherein the physical plant [70'] receives a second control signal $[I_{p2}]$ and wherein the improvement further comprises the calculator [73''] having means for generating a second corresponding control function $[f_2 (M, Km)]$ of the output value [M] and the scaled set point value [Km], the second control function $[f_2]$ being predetermined so that the output value [M] tends to track the set point value [m] when the second control function $[f_2]$ generates the second control signal $[I_{p2}]$, the system having a second user adjustable override control [64, 65] supplying a second override factor $[K_2]$, means for scaling the second control function $[f_2]$ by the second scale factor $[K_2]$ to generate the second control signal $[I_{p2}]$ substantially equal to the product $[K_2 f_2]$ of the second scale factor $[K_2]$ and the second control function $[f_2]$, and wherein the set point value [m] is additionally scaled by the second scale factor $[K_2]$ before being applied to both the first control function [f] and the second control function $[f_2]$, so that the tendencies of the control functions $[f, f_2]$ to negate the override action is avoided, and the relative weights of the control values $[I_p, I_{p2}]$ are adjusted by the override controls [64, 65].

24. In a control system for a machine tool having means to rotate and feed a workpiece relative to a cutter, and wherein the relative surface speed, designatable SFM, of such rotation with respect to the cutter edge is kept in agreement with a first set point signal $SFM_o$, and the relative feed, designatable IPR of the cutter edge into the workpiece, is kept in agreement with a second set point signal $IPR_o$, the system further having means for producing actual value signals $SFM_m$ and $IPR_m$ which change in response to changes in $SFM_o$ and $IPR_o$, respectively, (a) means for producing command signals $SFM_c$ and $IPR_c$ representing commanded values of relative speed and feed, (b) operator adjustable means for overriding said commanded values to produce said set point signals $SFM_o$ and $IPR_o$ from the command signals $SFM_c$ and $IPR_c$ such that $SFM_o=KS_o\cdot SFM_c$ $IPR_o=KI_o\cdot IPR_c$ where $KS_o$ and $KI_o$ are multipliers adjustable in value by the machine operator from a normal value of 1.0, (c) means for producing a set point signal $HP_d$ representing the machining power desired to be applied in creating said relative rotation, (d) means for periodically updating at least one of the command signals $SFM_c$, $IPR_c$ in response to changes in at least a respective one of the actual value signals $SFM_m$, $IPR_m$, during operation of the machine according to the relationship $$CS = (HP_d/HP_a) \cdot KS_o \cdot KI_o \cdot MCS$$

where CS is the said one of said two command signal, MCS is the corresponding actual value signal, and $HP_a$ is the actual power applied in maintaining said relative rotation, thereby effectively to change the power set point $HP_d$ to $HP_d \cdot KS_o \cdot KI_o$ by the same percentage as the changes in percentage of both the speed and feed when the operator makes adjustments of said means (b).

25. In a control system for a machine tool having means to rotate and feed a workpiece relative to a cutter, and wherein the relative surface speed, designatable SFM, of such rotation with respect to the cutter edge is kept in agreement with a first set point signal $SFM_o$; and the relative feed, designatable IPR of the cutter edge into the workpiece, is kept in agreement with a second set point signal $IPR_o$, (a) means for producing command signals $SFM_c$ and $IPR_c$ representing commanded values of relative speed and feed, (b) operator adjustable means for overriding said commanded values to produce said set point signals $SFM_o$ and $IPR_o$ from the command signals $SFM_c$ and $IPR_c$ such that $$SFM_o = KS_o \cdot SFM_c$$

$$IPR_o = KI_o \cdot IPR_c$$

where $KS_o$ and $KI_o$ are multipliers adjustable in value by the machine operator from a normal value of 1.0, (c) means for producing a set point signal $HP_d$ representing the machining power desired to be applied in creating said relative rotation, (d) means for periodically updating at least one of said two command signals $SFM_c$, $IPR_c$ during operation of the machine according to the relationship $$CS_i = HP_d/HP_a \cdot KS_o \cdot KI_o \cdot CS_{(i-1)}$$

where CS is the said one command signal and $HP_a$ is the actual power applied in maintaining said relative rotation, thereby effectively to change the power set point $HP_d$ to $HP_d \cdot KS_o \cdot KI_o$ by the same percentage as the changes in percentage of both the speed and feed when the operator makes adjustments of said means (b).

26. An automatic control system for a machine tool accepting a desired power signal comprising, in combination, means for measuring the power consumed by the machine drive in moving the cutting tool relatively at a controllable surface speed transversely across a workpiece surface, generating a measured power signal indicating actual machining power, automatic means for generating a relative machining rate command signal which changes according to the ratio of the desired power signal to the measured power signal, drive control means responsive to said command signal for adjusting said relative surface speed to thereby bring and hold the actual machining power in substantial agreement with said desired power signal.

27. The combination as claimed in claim 26, further comprising high limit means for preventing said relative surface speed from exceeding a predetermined maximum value at which machining may continuously occur without excessive heating of the cutting tool.

28. The combination as claimed in claim 27, further comprising low limit means for preventing said relative surface speed from falling below a predetermined minimum value below which shavings from the workpiece do not break into chips and thus tend to clog the machine tool.

29. The combination as claimed in claim 26, further comprising low limit means for preventing said relative surface speed from falling below a predetermined minimum value below which shavings from the workpiece do not break into chips and thus tend to clog the machine tool.

30. The combination as claimed in claim 26, further comprising a second control means for regulating cutting power generally independent of said drive control means, the second control means being responsive to said command signal in a predetermined apportioning such that the joint effect of said drive control means and the second control means brings actual machining power into substantial agreement with said desired power signal.

31. The combination as claimed in claim 30, wherein the second control means adjust the rate of feed of the cutting tool into the workpiece.

32. The combination as claimed in claim 31, further comprising means for detecting when said drive control means and said second control means attempt to create relative speed and feed values both of which are less than respective predetermined minimum limit values, and means responsive to such detection for thereupon terminating the machining process.

33. The combination as claimed in claim 30, further comprising user apportioning means for accepting time varying apportionment factors from the user during the machining process and proportionally allocating the machining rate control signal between the drive control means and the second control means.

34. The combination as claimed in claim 31, wherein the second control means is responsive to said command signal to change actual machining power, and said drive control means holds said relative speed essentially constant at a predetermined maximum value ($SFM_{max}$), under conditions such that the desired power would exceed the actual power if the feed and speeds were respectively $IPR_{min}$ and $SFM_{max}$.

35. The combination as claimed in claim 34, wherein the drive control means is responsive to said command signal to change actual machining power, and said second control means holds feed rate essentially constant at said predetermined minimum value ($IPR_{min}$), under conditions such that the actual power would exceed desired power if the feed and speeds were respectively $IPR_{min}$ and $SFM_{max}$.

36. The combination as claimed in claim 30, further comprising a user-controlled drive scaling means for scaling the response of the drive control means by time-varying scale factors received from the user during the machining process and proportionally adjusting the response of the drive control means to said command signal.

37. The combination as claimed in claim 36, further comprising a second user-controlled scaling means for scaling the response of the second control means by a second time variant scale factor received from the user during the machining process and proportionately adjusting the response of the second control means to said command signal.

38. The combination as claimed in claim 36, wherein the drive scaling means further includes scaling means for proportionately scaling the desired power signal.

39. A control system for a machine tool, such machine tool having
   (i) drive means to relatively rotate a workpiece and a cutter at a surface speed designatable as SFM,
   (ii) feed means to relatively feed the workpiece and cutter at a feed rate designatable as IPR,
   (iii) means responsive to input signals $SFM_o$ and $IPR_o$ for controlling said means (i) and (ii) to keep the actual speed and feed $SFM_a$ and $IPR_a$ in agreement with such signals, and said machine tool having physical characteristics such that a cutting efficiency factor CEF, proportional to horsepower per cubic inch per minute of workpiece material removal, varies according to the relation $$CEF \propto HP/[(SFM)(IPR)]$$

where HP is the power applied to cause said relative rotation and such power varies with both SFM and IPR as well as other variables, said control system comprising, in combination:
   (a) means for signaling a desired power $HP_d$,
   (b) means for initially setting said signals $SFM_o$ and $IPR_o$ to desired starting values of SFM and IPR,
   (c) means for signaling the actual power $HP_a$ applied to cause said relative rotation and means for signaling the actual surface speed $SFM_a$, at spaced intervals in time while said machine and system are operating with known input signals $SFM_o$ and $IPR_o$,
   (d) means for determining a new value signal $SFM_n$ during each spaced time interval according to the relation $$SFM_n = HP_d/HP_a \cdot SFM_a,$$

and
   (e) means for substituting the new value signal $SFM_n$ for the previous $SFM_o$ signal value, during each time interval.

40. A control system for a machine tool, such machine tool having
   (i) drive means to relatively rotate a workpiece and a cutter at a surface speed designatable as SFM,
   (ii) feed means to relatively feed the workpiece and cutter at a feed rate designatable as IPR,
   (iii) means responsive to input signals $SFM_o$ and $IPR_o$ for controlling said means (i) and (ii) to keep the actual speed and feed $SFM_a$ and $IPR_a$ in agreement with such signals, and said machine tool having physical characteristics such that a cutting efficiency factor CEF, proportional to horsepower per cubic inch per minute of workpiece material removal, varies according to the relation $$CEF \propto HP/[(SFM)(IPR)]$$

where HP is the power applied to cause said relative rotation and such power varies with both SFM and IPR as well as other variables, said control system comprising, in combination:
   (a) means for signaling a desired power $HP_d$,
   (b) means for initially setting said signals $SFM_o$ and $IPR_o$ to desired starting values of SFM and IPR,
   (c) means for signaling the actual power $HP_a$ applied to cause said relative rotation and means for signaling the actual surface speed $SFM_a$, at spaced intervals in time while said machine and system are operating with known input signals $SFM_o$ and $IPR_o$,
   (d) means for determining a new value signal $SFM_n$ during each spaced time interval according to the relation $$SFM_n = HP_d/HP_a \cdot SFM_o,$$

and
   (e) means for substituting the new value signal $SFM_n$ for the previous $SFM_o$ signal value, during each time interval.

41. The combination as claimed in claim 39 or claim 40, wherein the means (e) for substituting the new value signal further comprises means for comparing the new value signal $SFM_n$ to a predetermined limit $SFM_{max}$ and substituting $SFM_{max}$ for the previous $SFM_o$ signal value if the new value signal $SFM_n$ is greater than the predetermined limit $SFM_{max}$.

42. The combination as claimed in claim 39 or claim 40, wherein the means (e) for substituting the new value signal further comprises means for comparing the new value signal $SFM_n$ to a predetermined limit $SFM_{min}$ and substituting $SFM_{min}$ for the previous $SFM_o$ signal value if the new value signal $SFM_n$ is less than the predetermined limit $SFM_{min}$.

43. A control system for a machine tool, such machine tool having
   (i) drive means to relatively rotate a workpiece and a cutter at a surface speed designatable as SFM,
   (ii) feed means to relatively feed the workpiece and cutter at a feed rate designatable as IPR,
   (iii) means responsive to input signals $SFM_o$ and $IPR_o$ for controlling said means (i) and (ii) to keep the actual speed and feed $SFM_a$ and $IPR_a$ in agreement with such signals, and said machine tool having physical characteristics such that a cutting efficiency factor CEF, proportional to horsepower per cubic inch per minute of workpiece material removal, varies according to the relation $$CEF \propto HP/[(SFM)(IPR)]$$

where HP is the power applied to cause said relative rotation and such power varies with both SFM and IPR as well as other variables, said control system comprising, in combination:
   (a) means for signaling a desired power $HP_d$,
   (b) means for initially setting said signals $SFM_o$ and $IPR_o$ to desired starting values of SFM and IPR, (c) means for signaling the actual feed $IPR_a$ and the actual power $HP_a$, applied to cause said relative rotation, at spaced intervals in time while said machine and system are operating with known input signals $SFM_o$ and $IPR_o$, (d) means for determining a new value signal $IPR_n$ during each spaced time interval according to the relation, $$IPR_n = (HP_d/HP_a) \cdot IPR_a,$$

and (e) means for substituting the new value signal $IPR_n$ for the previous $IPR_o$ signal value, during each time interval.

44. The combination as claimed in claim 43, wherein the means (e) for substituting the new value signal further comprises means for comparing the new value signal $IPR_n$ to a predetermined limit $IPR_{max}$ and substituting $IPR_{max}$ for the previous $IPR_o$ signal value if the new signal value $IPR_n$ is greater than the predetermined limit $IPR_{max}$.

45. A control system for a machine tool, such machine tool having
    (i) drive means to relatively rotate a workpiece and a cutter at a surface speed designatable as SFM,
    (ii) feed means to relatively feed the workpiece and cutter at a feed rate designatable as IPR,
    (iii) means responsive to input signals $SFM_o$ and $IPR_o$ for controlling said means (i) and (ii) to keep the actual speed and feed $SFM_a$ and $IPR_a$ in agreement with such signals, and said machine tool having physical characteristics such that a cutting efficiency factor CEF, proportional to horsepower per cubic inch per minute of workpiece material removal, varies according to the relation $$CEF \propto HP/[(SFM)(IPR)]$$

where HP is the power applied to cause said relative rotation and such power varies with both SFM and IPR as well as other variables, said control system comprising, in combination:

(a) means for signaling a desired power $HP_d$,
(b) means for initially setting said signals $SFM_o$ and $IPR_o$ to desired starting values of SFM and IPR,
(c) means for signaling the actual power $HP_a$, applied to cause said relative rotation, at spaced intervals in time while said machine and system are operating with known input signals $SFM_o$ and $IPR_o$,
(d) means for determining a new value signal $IPR_n$ during each spaced time interval according to the relation, $$IPR_n = HP_d/HP_a \cdot IPR_o,$$

and (e) means for substituting the new value signal $IPR_n$ for the previous $IPR_o$ signal value, during each time interval.

46. The combination as claimed in claim 45, wherein the means (e) for substituting the new value signal further comprises means for comparing the new value signal $IPR_n$ to a predetermined limit $IPR_{max}$ and substituting $IPR_{max}$ for the previous $IPR_o$ signal value if the new signal value $IPR_n$ is greater than the predetermined limit $IPR_{max}$.

47. The combination as claimed in claim 44 or claim 46, wherein the means (e) for substituting the new value signal further comprises means for comparing the new value signal $IPR_n$ to a predetermined limit $IPR_{min}$ and substituting $IPR_{min}$ for the previous $IPR_o$ signal value if the new signal value $IPR_n$ is less than the predetermined limit $IPR_{min}$.

48. A control system for a machine tool, such machine tool having
    (i) drive means to relatively rotate a workpiece and a cutter at a surface speed designatable as SFM,
    (ii) feed means to relatively feed the workpiece and cutter at a feed rate designatable as IPR,
    (iii) means responsive to input signals $SFM_o$ and $IPR_o$ for controlling said means (i) and (ii) to keep the actual speed and feed $SFM_a$ and $IPR_a$ in agreement with such signals, and said machine tool having physical characteristics such that a cutting efficiency factor CEF, proportional to horsepower per cubic inch per minute of workpiece material removal, varies according to the relation $$CEF \propto HP/[(SFM)(IPR)]$$

where HP is the power applied to cause said relative rotation and such power varies with both SFM and IPR as well as other variables, said control system comprising, in combination:

(a) means for signaling a desired power $HP_d$,
(b) means for initially setting said signals $SFM_o$ and $IPR_o$ to desired starting values of SFM and IPR,
(c) means for signaling the actual power $HP_a$, applied to cause said relative rotation, at spaced intervals in time while said machine and system are operating with known input signals $SFM_o$ and $IPR_o$,
(d) means for determining the relative machining rate Q generally as the product of the machining parameters SFM, IPR according to the relation $Q = (IPR_a)(SFM_a)$,
(e) means for determining a new commanded relative machining rate value signal $Q_n$ during each spaced time interval according to the relation $$Q_n = HP_d/HP_a \cdot Q,$$

and (f) means for determining new value signals $SFM_n$ and $IPR_n$ such that $Q_n = (SFM_n)(IPR_n)$, and
(g) means for setting the input signals $SFM_o$, $IPR_o$ equal to the new $SFM_n$, $IPR_n$ signal values, respectively, during each time interval.

49. The combination as claimed in claim 48, wherein means (f) for determining new value signals $SFM_n$ and $IPR_n$ comprises means for comparing the new relative machining rate $Q_n$ to an intermediate threshold $Q_2$ defined as the product of a maximum SFM limit $SFM_{max}$ and a minimum IPR limit $IPR_{min}$, and setting $SFM_n$ to $SFM_{max}$ and setting $IPR_n$ according to $$IPR_n = Q_n/SFM_{max}$$

if $Q_n$ is greater than the threshold $Q_2$, and setting $IPR_n$ to $IPR_{min}$ and setting $SFM_n$ according to $$SFM_n = Q_n/IPR_{min}$$

if $Q_n$ is less than the threshold $Q_2$.

50. The combination as claimed in claim 48, wherein means (f) for determining new value signals $SFM_n$ and $IPR_n$ further comprises means for comparing the new relative machining rate $Q_n$ to a maximum threshold $Q_3$ defined as the product of a maximum IPR limit $IPR_{max}$ and a maximum SFM limit $SFM_{max}$, and means for setting $SFM_n$ to $SFM_{max}$ and setting $IPR_n$ to $IPR_{max}$ if $Q_n$ exceeds $Q_3$.

51. The combination as claimed in claim 48, further comprising means for comparing the new relative machining rate $Q_n$ to a minimum threshold $Q_1$ defined as the product of a minimum IPR limit $IPR_{min}$ and a minimum SFM limit $SFM_{min}$, and means for taking corrective action if $Q_n$ is less than $Q_1$.

52. In a numerically-controlled machine tool system having a holder for a workpiece, a cutting tool, a cutting tool holder, a feed motor means accepting a feed velocity control signal for feeding the cutting tool into the workpiece, a drive motor means accepting a drive velocity control signal for establishing a relative transverse velocity of the cutting tool across the surface of the workpiece, a drive power measuring means for generating a measured drive power signal indicating power required to maintain the drive velocity, a drive velocity measuring means for generating a measured drive velocity signal indicating the drive velocity, numerical converter means for converting measured signals to numerical values and numerical control values to control signals, and a digital computing means for entering machining parameters and performing numerical and logical functions and interfaced to said numerical converter means, the improved control method which comprises the steps of:
   (a) inputting a set point signal representing desired machining power into the digital computing means, and
   (b) inputting the numerical values of the measured drive power signal and the measured drive velocity signal into the digital computing means, and
   (c) computing a drive velocity numerical control value approximately proportional to the product of the numerical value of the measured drive velocity signal and the set point signal, divided by the numerical value of the measured drive power signal,
   (d) outputting the drive velocity numerical control value to the numerical converter means for conversion to the drive velocity control signal, and
   (e) repeating steps (b) through (d) generally continuously while feeding the cutting tool into the workpiece throughout a substantial part of the machining process, so that the machine tool system is adaptively controlled to maintain machining at a generally constant power level corresponding to the desired machining power despite changing functional relations between machining parameters.

53. The control method as claimed in claim 52, wherein step (a) further comprises inputting a maximum drive velocity limit into the digital computing means, and step (c) further comprises setting the computed drive velocity to the maximum drive velocity limit if the computed drive velocity exceeds the maximum drive velocity limit.

54. In a numerically-controlled machine tool system having a holder for a workpiece, a cutting tool, a cutting tool holder, a feed motor means accepting a feed velocity control signal for feeding the cutting tool into the workpiece, a drive motor means accepting a drive velocity control signal for establishing a relative transverse velocity of the cutting tool across the surface of the workpiece, a drive power measuring means for generating a measured drive power signal indicating power required to maintain the drive velocity, a drive velocity measuring means for generating a measured drive velocity signal indicating the drive velocity, a feed velocity measuring means for generating a measured feed velocity signal indicating feed velocity, numerical converter means for converting measured signals to numerical values and numerical control values to control signals, and a digital computing means for entering machining parameters and performing numerical and logical functions and interfaced to said numerical converter means, the improved control method which comprises the steps of:
   (a) inputting a desired machining power set point into the digital computing means,
   (b) inputting the numerical values of the measured drive power signal and the measured feed velocity signal into the digital computing means,
   (c) computing a feed velocity numerical control value proportional to the product of the numerical value of the measured feed velocity signal and the power set point, divided by the numerical value of the measured drive power signal, and
   (d) outputting the feed velocity numerical control value to the numerical converter means for conversion to the feed velocity control signal.

55. The control method as claimed in claim 54, wherein
   step (b) further comprises inputting the numerical value of the measured drive velocity signal into the digital computing means,
   step (c) further comprises computing a drive velocity numerical control value proportional to the product of the numerical value of the measured drive velocity signal and the power set point, divided by the numerical value of the measured drive power signal, and
   step (d) further comprises outputting the drive velocity numerical control value to the numerical converter means for conversion to the drive velocity control signal.

56. The control method as claimed in claim 55, wherein the feed velocity control signal and the drive velocity control signal are scaled by manually controllable scale factors before driving the feed motor means and drive motor means, and the power set point is scaled jointly by the same scale factors before use in step (c), so that the machine tool rapidly responds to changes in the manually controlled scale factors and the control system accommodates the expected change in machining power level.

57. The control method as claimed in claim 55, wherein step (a) further comprises inputting a maximum feed velocity limit and a minimum feed velocity limit into the digital computing means, and step (c) further comprises setting the computed feed velocity to the maximum feed velocity limit if the computed feed velocity exceeds the maximum feed velocity limit, and setting the computed feed velocity to the minimum feed velocity limit if the computed feed velocity is less than the minimum feed velocity limit.

58. The control method as claimed in claim 57, wherein
   step (a) further comprises inputting a maximum drive velocity limit and a minimum drive velocity limit into the digital computing means, and step (b) further comprises inputting the numerical value of the measured drive velocity signal into the digital computing means, and step (c) further comprises setting a drive velocity numerical control value equal to the maximum drive velocity limit, but if the computed feed velocity limit is less than the minimum feed velocity limit and is therefore set to the minimum feed velocity limit, then the drive velocity numerical control value is set proportional to the product of the numerical value of the measured drive velocity signal and the power set point, divided by the numerical value of the measured drive power signal, but if the drive velocity numerical control value is set to a value less than the minimum drive velocity limit, then the machining process is temporarily suspended, thereby permitting the machine operator to insert a sharp cutting tool to correct for the slow machining rate, and step (d) further comprises outputting the drive velocity numerical control value to the numerical converter means for conversion to the drive velocity control signal.

59. The control method as claimed in claim 57, wherein before the adaptive control method of claim 57 is initiated, the workpiece is accelerated to a programmed drive velocity with the cutting tool disengaged and then the tool is advanced into the workpiece at the minimum feed velocity limit to a substantial distance so that a substantial initial drive power level is achieved and initial convergence toward the power set point is facilitated while minimizing the initial force on the cutting tool.

60. The control method in claim 57, wherein steps (b)–(d) are iteratively repeated and the computation of feed velocity numerical control values is suspended in step (c) in subsequent interations of step (c) after a computed feed velocity numerical control value is less than the minimum feed velocity limit and is therefore set to the minimum feed velocity limit.

61. The control method in claim 57, wherein the numerically-controlled machine tool system controls a turning machine and the drive velocity measuring means is responsive to the angular velocity of the workpiece, the numerically-controlled machine tool system has a cutting tool feed velocity measuring means for generating a radial feed displacement signal indicating the displacement of the cutting tool from the axis of the turning workpiece, and step (c) further comprises a computation of the radial feed velocity, proportional to the change in the numerical value of the radial feed displacement divided by the numerical value of the angular drive velocity, and a scaling computation of the angular drive velocity involving the numerical value of the radial feed displacement signal as a scaling factor, so that the numerical value of the radial feed velocity indicates the radial depth of cut into the workpiece by the cutting tool, and the comparison between the drive velocity limits and the numerical value of the drive velocity are indicative of the transverse velocity of the workpiece surface at the cutting tool.

62. The control method in claim 54, wherein the drive motor means is an electric motor and the drive velocity measuring means includes a means for measuring the rotational velocity of the motor and the power measuring means is a wattmeter responsive to the electrical power consumed by the drive motor, and wherein step (c) further comprises a computation to calculate the true power consumed by the workpiece material removal process at the cutting tool for use as the numerical value of the measured drive power signal in the computations in step (c), said computation including a computation to correct for power variation due to net acceleration of the inertial mass of the rotating parts of the machine tool, by subtracting, from the numerical value of the measured power consumed by the drive motor, the net power required to accelerate the inertial mass.

63. The control method as claimed in claim 62, further comprising the step of computing the power delivered to the inertial mass as proportional to the product of a pre-determined moment of inertia, the numerical value of the measured angular drive velocity signal, and the rate of change of the numerical value of the measured angular drive velocity over repeated measurements of the angular drive velocity signal.

64. The control method in claim 62, wherein the computation in step (c) to calculate the true power consumed by the workpiece material removal process at the cutting tool further includes the subtraction of the frictional losses of the drive system of the machine tool, computed as generally proportional to the product of a pre-determined constant of friction and the numerical value of the measured drive angular velocity signal.

65. The method as claimed in claim 62, wherein the computation in step (c) to calculate the true power consumed by the workpiece material removal process at the cutting tool further includes the subtraction of electrical loss in the drive motor, computed as the product of the motor current squared and a predetermined constant of resistance characteristic of the motor, and said motor current is determined as a predetermined function of the numerical value of the measured drive angular velocity signal.

66. The method as claimed in claim 62, wherein the numerically controlled machine tool is a turning machine, and the pre-determined moment of inertia is computed before the adaptive control process of steps (a) through (c) are initiated by:

accelerating the machine drive with the cutting tool disengaged from the workpiece, and calculating the moment of inertia by dividing the numerical value of the power measured during the acceleration by the numerical value of the measured drive angular velocity and by the time rate of change in the numerical value of the measured drive angular velocity, so that power measurements compensate for the moment of inertia of the particular workpiece.

67. The method as claimed in claim 54, further comprising the steps of:

repetitively computing a cutting efficiency factor generally proportional to the numerical value of the drive power and inversely proportional to the product of the numerical value of the drive velocity, the numerical value of the feed velocity, and a numerical depth of cut value, repetitively comparing the cutting efficiency factor to a predetermined low efficiency factor limit preset to a fraction of the cutting effiency factor normally computed for a sharp tool, and terminating the machining process when the cutting efficiency factor reaches the low efficiency factor limit, so that a broken cutting tool is detected and the machine tool is stopped for tool replacement.

68. The method as claimed in claim 54, further comprising the steps of repetitively computing a cutting efficiency factor generally proportional to the numerical value of the drive power and inversely proportional to the product of the numerical value of the drive velocity, the numerical value of the feed velocity, and a numerical depth of cut value, repetitively comparing the cutting efficiency factor to a predetermined high efficiency factor limit preset substantially above the cutting efficiency factor normally computed for a sharp tool, and terminating the machining process when the cutting efficiency factor reaches the limit, so that a dull tool is detected and the machine tool is stopped for tool replacement.

69. The method as claimed in claim 67 or claim 68 wherein the depth of cut value is obtained as a predetermined constant from the part program stored in the memory of the numerical control unit.

70. The method as claimed in claim 54, further comprising the steps of:

initially computing an initial relative cutting efficiency factor generally proportional to the numerical value of the drive power and inversely proportional to the product of the numerical value of the drive velocity and the numerical value of the feed velocity as the cutting tool is initially cutting into the workpiece, and thereafter repetitively computing a current relative cutting efficiency factor generally proportional to the numerical value of the drive power and inversely proportional to the product of the numerical value of the drive velocity and the numerical value of the feed velocity, repetitively comparing the current relative cutting efficiency factor to a low efficiency factor limit set to a fraction of the initial relative cutting efficiency factor, and terminating the machining process when the relative cutting efficiency parameter reaches the low efficiency factor limit, so that a broken tool is detected and the machine tool is stopped for tool replacement.

71. The method as claimed in claim 54, further comprising the steps of:

initially computing an initial relative cutting efficiency factor generally proportional to the numerical value of the drive power and inversely proportional to the product of the numerical value of the drive velocity and the numerical value of the feed velocity as the cutting tool is initially cutting into the workpiece, and thereafter repetitively computing a current relative cutting efficiency factor generally proportional to the numerical value of the drive power and inversely proportional to the product of the numerical value of the drive velocity and the numerical value of the feed velocity, repetitively comparing the current relative cutting efficiency factor to a high efficiency factor limit set to substantially greater than the initial relative cutting efficiency factor, and terminating the machining process when the relative cutting efficiency factor reaches the low efficiency factor limit, so that a dull tool is detected and the machine tool is stopped for tool replacement.

72. The method as claimed in claim 71 wherein the high efficiency factor limit is set to substantially greater than the initial relative cutting efficiency factor by setting the high efficiency factor limit to the product of a preset high limit factor and the initial relative cutting efficiency factor, said high limit factor being substantially greater than one.

73. The method as claimed in claim 67 or claim 68 or claim 58 or claim 59, wherein the drive power is compensated for the net power required for net acceleration of the drive, before using the drive power to calculate the cutting efficiency factor, by subtracting the net power required for net acceleration from the drive power, so that transient variations in drive power coincident with net acceleration do not trigger the false detection of an improper tool condition.

* * * * *